United States Patent
Lee et al.

(10) Patent No.: US 10,067,648 B2
(45) Date of Patent: Sep. 4, 2018

(54) USER TERMINAL DEVICE AND METHOD FOR DISPLAYING THEREOF

(71) Applicant: SAMSUNG ELECTRONICS CO., LTD., Suwon-si (KR)

(72) Inventors: Yong-yeon Lee, Suwon-si (KR); Yun-kyung Kim, Suwon-si (KR); Jae-yeon Rho, Seoul (KR); Hae-yoon Park, Seoul (KR); Ji-yeon Kwak, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 574 days.

(21) Appl. No.: 14/621,666

(22) Filed: Feb. 13, 2015

(65) Prior Publication Data
US 2015/0227274 A1 Aug. 13, 2015

Related U.S. Application Data
(60) Provisional application No. 61/939,380, filed on Feb. 13, 2014.

(30) Foreign Application Priority Data
Jul. 22, 2014 (KR) ........................ 10-2014-0092534

(51) Int. Cl.
*G06F 3/0488* (2013.01)
*G06F 3/041* (2006.01)
(Continued)

(52) U.S. Cl.
CPC .......... *G06F 3/0483* (2013.01); *G06F 1/1613* (2013.01); *G06F 1/1615* (2013.01); *G06F 1/3262* (2013.01); *G06F 1/3265* (2013.01); *G06F 3/0481* (2013.01); *G06F 3/0482* (2013.01); *G06F 3/0485* (2013.01); (Continued)

(58) Field of Classification Search
CPC .. G06F 3/0483; G06F 3/0487; G06F 3/04883; G06F 3/04842; G06F 1/1613; G06F 3/0486; G06F 3/04845; G06F 3/0481; G06F 3/0485; G06F 15/0291; G06F 1/3265; G06F 1/1615; G06F 3/0482; H04M 1/72522
See application file for complete search history.

(56) References Cited

U.S. PATENT DOCUMENTS

2009/0141046 A1* 6/2009 Rathnam ............. G06F 3/03547
345/661
2010/0081475 A1* 4/2010 Chiang ................. G06F 3/0483
455/564

(Continued)

*Primary Examiner* — Ibrahim A Khan
(74) *Attorney, Agent, or Firm* — Sughrue Mion, PLLC

(57) ABSTRACT

A user terminal device and a display method thereof are provided. A user terminal device may include a display configured to display content, a bezel unit configured to house the display, a first touch detector configured to detect a first user interaction inputted to the display, a second touch detector configured to detect a second user interaction inputted to the bezel unit, and a controller configured to, in response to detecting, via the second touch detector, the user interaction on at least one side of the bezel unit, control a display of the content corresponding to a type of the second user interaction and a number of sides where the user interaction is detected.

17 Claims, 73 Drawing Sheets

(51) Int. Cl.
    *G06F 3/0483*     (2013.01)
    *G06F 3/0487*     (2013.01)
    *G06F 15/02*     (2006.01)
    *G06F 1/16*     (2006.01)
    *G06F 1/32*     (2006.01)
    *G06F 3/0481*     (2013.01)
    *G06F 3/0482*     (2013.01)
    *G06F 3/0484*     (2013.01)
    *G06F 3/0485*     (2013.01)
    *G06F 3/0486*     (2013.01)
    *H04M 1/725*     (2006.01)

(52) U.S. Cl.
    CPC .......... *G06F 3/0486* (2013.01); *G06F 3/0487* (2013.01); *G06F 3/04842* (2013.01); *G06F 3/04845* (2013.01); *G06F 3/04883* (2013.01); *G06F 3/04886* (2013.01); *G06F 15/0291* (2013.01); *H04M 1/72522* (2013.01); *G06F 2203/04803* (2013.01); *G06F 2203/04808* (2013.01); *H04M 2250/22* (2013.01)

(56) References Cited

U.S. PATENT DOCUMENTS

| | | | |
|---|---|---|---|
| 2010/0283743 A1* | 11/2010 | Coddington | G06F 3/0485 345/173 |
| 2011/0209093 A1* | 8/2011 | Hinckley | G06F 3/04817 715/834 |
| 2013/0222274 A1* | 8/2013 | Mori | B60K 37/06 345/173 |
| 2014/0043265 A1* | 2/2014 | Chang | G06F 3/04883 345/173 |
| 2015/0160849 A1* | 6/2015 | Weiss | G06F 3/044 345/174 |

* cited by examiner

ARRANGEMENT AREA OF
SECOND TOUCH DETECTOR

FIG. 3E
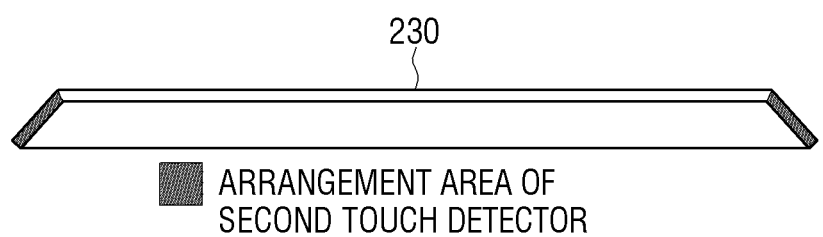
■ ARRANGEMENT AREA OF
SECOND TOUCH DETECTOR
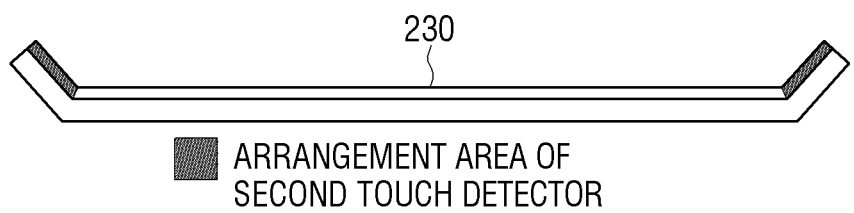
■ ARRANGEMENT AREA OF
SECOND TOUCH DETECTOR FIG. 8
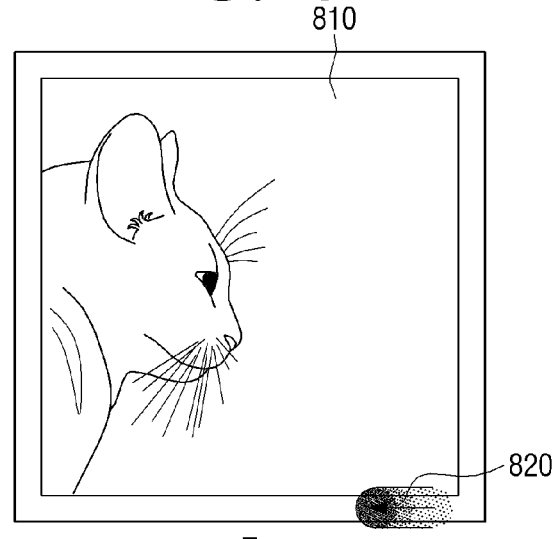
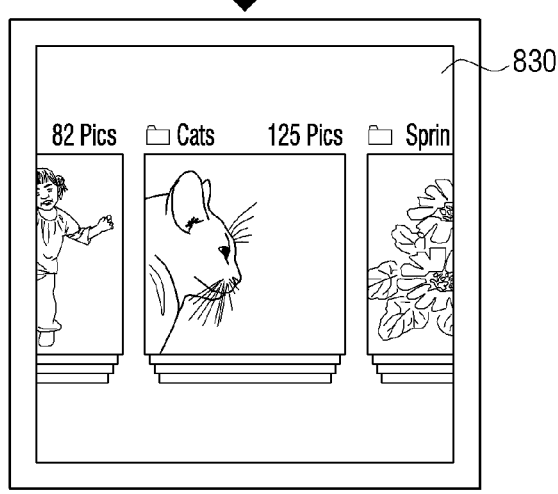
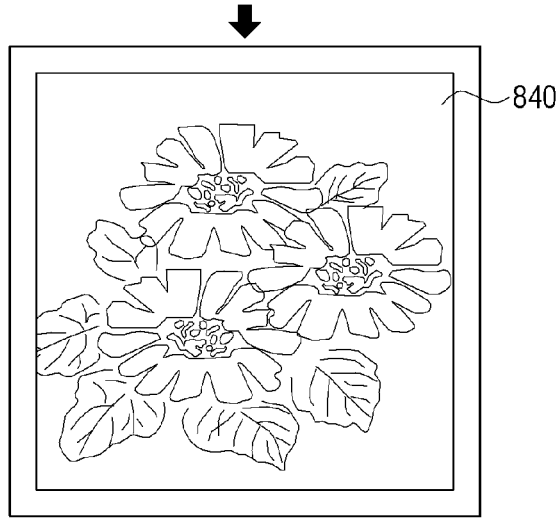

FIG. 13A
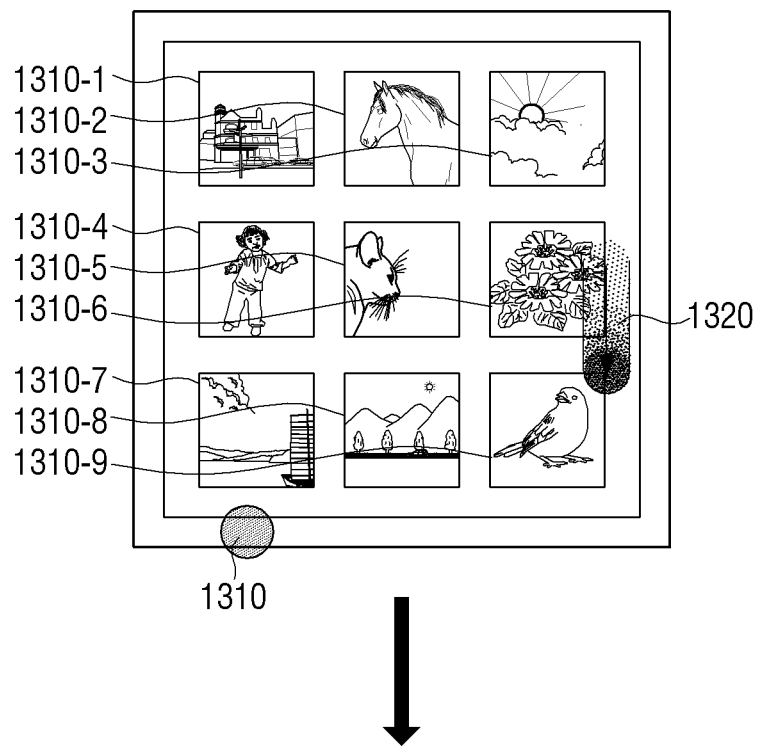
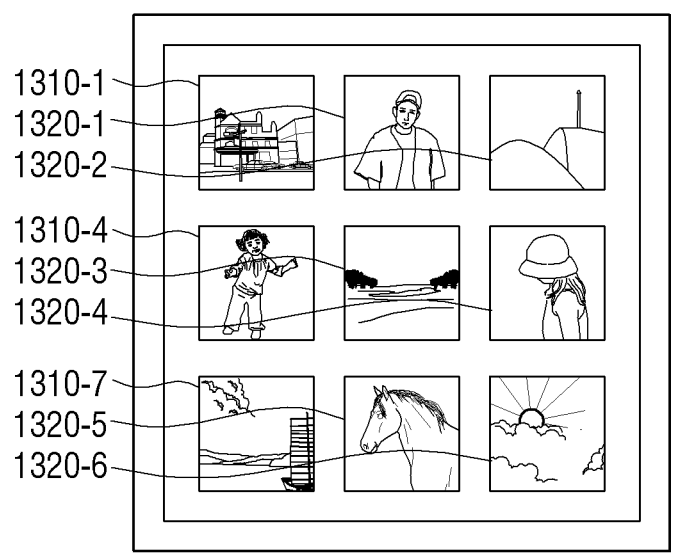

FIG. 13B
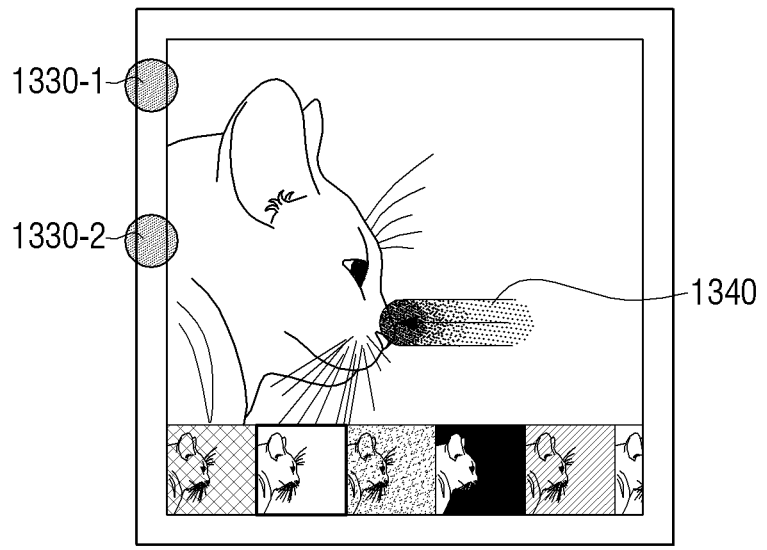
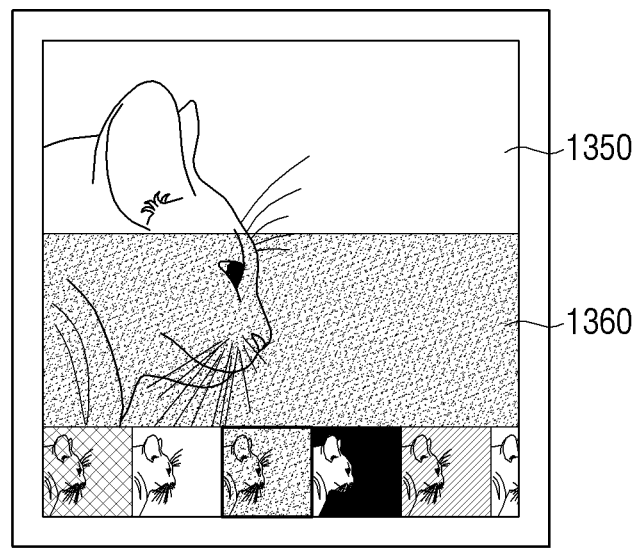

FIG. 27A
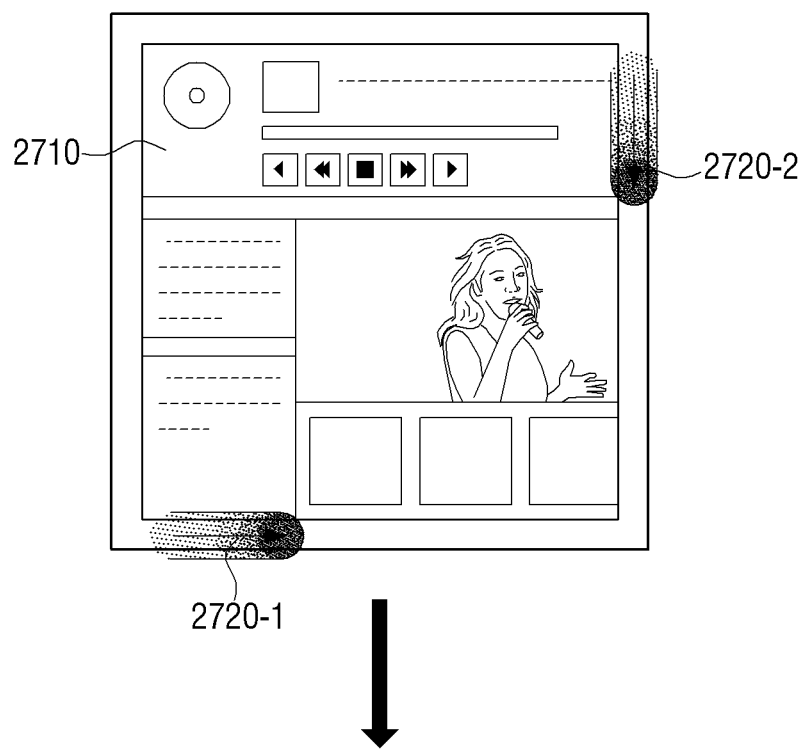
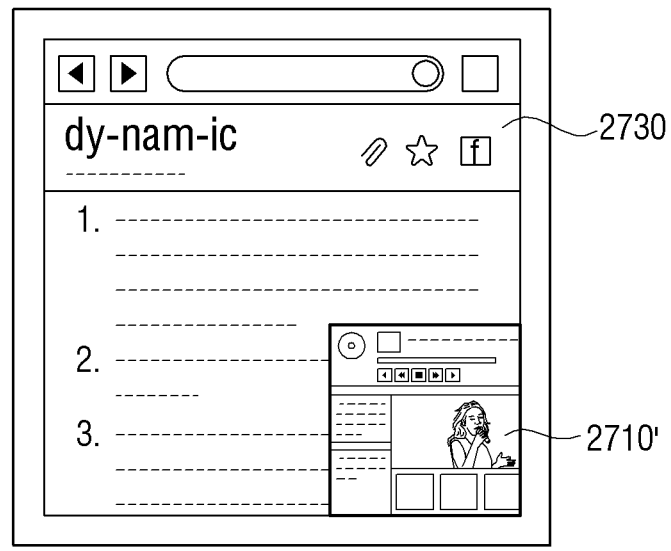

FIG. 27B
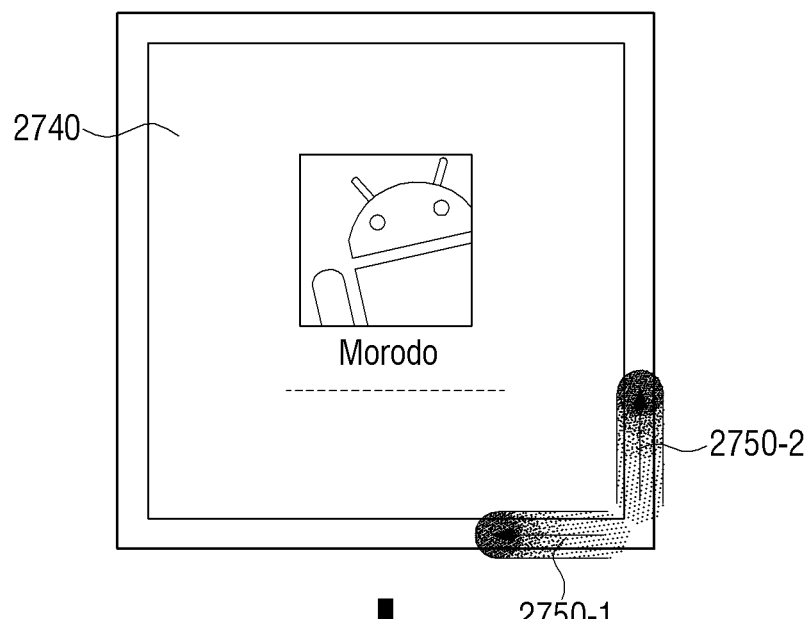
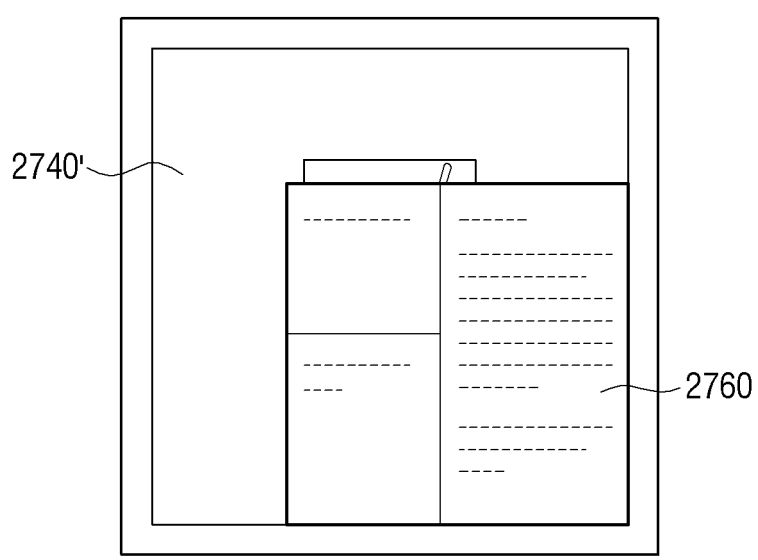

FIG. 30
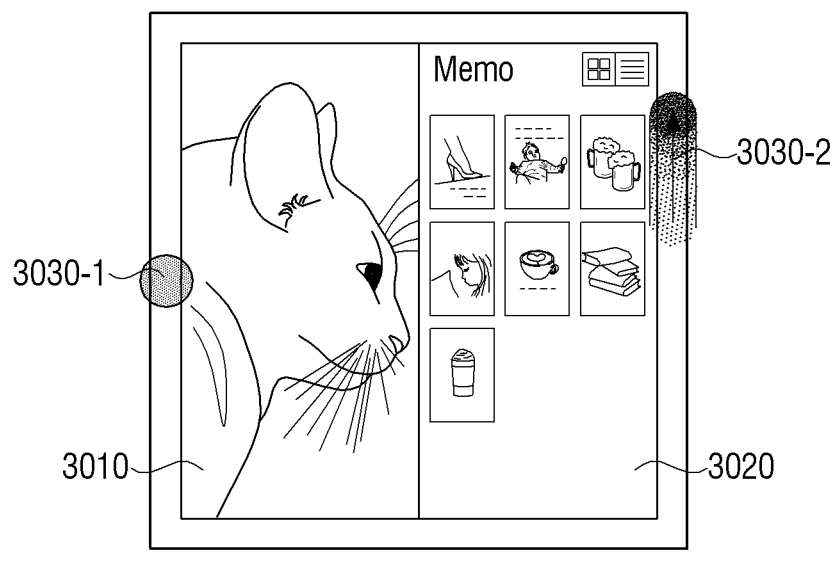
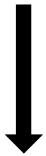
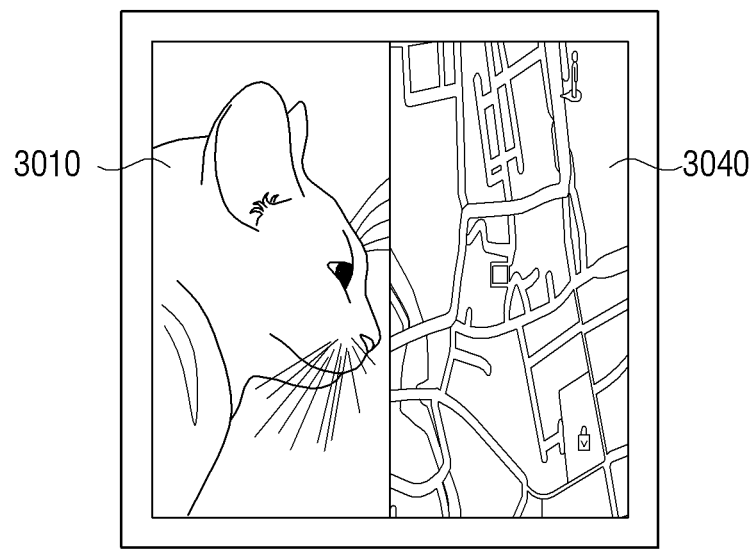

FIG. 45
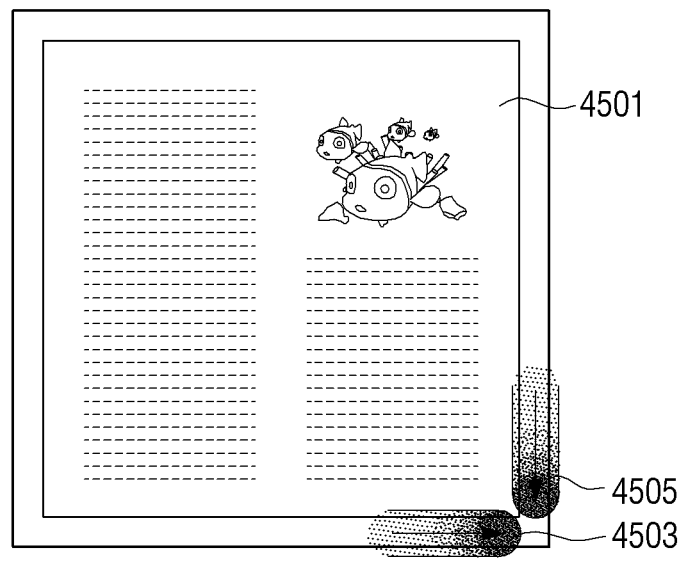
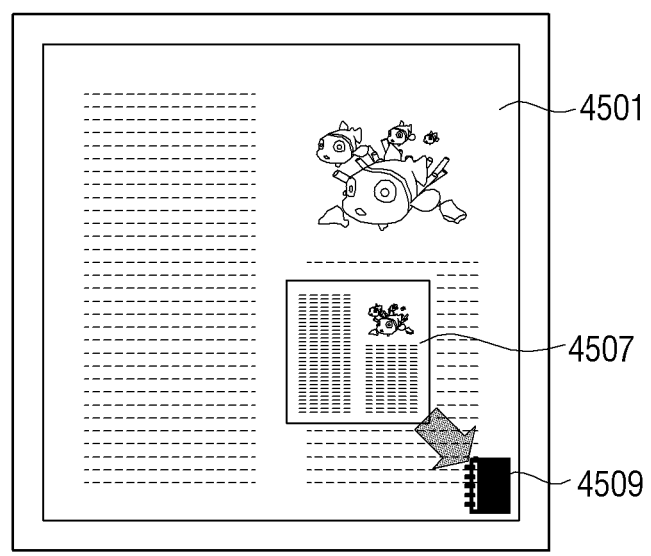

USER TERMINAL DEVICE AND METHOD
FOR DISPLAYING THEREOF

CROSS-REFERENCE TO RELATED
APPLICATIONS

This application claims priority from Korean Patent Application No. 10-2014-0092534, filed on Jul. 22, 2014, in the Korean Intellectual Property Office, and U.S. Provisional Application No. 61/939,380, filed on Feb. 13, 2014, in the United States Patent and Trade Office, the disclosures of which are incorporated herein by reference in their entirety.

BACKGROUND

1. Field

Methods and apparatuses consistent with exemplary embodiments relate to a user terminal device and a method for displaying thereof, and more particularly, to a user terminal device capable of inputting a user's touch into a display and a bezel which houses the display and a method for displaying thereof.

2. Description of the Related Art

With the development of electronic technologies, various kinds of user terminal devices are being developed and supplied. Recently, the sizes of user terminal devices have been minimized, and functions have become varied, and thus the demand for user terminal devices has increased.

According to a user's demand, the user terminal device may provide various functions such as a multimedia content, an application screen and the like. A user may select a function which the user wants to use by using a button, a touch screen and the like, which are equipped on the user terminal device. The user terminal device may execute a program selectively according to an interaction with a user, and display the execution result.

As the functions which are provided by a user terminal device have become varied, various needs regarding a method for displaying contents or a method for user interaction have arisen. In other words, as methods for displaying contents have changed, and the kinds and function of contents have increased, it has become difficult to perform various functions of a user terminal device with conventional interaction methods which include simply selecting a button, or touching a touch screen.

Accordingly, there is an increasing need for user interaction technology that is more convenient for use with a user terminal device.

SUMMARY

An aspect of the exemplary embodiments provides a user terminal device capable of providing various functions according to a touch interaction which is detected in at least one between a display unit or a bezel unit, and a method thereof.

Also, another aspect of the exemplary embodiments provides a user terminal device capable of providing various functions according to a touch interaction which touches at least two sides of the bezel unit.

According to an exemplary embodiment, a user terminal device may include a display configured to display content, a bezel unit configured to house the display, a first touch detector configured to detect a first user interaction inputted to the display, a second touch detector configured to detect a second user interaction inputted to the bezel unit, and a controller configured to in response to detecting, via the second touch detector, the second user interaction on at least one side of the bezel unit, control a display of the content corresponding to a type of the second user interaction and a number of sides where the user interaction is detected. The content may be e-book content.

The controller, in response to detecting a single touch interaction on a first side of the bezel unit while the e-book content is displayed, may control the display to display a menu related to the e-book content, and in response to detecting a multi touch interaction on the first side of the bezel unit, may control the display to display bookmark information regarding the e-book content.

The controller, in response to detecting a drag interaction via the first touch detector while the e-book content is displayed, may control the display to convert the e-book content to a page unit, and in response to detecting a drag interaction via the second touch detector, may control the display to convert the e-book content to one from among a screen in a chapter unit or to another e-book.

The controller, in response to detecting the drag interaction on a horizontal side of the bezel unit, may control the display to convert the e-book content to a screen in a chapter unit, and in response to detecting the drag interaction on a vertical side of the bezel unit, may control the display to covert the e-book content to another e-book content.

The controller, in response to detecting a pinch-in interaction on the bezel unit while the content is displayed, may control the display to display a list of a plurality of contents.

The controller, in response to detecting a drag interaction which includes touching a point on a vertical side of the bezel unit while the content is displayed, may control the display to highlight a line corresponding to the point on the vertical side to a line corresponding to a point where a drag ends.

The controller, in response to detecting a user interaction which comprises simultaneously touching the first side of the bezel unit and the second side of the bezel unit which adjoins the first side, may control the display to display information related to the e-book content on a corner area which is between points where the first side and the second side are touched.

The controller, in response to detecting a touch interaction which comprises touching a first side of the bezel unit and a second side of the bezel unit which is located on a side opposite to the first side while the content is displayed, may control the display to divide a display screen into two areas according to an imaginary line which connects points touched simultaneously, to display the content on a first area, and to display an execution screen of the second application on a second area.

The controller, in response to detecting the touch interaction which comprises touching the first side which is contacted with the first area of the bezel unit, and dragging the second side which is connected with the second area while the display screen is divided so that the content is displayed on the first area, and the second application is displayed on the second area, controls the display to remove an execution screen of the second application from the second area, and to display an execution screen of the third application.

The controller, in response to detecting a drag interaction which comprises dragging from a first side of the bezel unit to a second side which adjoins the first side while the content is displayed, may change a letter size of the content.

The controller, in response to continuing the drag interaction in a clockwise direction, may enlarge a letter size of the content, and in response to continuing the drag interaction in a counterclockwise direction, may reduce a letter size of the content.

The controller, in response to detecting a swipe interaction which comprises simultaneously swiping a first side of the bezel unit and a second side of the bezel unit which adjoins the first side while a page of the content is displayed, may delete the page according to the swipe interaction.

A method for displaying content on a user terminal device capable of receiving touch into a display and a bezel unit which houses the display, the method may include displaying content on the display, and in response to detecting a user interaction on at least one side of the bezel unit, controlling a display of content corresponding to a type of the user interaction and a number of sides where the user interaction is detected. The content may be e-book content.

The controlling may include, in response to detecting a user interaction on at least one side of the bezel unit, removing a display of an e-book content corresponding to a type of the user interaction and the number of sides where the user interaction is detected.

The controlling may include, in response to detecting a first drag interaction via a first touch detector while the e-book content is displayed, converting the e-book content to a page unit, and in response to detecting a second drag interaction via the second touch detector, converting the e-book content to one from among a screen in a chapter unit and another e-book content.

The controlling may include, in response to detecting the second drag interaction on a horizontal side of the bezel unit, converting the e-book content to a screen in chapter unit, and in response to detecting the second drag interaction on a vertical side of the bezel unit, converting the e-book content to another e-book content.

The controlling may include, in response to detecting a pinch-in interaction on the bezel unit while the content is displayed, displaying a list of a plurality of contents.

The controlling may include, in response to detecting the user interaction which comprises touching and dragging a first point on a vertical side of the bezel unit while the e-book content is displayed, highlighting a line corresponding to the point to a line corresponding to a second point where a drag ends.

The controlling may include, in response to detecting the user interaction which comprises simultaneously touching a first side of the bezel unit and a second side of the bezel unit which adjoins the first side, displaying notification information of the user terminal device on a corner area which is between points where the first side and the second side are touched.

The controlling may include, in response to detecting a touch interaction which comprises simultaneously touching a first side of the bezel unit and a second side of the bezel unit which is located on a side of the bezel unit opposite to the first side while the content is displayed, dividing the display into two areas, displaying the content on the first area, and displaying an execution screen of an application on the second area.

The controlling may include, in response to detecting a touch interaction which comprises touching the first side which is contacted with the first area of the bezel unit, dragging the second side which is contacted with the second area while the display screen is divided so that the content is displayed on the first area, and the application being executed on the second area, removing an execution screen of the application from the second area and displaying an execution screen of another application.

The controlling may include, in response to detecting a drag interaction which comprises dragging a first side of the bezel unit to a second side which adjoins the first side while the content is displayed, changing a letter size of the content.

The controlling may include, in response to processing a drag interaction in a clockwise direction of the bezel unit, enlarging a letter size of the e-book content, and in response to processing the drag interaction in a counterclockwise direction, reducing a letter size of the content.

The controlling may include, in response to detecting a swipe interaction which comprises simultaneously swiping a first side of the bezel unit and a second side of the bezel unit which adjoins the first side, deleting the page according to the swipe interaction.

According to an aspect of an exemplary embodiment, detecting a pinch-in interaction inputted to the display may invoke a different operation than when the pinch-in interaction is detected on the bezel unit.

The user interaction on the at least one side of the bezel unit may invoke a power control function.

When the content is a webpage, in response to detecting a drag interaction on one side of the bezel unit and a tap interaction on another side of the bezel unit, the controller may control the display to scroll the webpage faster than a currently set scrolling speed.

In response to detecting a drag interaction on a side of the bezel unit, the controller may adjust a volume of the user terminal device.

According to various exemplary embodiments described above, by touching at least one among a display and a bezel unit, a user may perform various functions of a user terminal device.

BRIEF DESCRIPTION OF THE DRAWINGS

FIGS. 3A to 3E are views illustrating a user terminal device including a bezel unit which detects a touch interaction according to an exemplary embodiment;

FIGS. 5A to 14B are views illustrating the performing of various functions of a user terminal according to a touch interaction which includes touching a side of a bezel according to various exemplary embodiments;

FIGS. 15A to 30 are views illustrating the performing of various functions of a user terminal according to a touch interaction which includes touching at least two sides of a bezel according to various exemplary embodiments;

FIG. 45 is a view illustrating the deleting of a page according to a user interaction which includes simultaneously swiping or dragging the first side of a bezel unit and the second side of the bezel unit which adjoins the first side while a page of an e-book content is displayed;

DETAILED DESCRIPTION OF THE EXEMPLARY EMBODIMENTS

Figure 1:
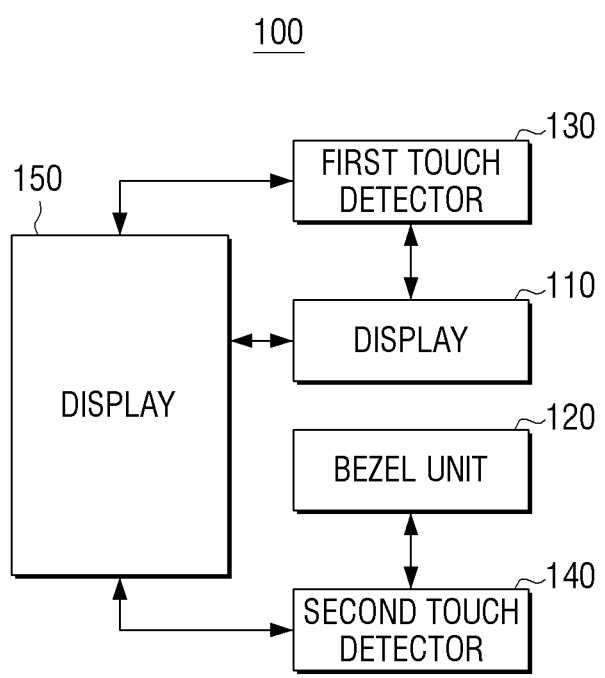
FIG. 1. is a block diagram simply illustrating a configuration of a user terminal device according to an exemplary embodiment.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail.

Although the terms first, second, etc. may be used herein to describe various elements, these elements should not be limited by these terms. These terms are only used to distinguish one element from another element.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof.

In embodiments of the present general inventive concept, a "module" or a "unit" may perform at least one function or operation and may be embodied as hardware or software or as a combination of hardware and software. Also, a plurality of "modules" or a plurality of "units" may be integrated into at least one module except a "module" or a "unit" that may be embodied as particular hardware, to be embodied as at least one processor (not shown).

Hereinafter, exemplary embodiments are described in greater detail with reference to the accompanying drawings. FIG. 1 is a block diagram simply illustrating a configuration of a user terminal device 100 according to an exemplary embodiment. As illustrated in FIG. 1, the user terminal device 100 includes a display 110, a bezel unit 120, a first touch detector 130, a second touch detector 140 and a controller 150. Herein, the user terminal device 100 may be realized as various kinds of devices such as a television (TV), a personal computer (PC), a laptop computer, a cellular phone, a tablet PC, a personal digital assistant (PDA), an MP3 player, a kiosk, an electronic picture frame, a table display device and the like. When the user terminal device 100 is realized as a portable device such as a cellular phone, a tablet PC, a PDA, an MP3 player, a laptop computer and the like, it may be called a mobile device, but it is commonly called a user terminal device and explained in the present specification.

The display 110 displays various kinds of image data and a user interface (UI). In particular, the display 110 may be combined with the first touch detector 130 and be realized as a touch screen. Also, the display 110 may be bended by a bending line corresponding to a plurality of hinges 120 (not shown).

The bezel unit 120 is located on a border of the display 110, and houses the display 110. In particular, the bezel unit 120 may include the second touch detector 140.

The first touch detector 130 detects a touch interaction of a user which is inputted to the display 110. Also, the second touch detector 140 detects a touch interaction of a user which is inputted to the bezel unit 120.

The controller 150 controls an overall operation of the user terminal device 100 according to a touch interaction detected through the first touch detector 130 and the second touch detector 140. Specifically, in response to detecting the first touch interaction which includes touching the display 110 through the first touch detector 130, the controller 150 performs the first function of the user terminal device 100. Also, in response to detecting the second touch interaction which is an identical type to the first touch interaction which includes touching the bezel unit 120 through the second touch detector 140, the controller 150 may perform the second function of the user terminal device 100. In other words, the controller 150 may perform a different function according to an area where a touch interaction is detected even if an identical type of touch interaction is detected.

To be specific, in response to detecting a drag interaction via the second touch detector 140, the controller 150 may convert a screen to a unit that is different from a unit that the screen is converted to when a drag interaction is detected via the first touch detector 130 thereof.

As an exemplary embodiment, in response to detecting a drag interaction though the first touch detector 130 while a gallery application is executed, the controller 150 may control the display 110 to convert a display screen to a file unit. However, in response to detecting a drag interaction through the second touch detector 140, the controller 150 may control the display 110 to convert a display screen to a folder unit.

In response to detecting the first touch detector 130 while an e-book application is executed, the controller 150 may control the display to convert a display screen to a page unit. Also, in response to detecting a drag interaction through the second touch detector 140, the controller 150 may control the display 110 to convert a display screen to a chapter unit.

In response to detecting a drag interaction via the first touch detector 130, the controller 150 may convert a screen within an application, but in response to detecting a drag interaction through the second touch detector 140, the controller 140 may convert an execution screen among a plurality of applications.

For example, in response to detecting a drag interaction via the first touch detector 130 while the first application is executed, the controller 150 may control the display 110 to scroll an execution screen of the first application. Also, in response to detecting a drag interaction via the second touch detector 140, the controller 150 may control the display 110 to remove at least a part of an execution screen of the first application from a display screen, and to display at least a part of an execution screen of the second application.

In response to detecting a pinch-in interaction where a distance between two touched points becomes closer via the first touch detector 130 while a picture content is displayed, the controller 150 may control the display 110 to zoom out the picture content, and in response to detecting the pinch-in interaction via the second touch detector 140, the controller 150 may control the display 110 to display a folder list.

In response to detecting a touch interaction which includes touching at least two sides of the bezel unit 120 via the second touch detector 140, the controller 150 may perform a function of the user terminal device 100 corresponding to the type of touch interaction and the touching of at least two sides of the bezel unit.

To be specific, in response to detecting a touch interaction which simultaneously includes touching the first side of the bezel unit 120 and the second side of the bezel unit 120 which adjoins the first side while an image content is displayed, the controller 150 may control the display 110 to display information related to an image content on a corner area which is between points where the first side and the second side are touched.

In response to detecting a touch interaction which simultaneously includes touching the first side of the bezel unit 120 and the second side of the bezel unit 120 which adjoins the first side, the controller 150 may control the display 110 to display notification information (for example, received message information, missed call information, update information and the like) of a user terminal device on a corner area which is between points where the first side and the second side are touched.

In response to detecting a touch interaction which includes simultaneously touching the first side of the bezel unit 120 and the third side of the bezel unit 120 which is located in the opposite side of the first side while the first application is executed, the controller 150 may control the display 110 to divide the display 110 into two areas according to a side which connects points which are touched simultaneously, to display an execution screen of the first application on the first area, and to display an execution screen of the second application which is different from the first application on the second area. Herein, the second application may be an application related to the first application. For example, when the first application is a telephone application, the second application may be a memo application or a calendar application which is related to the telephone application.

In response to detecting a drag interaction which includes continually dragging from the first side of the bezel unit 120 to the second side of the bezel unit 120 which adjoins the first side while a picture content is displayed, the controller 150 may control the display 110 to zoom in a picture content, and in response to detecting a drag interaction which includes continually dragging from the first side of the bezel unit 120 to the third side which adjoins the first side, the controller 150 may control the display 110 to zoom out the picture content. Herein, an amount of the zoom-in and zoom-out may be decided based on the number of sides of the bezel unit 120 where the drag interaction is detected or the length of the drag interaction.

In response to detecting a drag interaction which includes simultaneously touching the first side of the bezel unit 120 and the second side of the bezel unit 120 which is located on the opposite side from the first side while a picture content is displayed, and then dragging in the opposite direction of the touched two points, the controller 150 may control the display 110 to rotate the picture content. Herein, a rotation direction of the picture content may be decided based on the direction of drag interaction.

In response to detecting a swipe interaction which includes simultaneously swiping the first side of the bezel unit 120 and the second side of the bezel unit 120 which adjoins the first side while the first application is executed, the controller 150 may control the display 110 to display an execution screen of the second application on the first area of an execution screen of the first application according to the swipe interaction.

In response to detecting a touch interaction which includes dividing a display screen and executing the first application on the first area, touching the first side which is contacted with the first area among the bezel unit 120 while the second application is executed on the second area, and detecting a touch interaction which drags the second side which is contacted with the second area, the controller 150 may control the display 110 to remove an execution screen of the second application from the second area and to display an execution screen of the third application.

As described above, according to various exemplary embodiments, a user may be provided various functions of the user terminal device 100 according to the touch interaction detected on the bezel unit 120.

Figure 2:
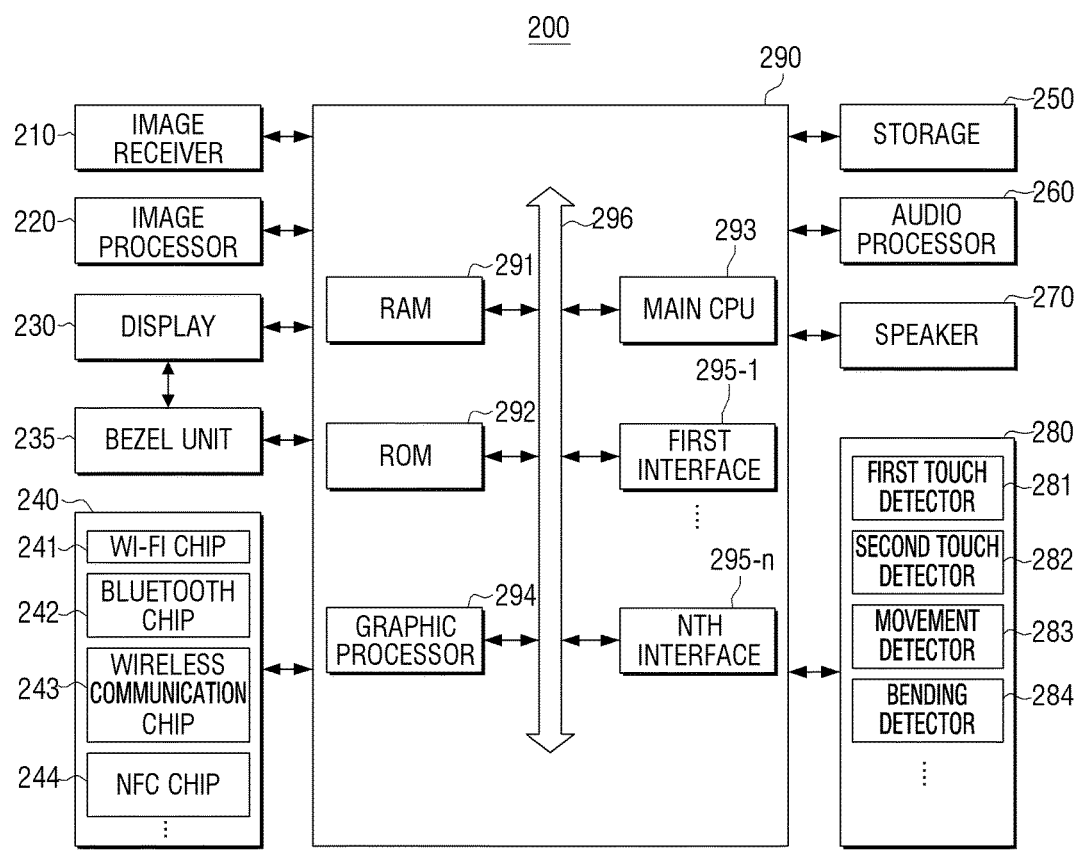
FIG. 2 is a block diagram illustrating a configuration of a user terminal device in detail according to an exemplary embodiment.

Hereinafter, referring to FIGS. 2 to 32, exemplary embodiments will be explained in detail. FIG. 2 is a block diagram illustrating a configuration of the user terminal device 200 according to an exemplary embodiment. As illustrated in FIG. 2, the user terminal device 200 includes an image receiver 210, an image processor 220, a display 230, a bezel unit 235, a communicator 240, a storage 250, an audio processor 260, an audio outputter 270, a detector 280, and a controller 290.

FIG. 2 illustrates various elements in a case, as an example, where the user terminal device 200 is a device equipped with various functions such as a function of providing contents, a display function and the like. Thus, some of the elements illustrated in FIG. 2 may be omitted or changed, or other elements may be further added according to the exemplary embodiment.

The image receiver 210 receives image data through various sources. For example, the image receiver 210 may receive broadcasting data from an external broadcasting company, receive VOD data from an external server in real time, and receive image data from an external apparatus.

The image processor 220 is an element which performs a process related to image data received from the image receiver 210. The image processor 220 may perform various image processes such as decoding, scaling, noise filtering, frame rate conversion, resolution conversion and the like as they relate to image data.

The display 230 displays at least one among a video frame where image data received from the image receiver 210 is processed in the image processor 220 and various screens generated from the graphic processor 294. According to an exemplary embodiment, the display 230 may be realized as a flexible display which is capable of folding, but this is only one example, and it may also be realized as other types of displays.

Figure 3A:
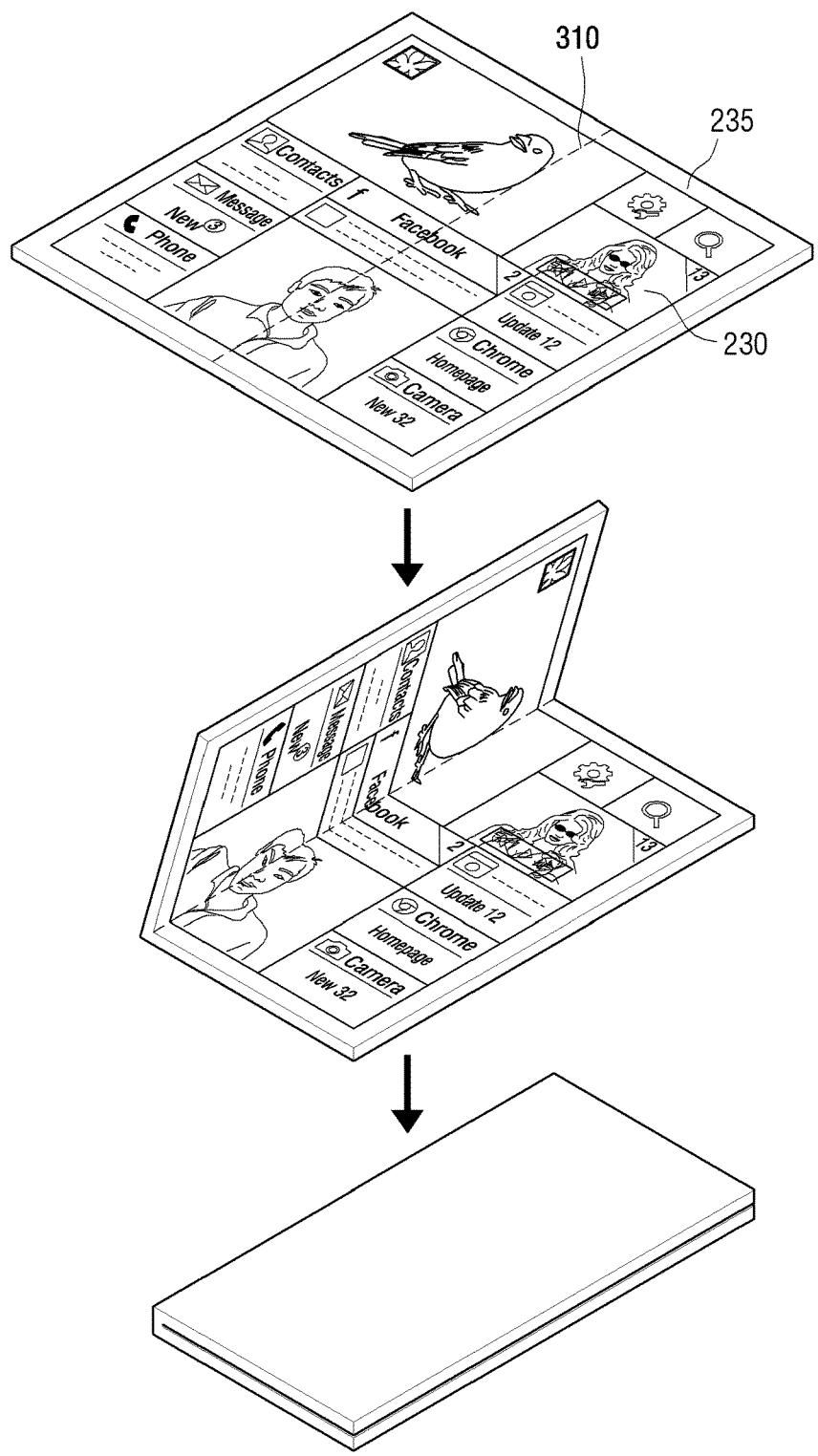

The bezel unit 235 is located on a border of the display 230, and houses the display 230. Especially, as illustrated in FIG. 3A, the bezel unit 235 may be located on a border of the four sides of the display 230. Also, as illustrated in FIG. 3, the display 230 and the bezel unit 235 may be folded by a folding line 310. Herein, the folding line 310 may be a line which is folded by a hinge unit.

The communicator 240 is configured to perform a communication with various kinds of external apparatuses according to various kinds of communication methods. The communicator 240 includes a Wi-Fi chip 241, a Bluetooth chip 242, a wireless communication chip 243, and a near field communication (NFC) chip 244. The controller 290 performs a communication with various external apparatuses using the communicator 240.

In particular, the Wi-Fi chip 241 and the Bluetooth chip 242 perform a communication based on a Wi-Fi method and a Bluetooth method, respectively. When the Wi-Fi chip 241 or the Bluetooth chip 242 are used, various kinds of connection information such as a service set identifier (SSID), a session key and the like may be first transmitted and received so that a communication is connected, and then various kinds of information may be transmitted and received. The wireless communication chip 243 means a chip which performs a communication according to various communication standards such as an Institute of Electrical and Electronics Engineers (IEEE), a Zigbee, the 3rd Generation (3G), the 3rd Generation Partnership Project (3GPP), Long Term Evolution (LTE) and the like. The NFC chip 244 means a chip which is operated by an NFC method using the frequency of 13.56 MHz among various RF-ID frequency ranges such as the frequency of 135 kHz, 13.56 MHz, 433 MHz, 860~960 MHz, 2.45 GHz and the like.

Figure 4:
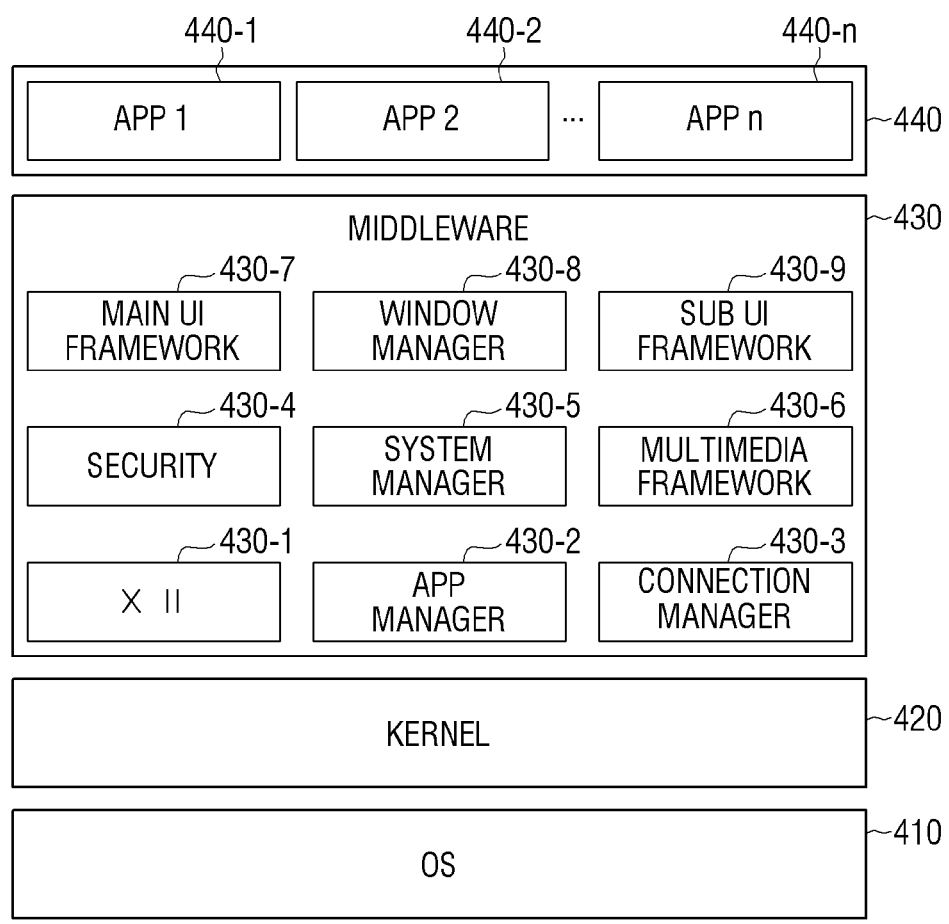
FIG. 4 is a view illustrating a configuration of software stored in the storage unit according to an exemplary embodiment.

The storage 250 may store various programs and data which are necessary to operate the user terminal device 200. To be specific, the storage 250 may store a program or data and the like for composing various screens which are displayed on a main area and a sub area. FIG. 4 is a view illustrating a configuration of software stored in the user terminal device 200. Referring to FIG. 4, the storage 250 may store software including an operation system (OS) 410, a kernel 420, a middleware 430, an application 440 and the like.

The OS 410 performs a function of controlling and managing an overall operation of hardware. In other words, the OS 410 takes charge of basic functions such as hardware management, memory, security and the like.

The kernel 420 is a channel which conveys various signals including a touch signal detected on the display 230 to the middleware 430.

The middleware 430 includes various software modules which control operations of the user terminal device 200. Referring to FIG. 4, the middleware 430 includes an X11 module 430-1, an app manager 430-2, a connection manager 430-3, a security module 430-4, a system manager 430-5, a multimedia framework 430-6, a UI framework 430-7, a window manager 430-8, and a writing recognition module 430-9.

The X11 module 430-1 is a module which receives various event signals from various kinds of hardware equipped on the user terminal device 200. Herein, an event may be set variously such as an event which detects a user's gesture, an event where a system alarm occurs, an event where a specific program is executed or ended, and the like.

The app manager 430-2 is a module which manages an execution condition of various applications 440 installed in the storage 250. When an application execution event is detected from the X11 module 430-1, the app manager 430-2 calls and executes an application corresponding to the event.

The connection manager 430-3 is a module which supports a wire or wireless network connection. The connection manager 430-3 may include various detail modules such as a DNET module, a universal plug-and-play (UPnP) module and the like.

The security module 430-4 is a module which supports a certification, a permission, a secure storage and the like related to hardware.

The system manager 430-5 monitors the condition of each of elements in the user terminal device 200, and provides the monitoring result to other modules. For example, when the remaining battery life is insufficient, when an error occurs, when a communication connection is broken, or the like, the system manager 430-5 may provide the monitoring result to the main UI framework 430-7 or the sub UI framework 430-9, and output a notification message or a notification sound.

The multimedia framework 430-6 is a module for playing a multimedia content which is stored in the user terminal device 200 or provided from an external source. The multimedia framework 430-6 may include a player module, a camcorder module, a sound process module and the like. Accordingly, an operation which plays various multimedia contents, and then generates and plays a screen and a sound may be performed.

The main framework 430-7 is a module for providing various UIs which are displayed in a main area of the display 230, and the sub UI framework 430-9 is a module for providing various UIs which are displayed in a sub area of the display 230. The main UI framework 430-7 and the sub UI framework 430-9 may include an image compositor module which composes various objects, a coordinate synthesizer which calculates a coordinate where an object is displayed, a rendering module which renders the composed object to the calculated coordinate, a 2D/3D UI toolkit which provides a tool to compose a UI in a shape of 2D or 3D and the like.

The window manager 430-8 may detect a touch event using a user's body or a pen, or other input event. When these events are detected, the window manager 430-8 conveys an event signal to the main UI framework 430-7 or the sub UI framework 430-9, and performs an operation corresponding to an event.

When a user touches or drags a screen, various program modules such as a writing module for drawing a line according to a path of drag, an angle calculation module for calculating a pitch angle, a roll angle, a yaw angle and the like based on a sensor value detected by a movement detector 282 may be stored.

An application module 440 includes applications 440-1~440-n for supporting various functions. For example, a program module for providing various services such as a navigation program module, a game module, an e-book module, a calendar module, a notification management module and the like may be included. These applications may be installed as a default, or a user may install and use these applications randomly during a process of use. When an object is selected, a main CPU 294 may execute an application corresponding to a selected object using the application module 440.

The configuration of software illustrated in FIG. 4 is one of the examples, and it is not limited thereto. Accordingly, some of the elements may be omitted, changed, or added if it is necessary. For example, the storage may additionally include various programs such as a sensing module for analyzing signals sensed by various sensors, a messaging module such as a messenger program, a short message service (SMS) and multimedia message service (MMS) program, an e-mail program and the like, a call info aggregator program module, a VoIP module, a web browser module and the like.

Referring to FIG. 2, the audio processor 260 is an element which performs a process related to audio data of an image content. The audio processor 260 may perform various processes such as decoding, amplifying, noise filtering and the like regarding audio data. The audio data processed by the audio processor may be outputted to an audio outputter 270.

The audio outputter 270 is configured to output various kinds of audio data where various process operations such as decoding, amplifying or noise filtering are performed by the audio processor 260, and also various notification sounds and voice messages. In particular, the audio outputter 270 may be realized as a speaker, but this is only one example, and it may be realized as an output terminal which outputs audio data.

The detector 280 detects various user interactions. In particular, as illustrated in FIG. 2, the detector 280 may include the first touch detector 281, the second touch detector 282, a movement detector 283, and a bending detector 284.

To be specific, the first touch detector 281 may detect a touch interaction of a user using a touch panel attached to the back side of a display panel. The second touch detector 282 may be located in the bezel unit 235 and detect a touch interaction of a user. Herein, the first touch detector 281 may be realized as a touch sensor with a blackout method or a decompression method, and the second touch sensor 282 may be realized as a touch sensor with a proximity method. However, this is only one example and the first touch detector 281 and the second touch detector 282 may be realized as various touch sensors.

The second touch detector 282 may be located in an overall area of the bezel unit 235, but this is only one example, and it may be located only in a partial area (for example, a corner area).

Figure 3B:
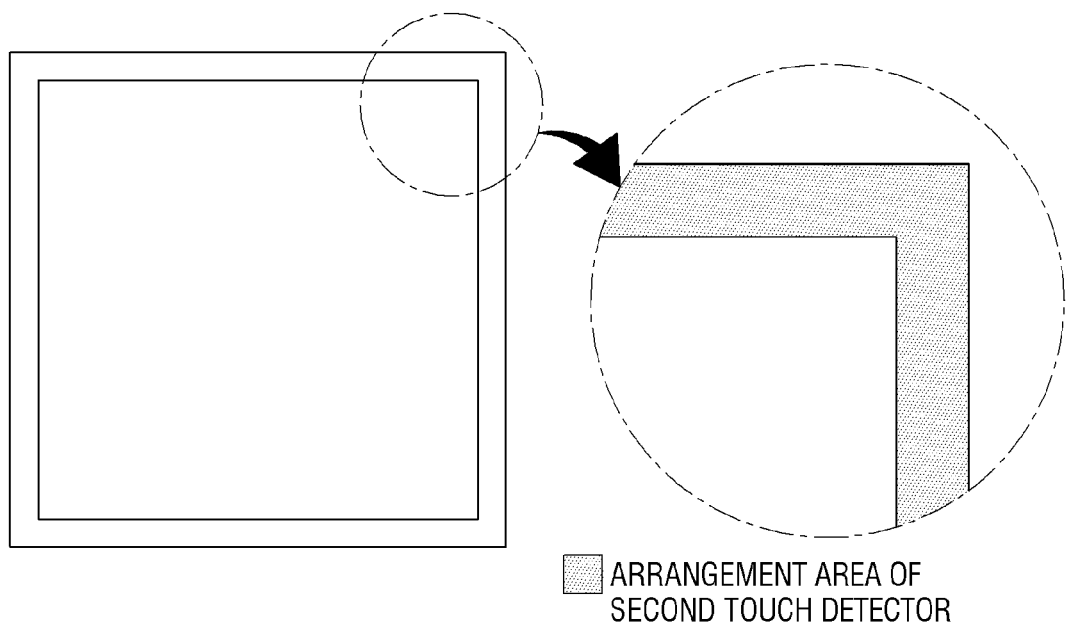
Figure 3C:
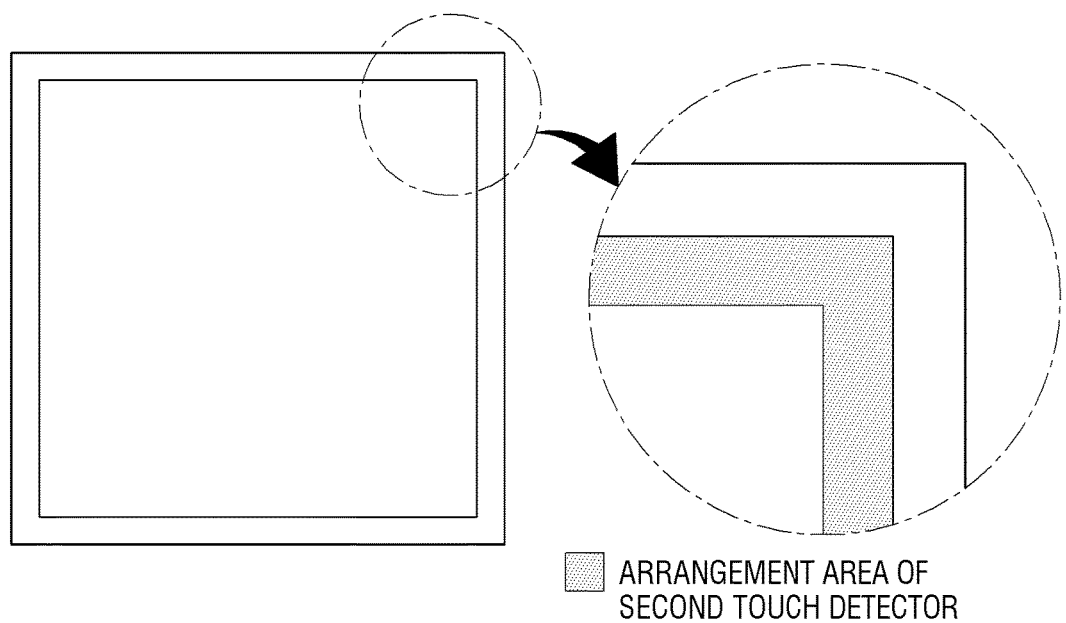
Figure 3D:
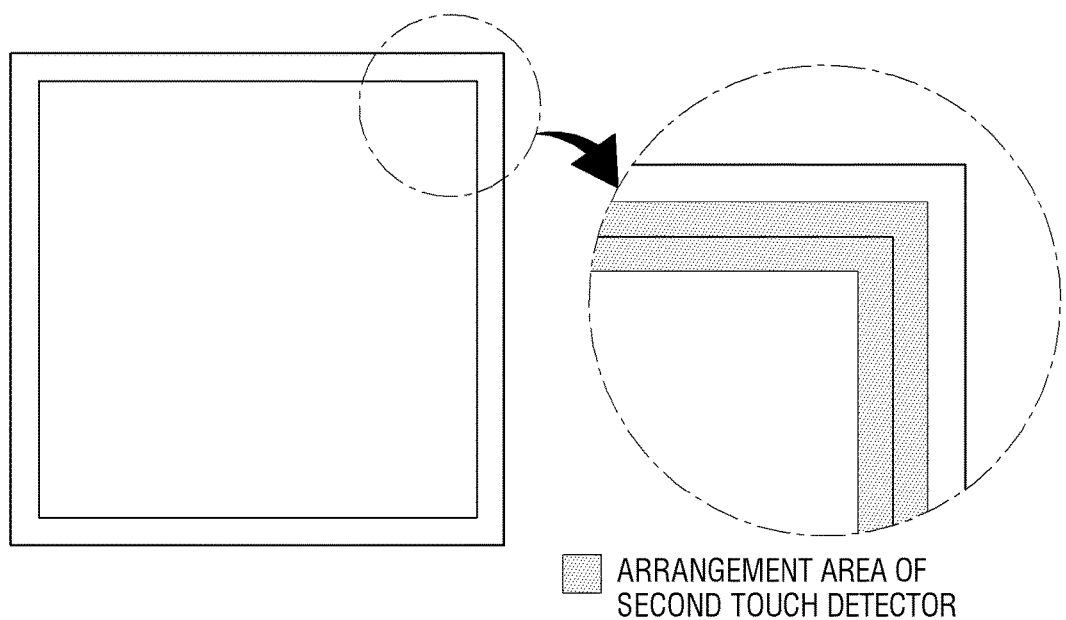

As illustrated in FIG. 3B, the second touch detector 282 may be located only in a bezel unit 235, but this is only one example. As illustrated in FIG. 3C, the second touch detector 282 may be located on the border of the display 230 which adjoins the bezel unit 235, and as illustrated in FIG. 3D, the second touch detector 282 may be located throughout the bezel unit 235 and the display 230. When the display 230 is a flexible display, as illustrated in FIG. 2, the second touch detector 282 may be located in an area which is different in elevation from the display 230.

The movement detector 283 may detect a movement (for example, a rotation movement, etc.) of the user terminal device 200 using at least one of an acceleration sensor, a magnetic sensor and a gyro sensor. The bending detector 284 may detect whether the user terminal device 200 is folded and detect at least one of the folded angles based on a bending line using a bending sensor, an illuminance sensor and the like. Herein, the bending detector 283 may be located on a folding line.

The controller 290 controls an overall operation of the user terminal device 200 using various programs stored in the storage 250.

As illustrated in FIG. 2, the controller 290 includes a random access memory (RAM) 291, read-only memory (ROM) 292, a graphic processor 294, a main central processing unit (CPU) 293, the first to nth interfaces (295-1~295-n), and a bus 296. Herein, the RAM 291, the ROM 292, the graphic processor 294, the main CPU 293, the first to nth interfaces 295-1~295-n and the like may be connected to each other through the bus 296.

An instruction set for a system booting and the like is stored in the ROM 292. If a turn-on instruction is inputted and a power is supplied, the main CPU 293 copies an OS stored in the storage to the RAM 291 according to an instruction stored in the ROM 292, executes the OS and boots up a system. If the booting is completed, the main CPU 293 copies various application programs stored in the storage 250 to the RAM 291, executes the application program which is copied to the RAM 291, and performs various operations.

The graphic processor 293 generates a screen including various objects such as an item, an image, a text and the like using a calculation unit (not illustrated) and the rendering unit (not illustrated). The calculation unit calculates an attribute value such as a coordinate value, a shape, a size, a color and the like where each of the objects are displayed according to a layout of a screen using a control instruction received from the detector 280. The rendering unit generates a screen with various layouts including an object based on an attribute value calculated by the calculation unit. A screen generated by the rendering unit is displayed in a display area of the display.

The main CPU 293 may access to the storage 250, and perform a booting using an OS stored in the storage 250. Also, the main CPU 293 performs various operations using various kinds of programs, contents, data and the like stored in the storage 250.

The first to nth interfaces (295-1 to 295-n) are connected with various elements described above. One of interfaces may be a network interface connected with an external apparatus through a network.

The controller 290 may control an overall operation of the user terminal device 200 according to a touch interaction of a user which is detected through the second touch detector 282.

<Distinction Between a Touch Interaction of the Display 230 and a Touch Interaction of the Bezel Unit 235>

In response to detecting a touch interaction which includes touching the bezel unit 235 via the second touch detector 282, the controller 290 may perform a different function according to an area of the bezel unit 235 where the touch interaction is detected.

Figure 5A:
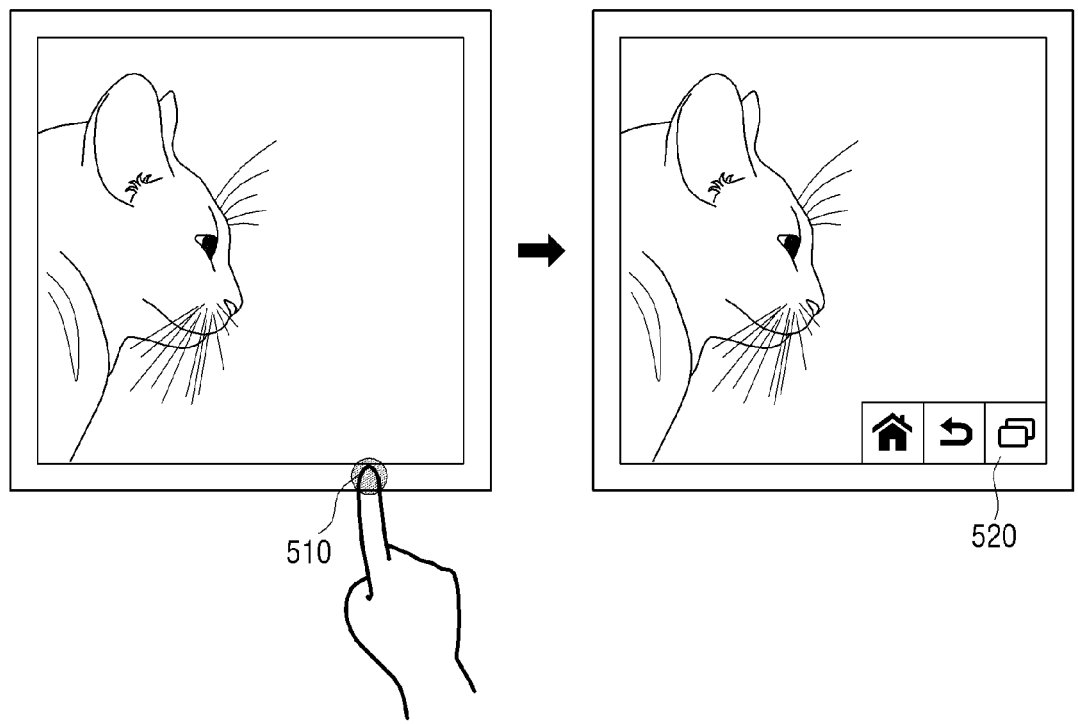

To be specific, as illustrated in the left side of FIG. 5A, in response to detecting a tap interaction 510 which includes tapping a bottom side of the bezel unit 235 while a gallery application which displays a picture content is executed, the controller 290 may control the display 230 to display a home menu 520 which is in the right-bottom area of the display 230 according to the tap interaction 510 as illustrated in the right side of FIG. 5A. Herein, when the user terminal device 200 is in a square shape, the bottom side of the bezel unit 235 may represent a bottom side based on an image content displayed on the display 230. Also, the home menu 520 displayed on the right-bottom side of the display may include a home icon, a back icon, an icon for seeing another window and the like.

Figure 5B:
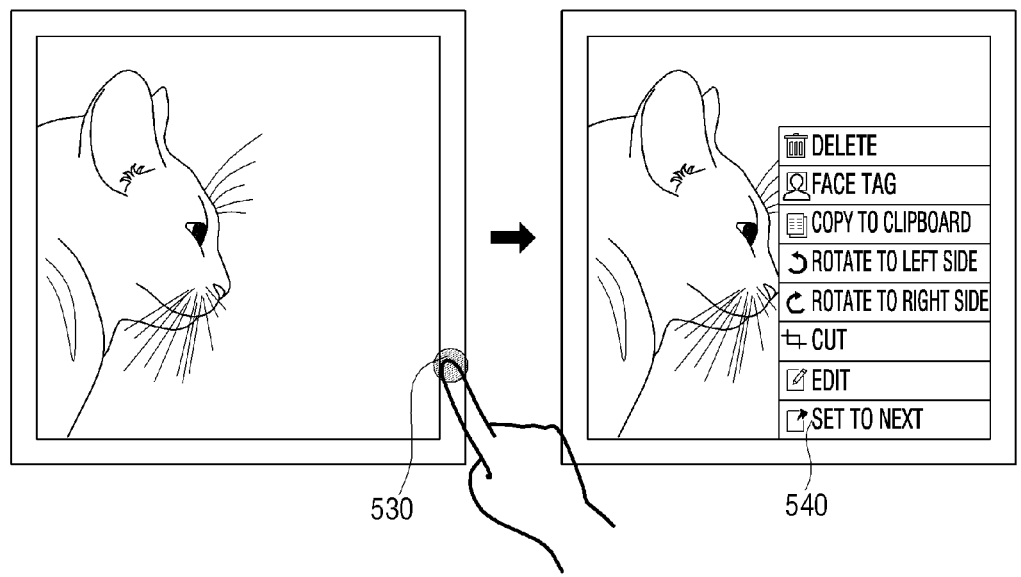

As illustrated in the left side of FIG. 5B, in response to detecting a tap interaction 530 which includes tapping the right side of the bezel unit 235 while a gallery application which displays a picture content is executed, the controller 290 controls the display 230 to display an edit menu 540 for editing a picture content in the right area of the display.

That is, as illustrated in FIGS. 5A and 5B, the controller 290 may control the display 230 to display a menu which performs a different menu according to a touched area in the bezel unit.

In response to detecting the first tap interaction which includes tapping the display 230, via the first touch detector 281, and in response to detecting the second tap interaction which includes tapping the bezel unit 235 via the second touch detector 282, the controller 290 may perform a different function, respectively.

Figure 6A:
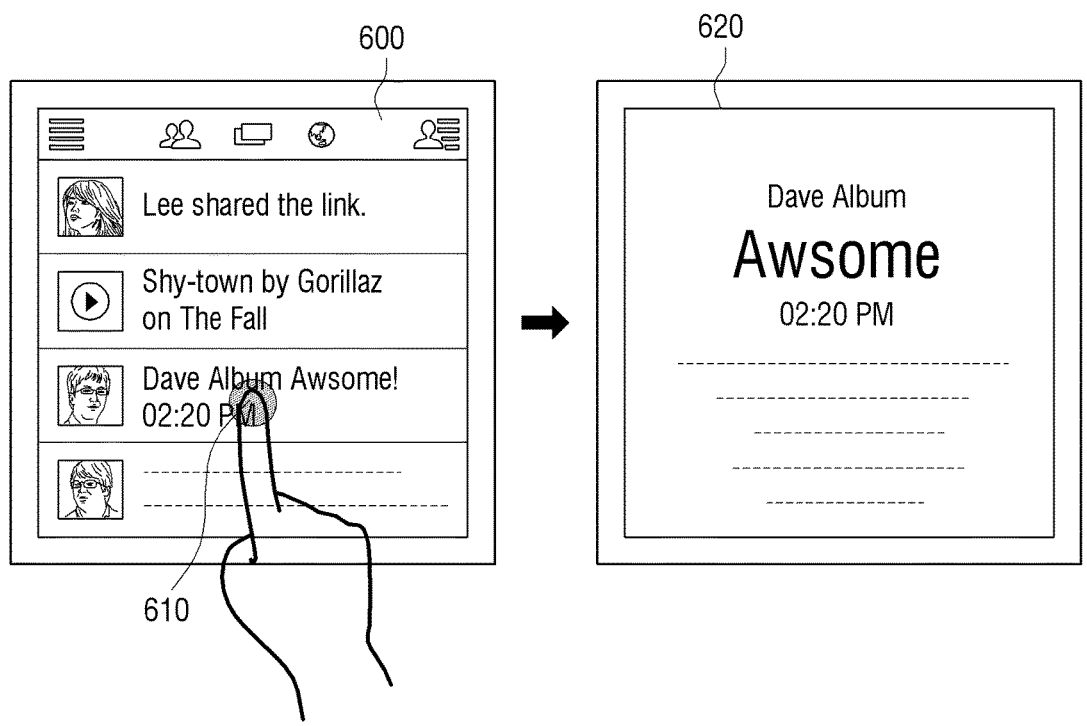

To be specific, as illustrated in the left side of FIG. 6A, in response to detecting a tap interaction 610 which includes tapping the first item while a screen 600 including a plurality of items is displayed, the controller 290 may control the display 230 to display a display screen 620 corresponding to the first item according to the tap interaction 610 as illustrated in the right side of FIG. 6A.

Figure 6B:
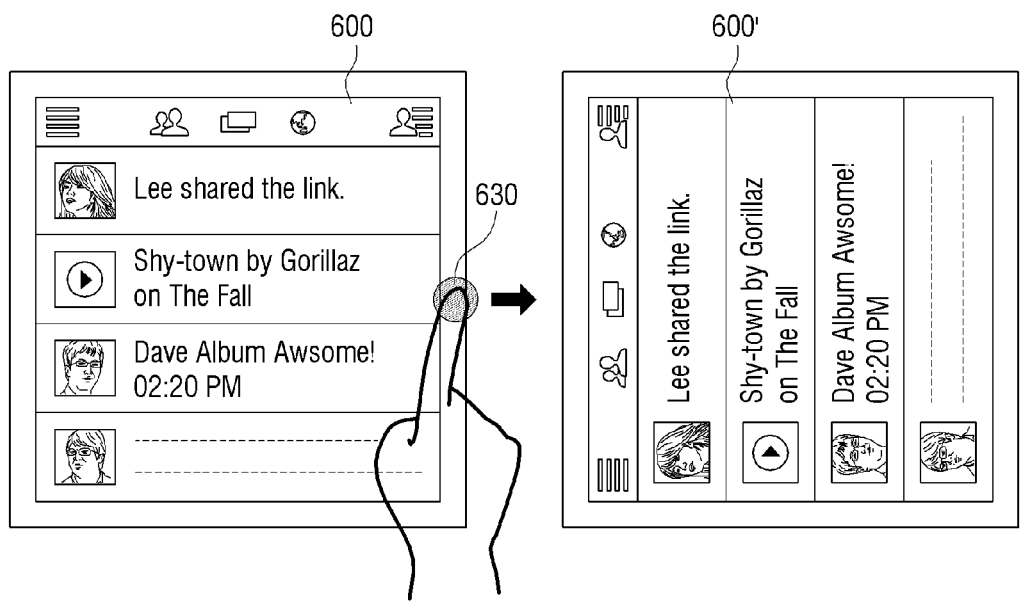

As illustrated in the left side of FIG. 6B, in response to detecting a tap interaction 630 which includes tapping the right side of the bezel unit 235 while the screen 600 including a plurality of items is displayed, the controller 290 may control the display 230 to display a screen 600' which rotates the screen 600 ninety degrees in a counterclockwise direction according to the tap interaction, as illustrated in the right side of FIG. 6B.

Figure 6C:
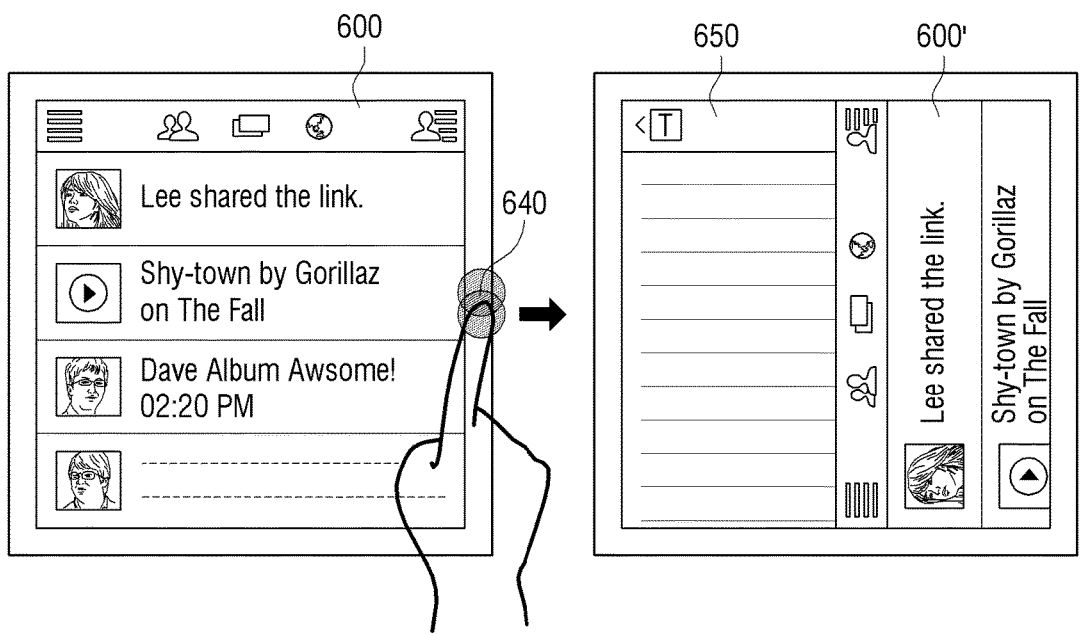
Figure 7:
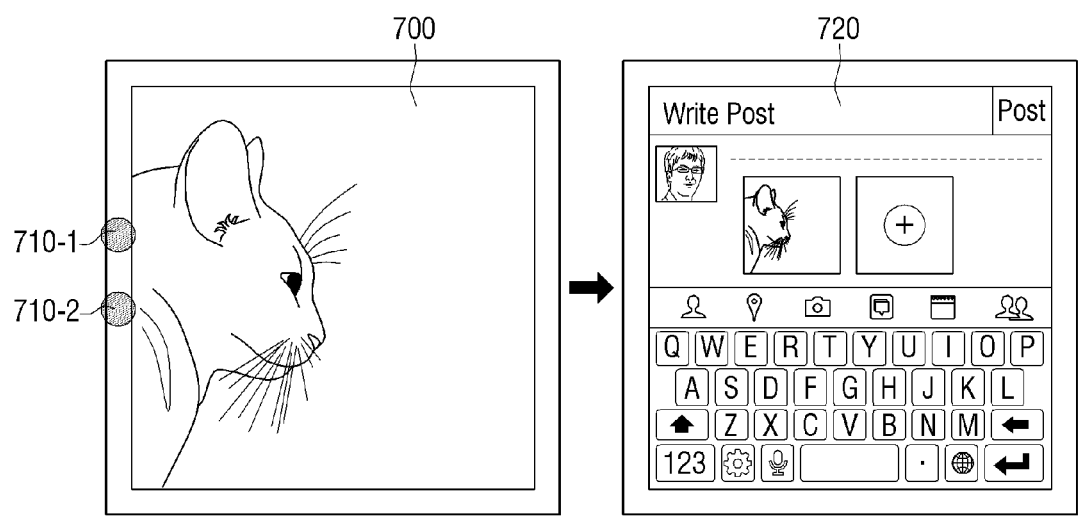

As illustrated in the left side of FIG. 6C, in response to detecting a tap interaction 640 which includes continually tapping the right side of the bezel unit 235 twice while the screen 600, which includes a plurality of items, is displayed, the controller 290 may control the display 230 to simultaneously display an execution screen 650 of an application related to an application which is currently executed and the screen 600' which rotates the screen 600 ninety degrees, in a counterclockwise direction according to a tap interaction 640, as illustrated at the right side of FIG. 6C.

In response to detecting a user interaction which includes touching a plurality of points of the bezel unit 235 while a specific application is executed, the controller 290 may perform a quick access function which is frequently used according to an application. For example, as illustrated at the left side of FIG. 7, in response to detecting a user interaction which includes simultaneously tapping two points 710-1, 710-2 on a left side of the bezel unit 235 while an execution screen 700 of a gallery application is displayed, the controller 290 may control the display 230 to display a window 720 for performing a social networking service (SNS) sharing function as illustrated at the right side of FIG. 7 to perform an SNS sharing function which is frequently used by a user when a gallery application is executed.

In response to detecting a drag interaction at the bezel unit 235 via the second touch detector 282, the controller 290 may explore content in an upper depth level (for example, the upper depth level of a folder unit) rather than the content in the current depth level at the time the drag interaction is detected in the display 230.

To be specific, as illustrated at the top of FIG. 8, in response to detecting a drag interaction 820 which includes touching a point on a bottom side of the bezel unit 235 via the second touch detector 282 while the first picture content 810 stored in the first folder of an gallery application is displayed, and then dragging in the left direction, as illustrated in the middle of FIG. 8, the controller 290 may control the display 230 to display a UI 830 where a thumbnail is displayed in a folder unit. Also, as illustrated at the bottom of FIG. 8, the controller 290 may control the display 230 to display the second picture content 840 stored in the second folder which is different from the first folder.

Figure 9A:
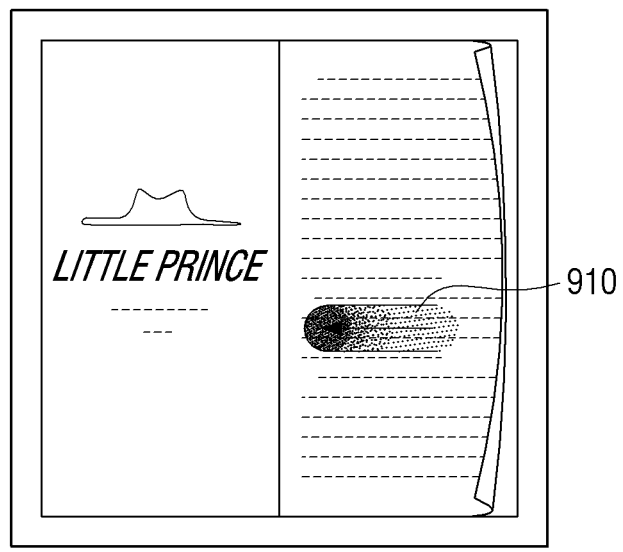

For another example, as illustrated in FIG. 9A, in response to detecting a drag interaction 910 which includes touching a point of the display 230 via the first touch detector 281, and then dragging the touched point in the left direction while an e-Book application is executed, the controller 290 may control the display 230 to display the next page according to a drag interaction 910. That is, in response to detecting the drag interaction 910 on the display 230, the controller 290 may convert a screen of an e-Book content into a page unit.

Figure 9B:
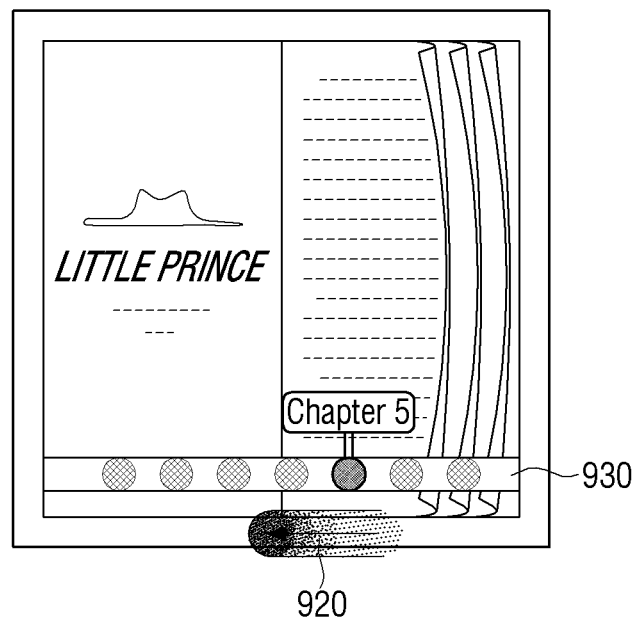

However, as illustrated in FIG. 9B, in response to detecting a drag interaction 920 which includes touching a point on the bezel unit 235 via the second touch detector 282 while an e-Book application is executed, and then dragging the touched point in the left direction, the controller 290 may control the display 230 to display a UI 930 which introduces a chapter of an e-Book content according to the drag interaction 920, and to display the first page of the next chapter. That is, in response to detecting a drag interaction 920 in the bezel unit 235, the controller 290 may convert a screen of the e-Book content to a chapter unit which is a level of depth above a page unit.

In response to detecting a drag interaction in the bezel unit 235 via the second touch detector 282, and in response to detecting a drag interaction in the display 230 via the first touch detector 281, the controller 290 may perform different functions, respectively.

Figure 10A:
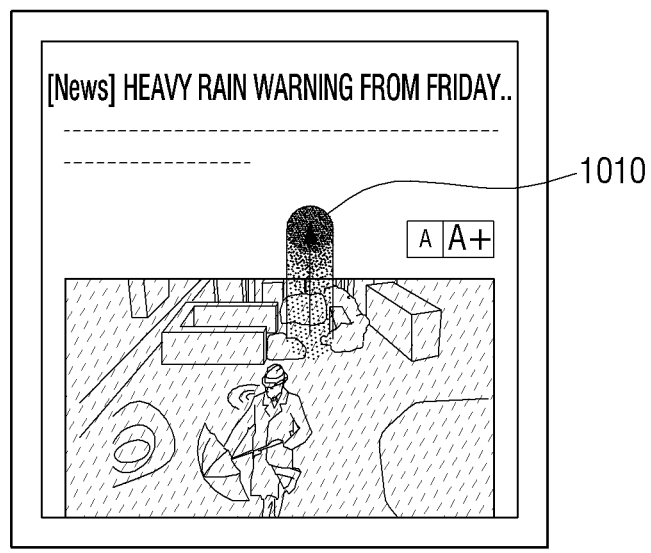

To be specific, as illustrated in FIG. 10A, in response to detecting a drag interaction 1010 which includes touching a point of the display 230, via the first touch detector 281, while a news content is displayed, and then dragging the touched point in the upper direction, the controller 290 may control the display 230 to scroll the new content in the downward direction within an identical news content according to the drag interaction 1010.

Figure 10B:
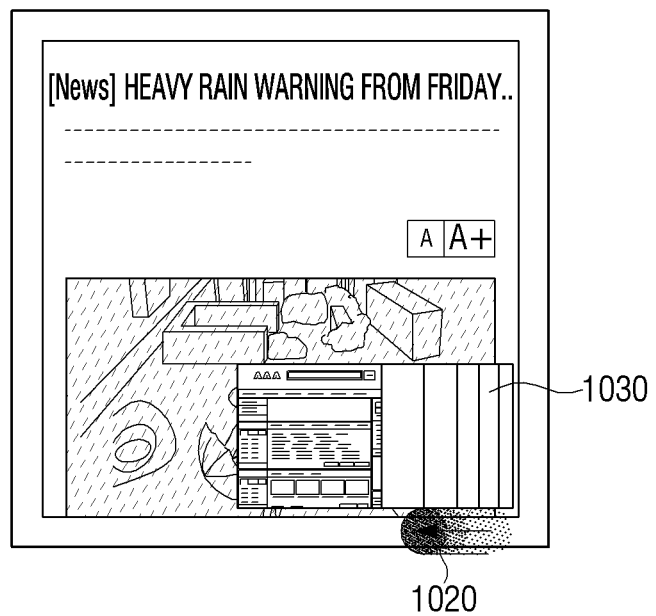

In response to detecting a drag interaction 1020 which includes touching a point on a bottom side of the bezel unit 235, via the second touch detector 282, while a news content is displayed, the controller 290 may control the display 230 to display a history UI 1030 including a web page that a user recently visited, as illustrated in FIG. 10B. When one of a plurality of web pages included in the history UI 1030 is selected, the controller 290 may control the display 230 to display a selected web page on an entire screen.

Figure 10C:
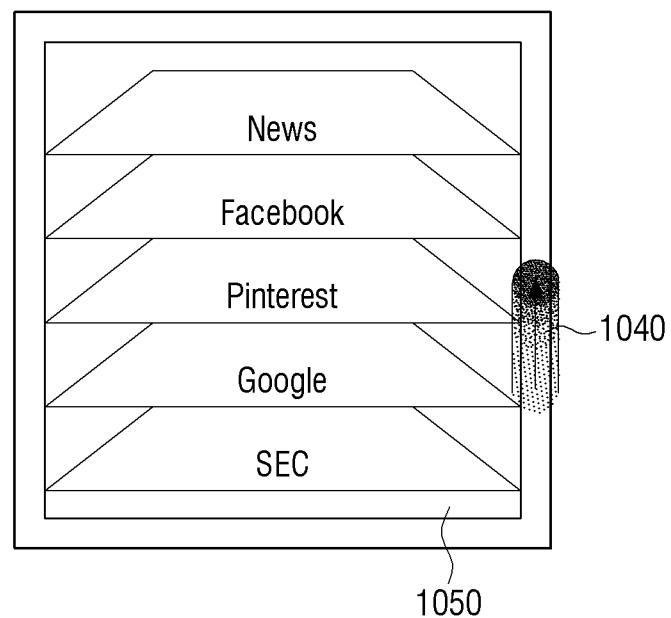

In response to detecting a drag interaction 1040 which includes touching a point on a right side of the bezel unit 235, via the second touch detector 282, while a news content is displayed, the controller 290 may control the display 230 to display a browsing UI 1050 where applications which are executed currently are able to be browsed according to the drag interaction 1040 as illustrated in FIG. 10C. Herein, when one of a plurality of applications included in the browsing UI 1050 is selected, the controller 290 may control the display 230 to display an execution screen of the selected application on an entire screen.

Figure 11A:
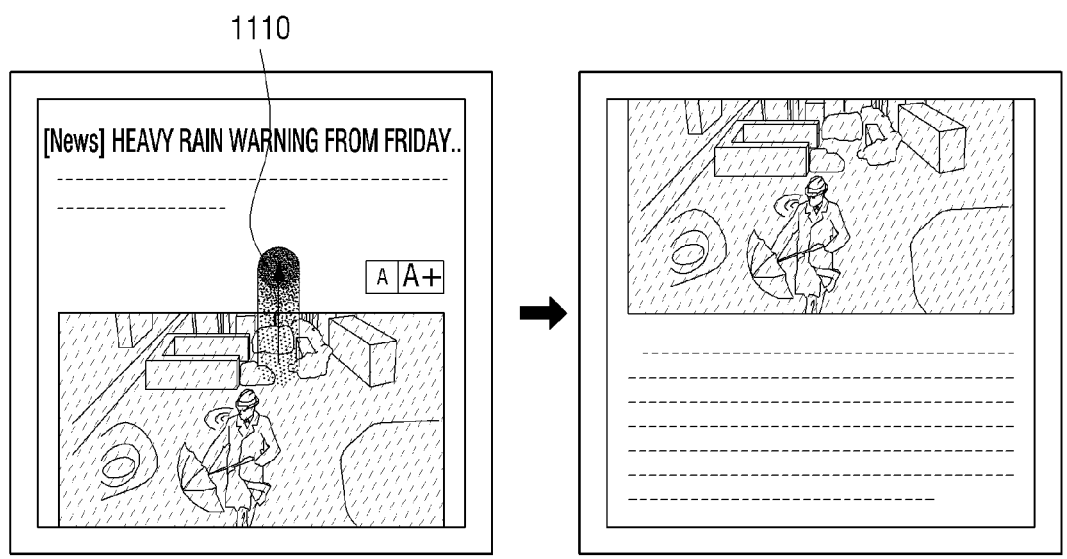

As another exemplary embodiment, as illustrated at the right side of FIG. 11A, in response to detecting a flick interaction 1110 which flicks a point of the display 230 in the upper direction, via the first touch detector 281, while an execution screen of a news application is displayed, the controller 290 may control the display 230 to scroll an execution screen of an identical news application in the downward direction according to the drag interaction 1110.

Figure 11B:
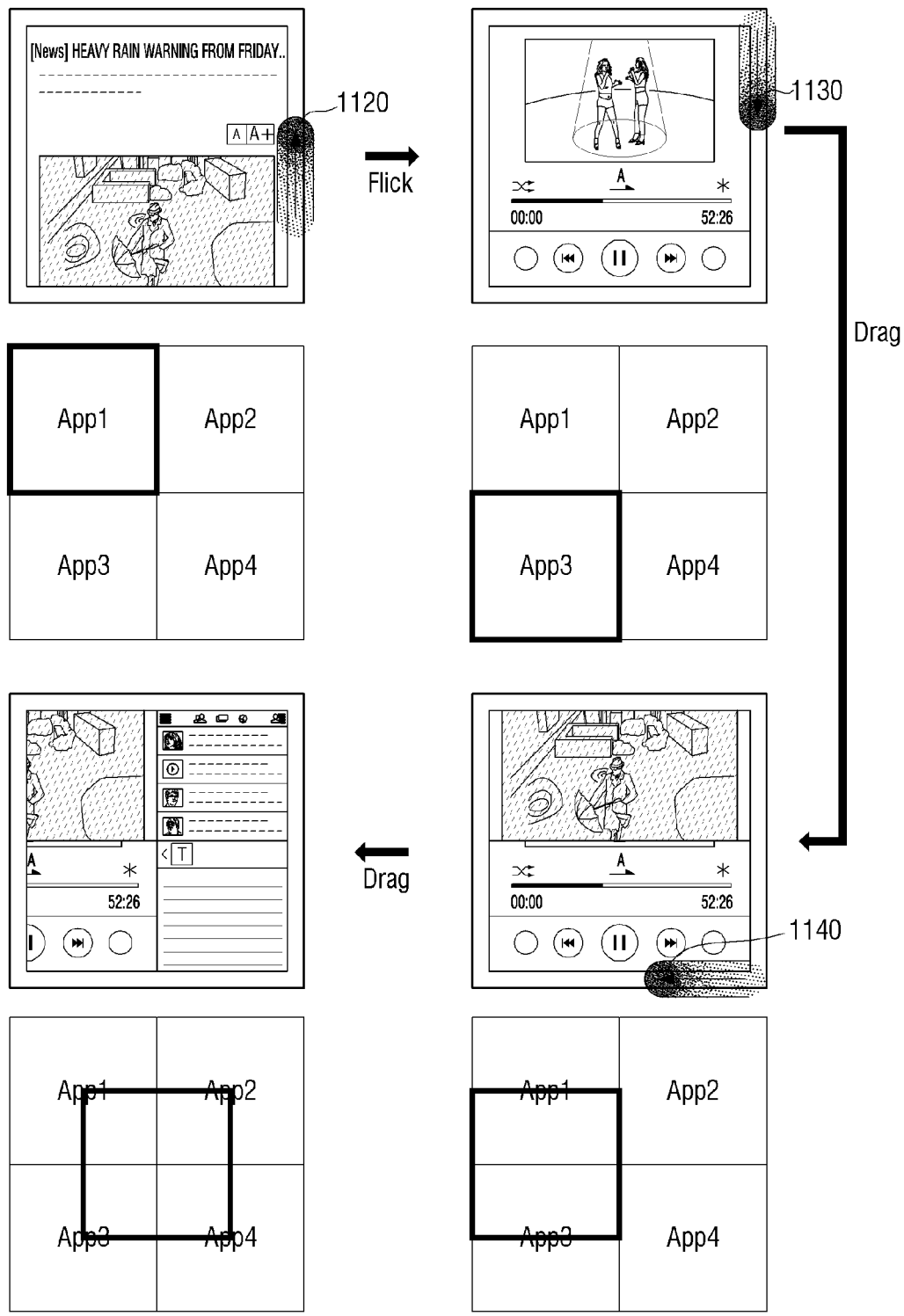

However, as illustrated in the right-upper side of FIG. 11B, in response to detecting a flick interaction 1120 which includes flicking a point on a right side of the bezel unit 235 in the upper direction, via the second touch detector 282 while an execution screen of a news application is displayed through the first application, the controller 290 may control the display 230 to display an execution screen of a music application which is the third application according to the flick interaction 1120 as illustrated in the right-upper side of FIG. 11B. That is, the controller 290 may convert an execution screen between applications which are executed currently using the flick interaction 1120.

In response to detecting a drag interaction 1130 which includes touching a point on a right side of the bezel unit 235, via the second touch detector 282, while an execution screen of a music application which is the third application is displayed, and then dragging the touched point in the downward direction, the controller 290 may control the display 230 to move an execution screen of a music application in the downward direction so that the execution screen of the music application is displayed with an execution screen of a news application according to the drag interaction 1130 as illustrated in the right-bottom area of FIG. 11B. Also, in response to detecting a drag interaction which includes touching a point on the bottom side of the bezel unit 235, via the second touch detector 282, and then dragging the touched point in the left direction while a part of an execution screen of the news application and a part of an execution screen of the music application are displayed together, the controller 290 may control the display 230 to move a part of the execution screen of the music application and a part of the execution screen of the news application in the left direction so that a part of an execution screen of an SNS application which is the third application and a part of an execution screen of a memo application which is the fourth application are displayed together according to the drag interaction 1140 as illustrated in the left-bottom side of FIG. 11B. That is, the controller 290 may move a screen according to an amount of dragging performed during the drag interactions 1130, 1140, display an execution screen regarding a plurality of applications, and perform multitasking related to a plurality of applications.

In response to detecting a pinch interaction in the bezel unit 235 via the second touch detector 282, the controller 290 performs a function different from a function which is performed in response to detecting a pinch interaction in the display 230 via the first touch detector 281.

Generally, in response to detecting a pinch-in interaction where two points of the display 230 are touched, via the first touch detector 281, while a picture content is displayed, and then two touched points become closer, or in response to detecting a pinch-out interaction where two points of the display 230 are touched, via the first touch detector 281, while a picture content is displayed, and then two touched points are moved farther away from each other, the controller 290 may zoom in or zoom out the picture content according to the pinch-in interaction or the pinch-out interaction.

Figure 12:
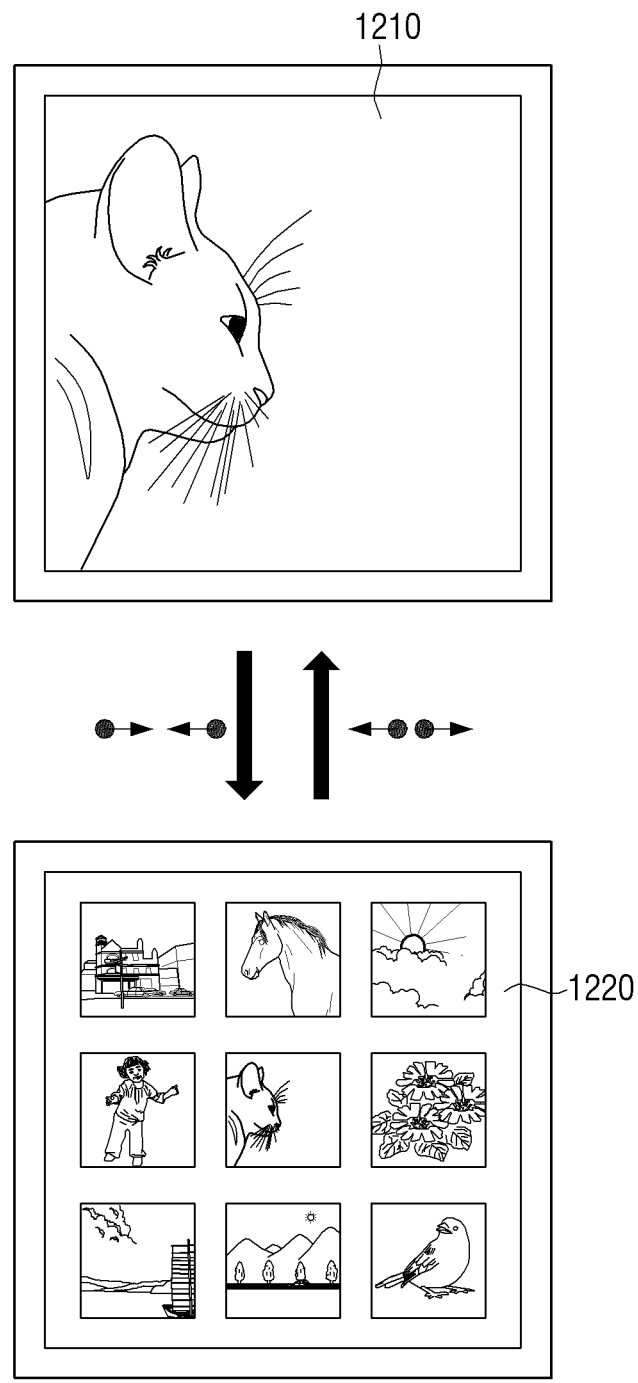

However, as illustrated at the top of FIG. 12, in response to detecting a pinch-in interaction where two points of the bezel unit 235 are touched, via the second touch detector 282, while a picture content 1210 is displayed, the controller 290 may control the display 230 to display a folder screen 1220 including the picture content as illustrated at the bottom of FIG. 12. Also, as illustrated at the bottom of FIG. 12, in response to detecting a pinch out interaction where two points of the bezel unit 235 are touched, via the second touch detector 282, while a folder screen is displayed, and then the two touched points being moved farther apart, the controller 290 may control the display 230 to display the picture content 1210.

The controller 290 may touch at least one point of the bezel unit 235 and select or fix a partial area of the display 230.

To be specific, as illustrated in FIG. 13A, in response to detecting a drag interaction 1320 which includes touching the first point 1310 of the bezel unit 235 while the first thumbnail image to the ninth thumbnail image 1310-1 to 1310-9 are displayed, the controller 290 may fix the first thumbnail image 1310-1, the fourth thumbnail image 1310-4 and the seventh thumbnail image 1310-7 included in the first row corresponding to the first point 1310, and change a plurality of thumbnail images 1310-2, 1310-3, 1310-5, 1310-6, 1310-8, 1310-9 displayed in the second row and the third row to other thumbnail images 1320-1 to 1320-6. That is, in response to detecting a drag interaction after touching the first point 1310 of the bezel unit 235 corresponding to the first row, the controller 290 may fix a thumbnail image displayed in the first row and change a thumbnail image displayed in the other rows to other thumbnail images.

In response to detecting a drag interaction 1340 which includes touching two points 1330-1, 1330-2 of the bezel unit 235, touching a bottom area of a picture content and then dragging the touched point in the left direction while an editing screen for editing the picture content is displayed as illustrated at the top of FIG. 13B, the controller 290 may control the display 230 to maintain a previous setting value in the first area 1350 selected by two points 1330-1, 1330-2, and to process and display the second area 1360 by applying a different setting value to the second area 1360 than that which is applied to the first area 1350, as illustrated in the bottom of FIG. 13B.

Figure 14A:
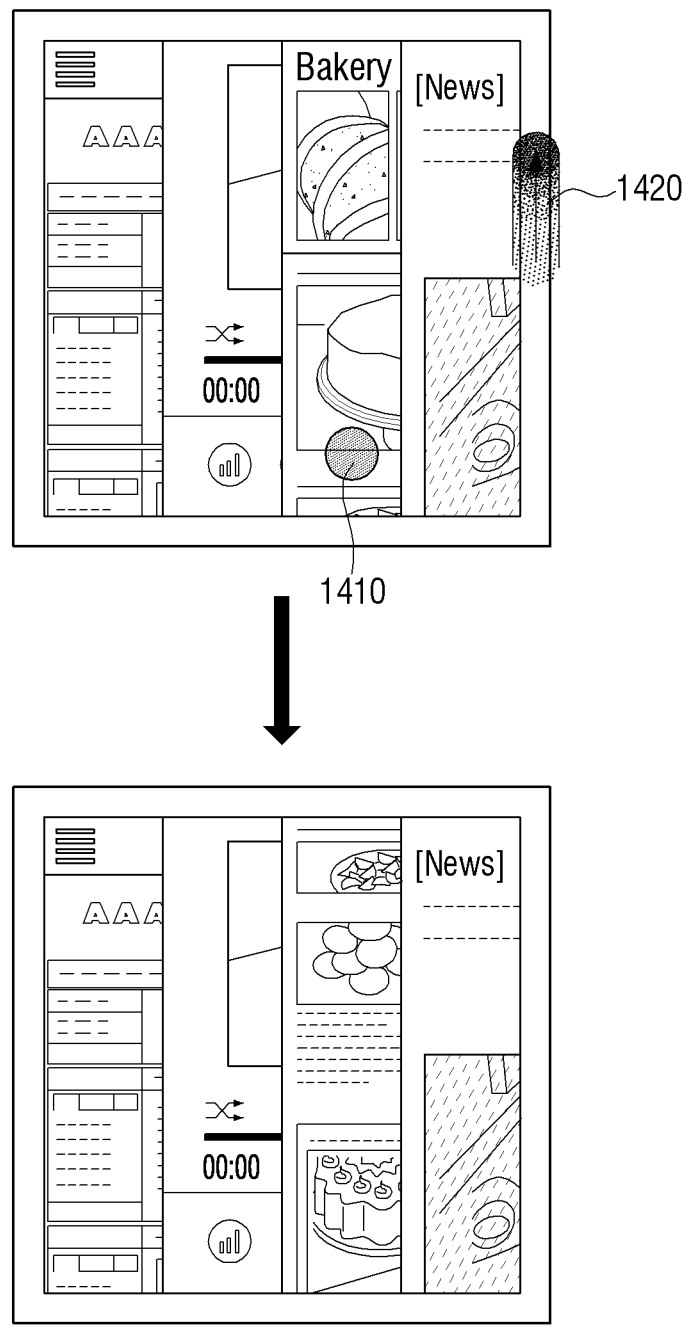

As illustrated in FIG. 14A, in response to detecting a drag interaction 1420 which includes touching a point 1410 of the third application while the first application to the fourth application are displayed simultaneously, touching a right side of the bezel unit 235, and then dragging the touched side in an the upper direction, the controller 290 may control the display 230 to fix the first application, the second application and the fourth application, and to scroll the third application to the upper direction.

Figure 14B:
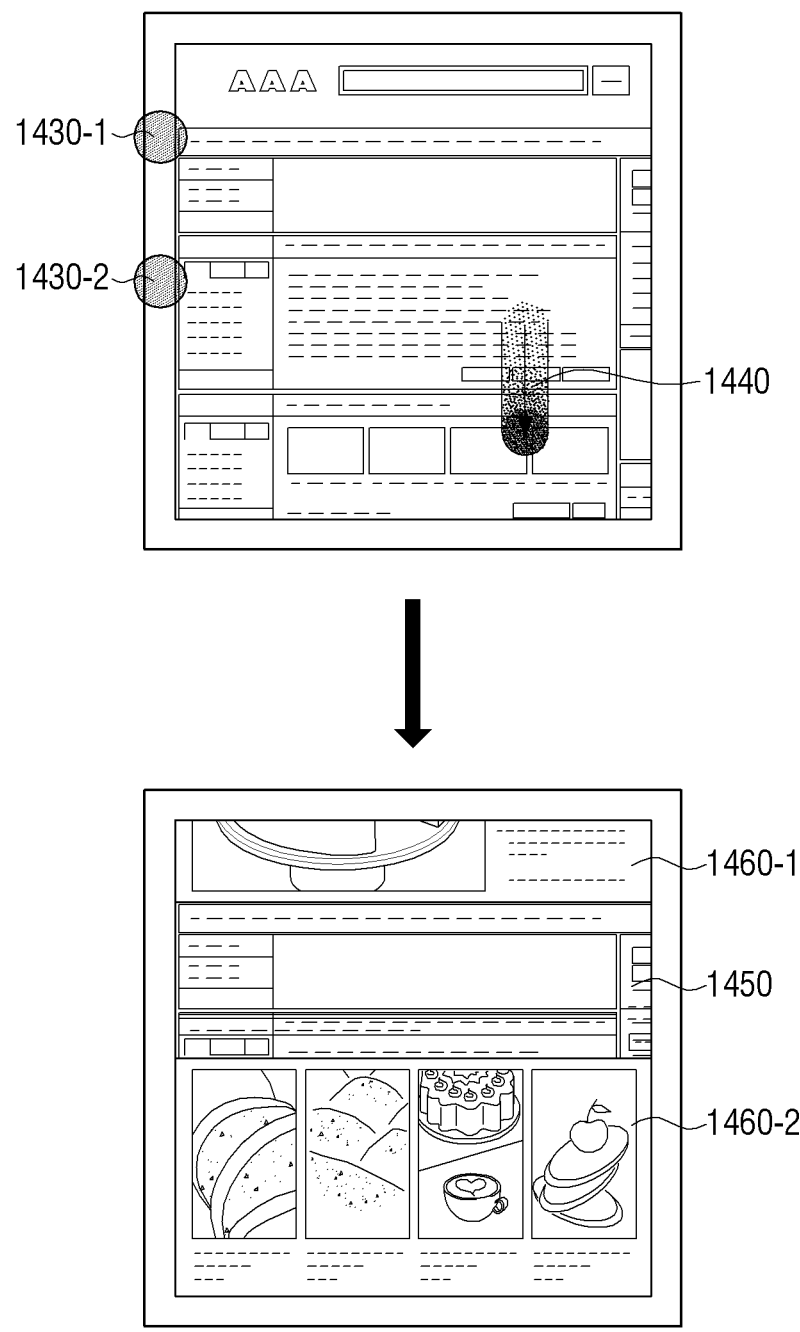

In response to detecting a drag interaction 1440 which includes touching two points 1430-1, 1430-2 of the bezel unit 235, touching a bottom area of a web page, and then dragging the touched area in the downward direction while the web page is displayed as illustrated at the top of FIG. 14B, the controller 290 may control the display 230 to maintain the first area 1450 selected by two points 1430-1, 1430-2 as it is, and scroll the other areas 1460-1, 1460-2 according to the drag interaction 1440.

<A Multi Touch Interaction Inputted to a Plurality of Sides of the Bezel Unit 235>

When two points of the bezel unit 290 are touched, the controller 290 may control the display 230 to divide a display screen into a plurality of areas using two touched points and display a different image on a plurality of areas.

Figure 15A:
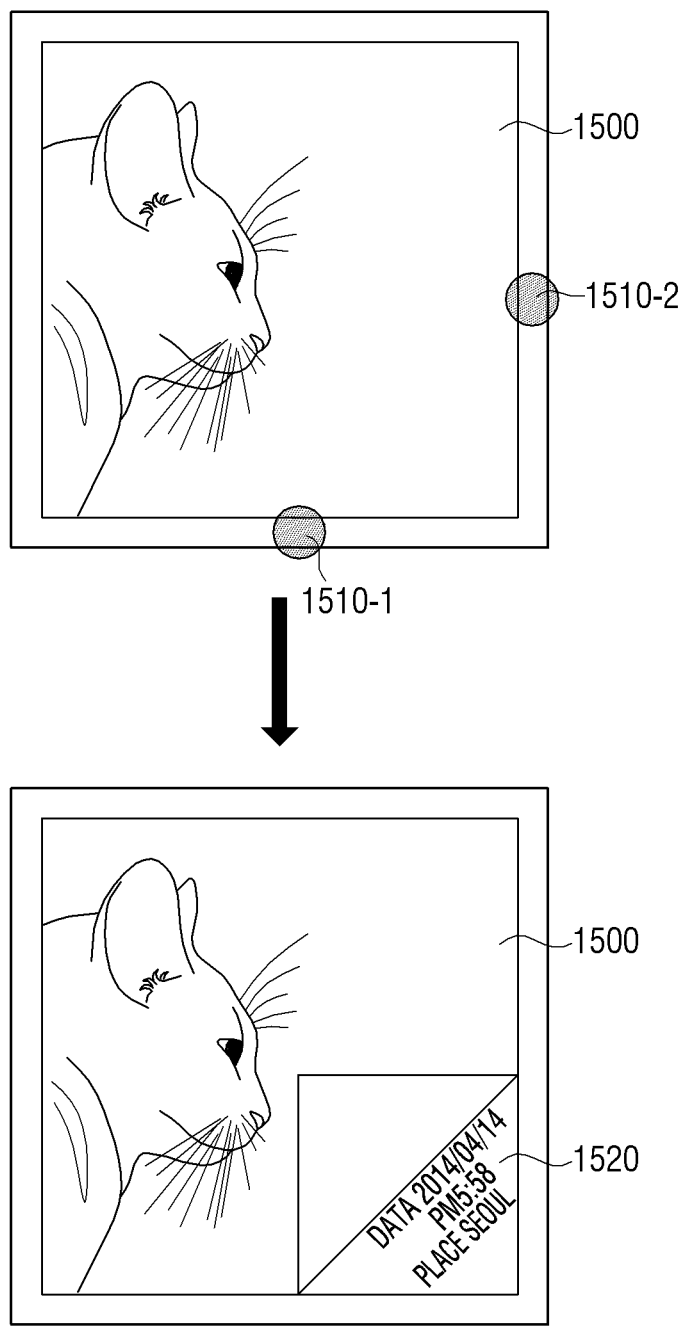

To be specific, as illustrated at the top of FIG. 15A, in response to detecting a touch interaction which includes touching the first point 1510-1 on a bottom side and the second point 1510-2 on a right side of the bezel unit 235 for a predetermined time while a picture content 1500 is displayed, the controller 290 may control the display 230 to display a UI 1520 which introduces detail information of the picture content 1500 on a corner area defined by the first point 1510-1 and the second point 1510-2. Herein, as illustrated in FIG. 15A, the controller 290 may control the display to display a UI 1520 where the picture content 1500 is folded by a touch interaction which includes touching the first point 1510-1 and the second point 1510-2 and detail information of the picture content 1500 is introduced.

Figure 15B:
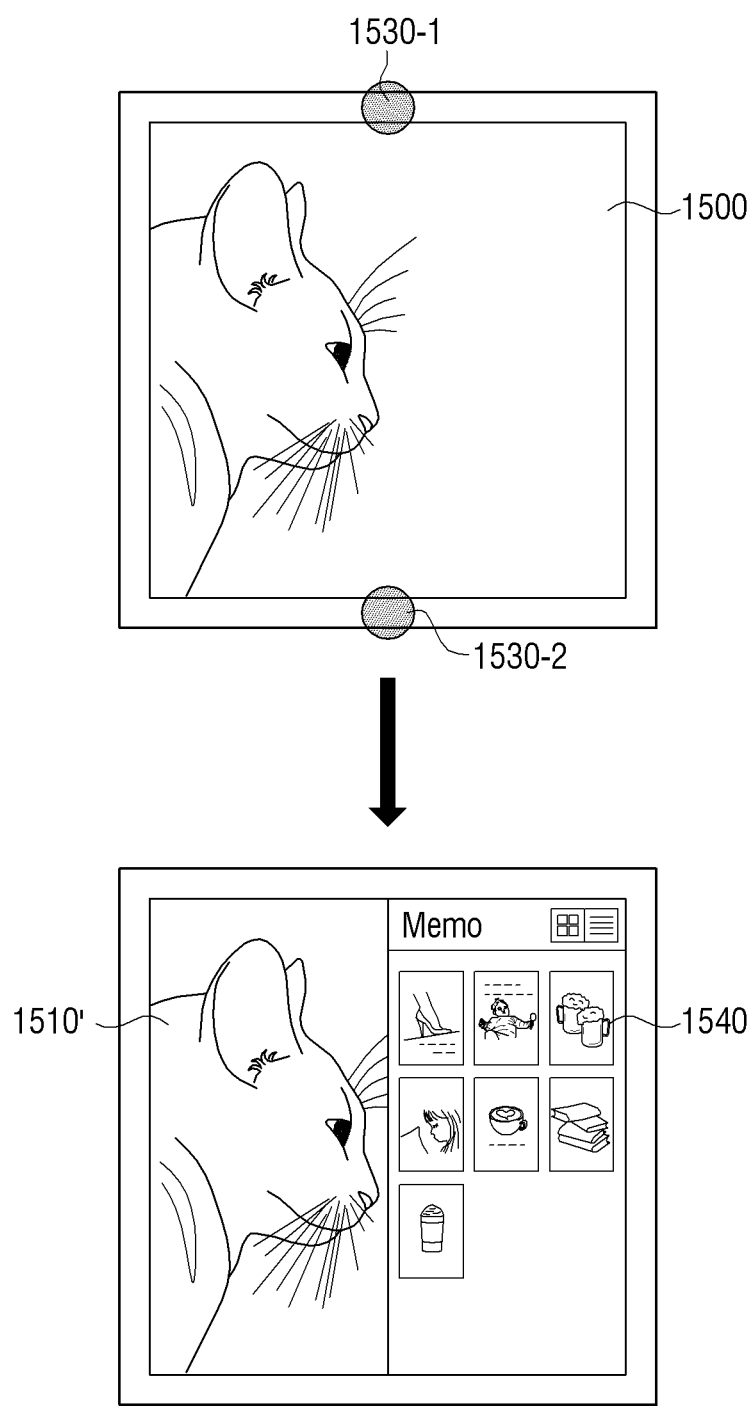

As illustrated at the top of FIG. 15B, in response to detecting a touch interaction which includes touching the first point 1530-1 on an upper side and the second point 1530-2 of a bottom side of the bezel unit 235 for a predetermined time while the picture content 1500 is displayed, the controller 290 may control the display 230 to divide a display screen into two screens based on the locations of the first point 1530-1 and the second point 1530-2, to display a part 1510' of the picture content 1500 on the first area, and to display an execution screen of a memo application related to the picture content on the second area. That is, the controller 290 may enter into a multitasking mode through a touch interaction which includes touching a plurality of points of the bezel unit 235.

Figure 16:
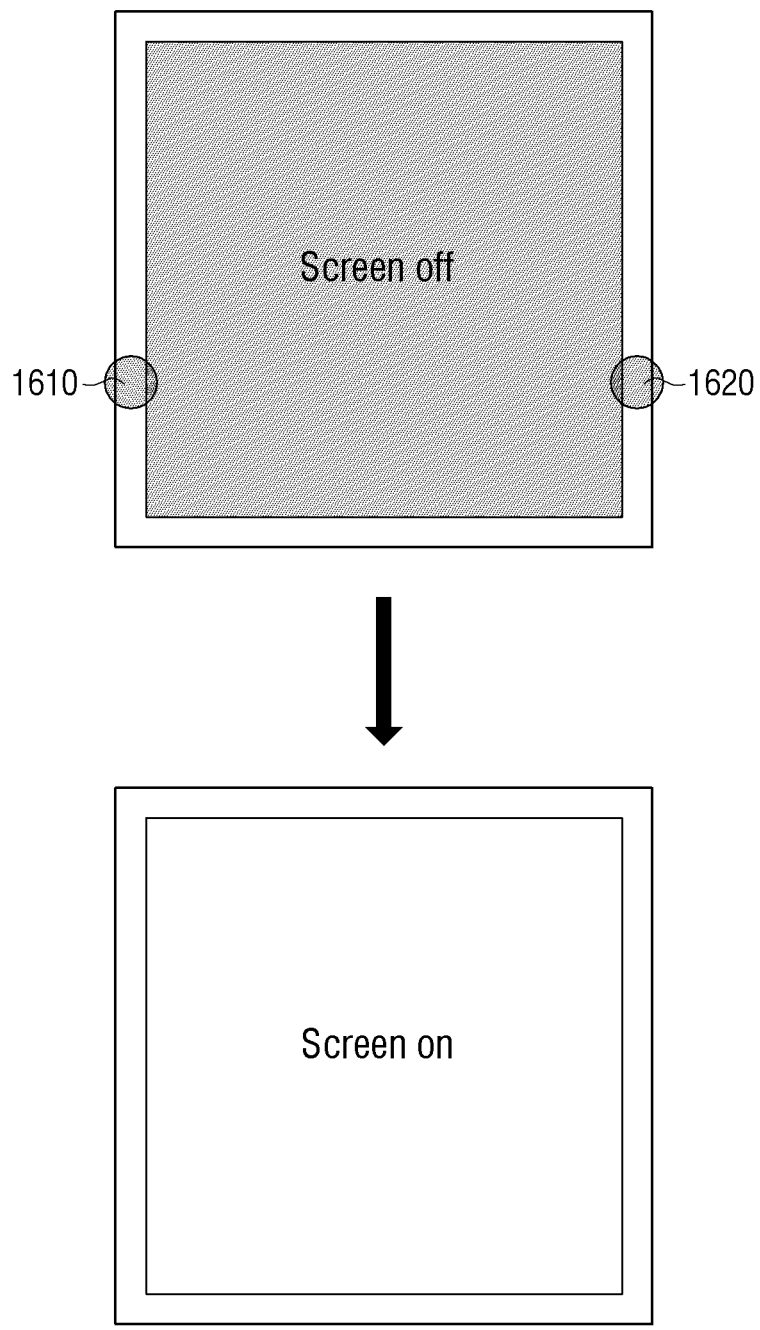

As illustrated in the top of FIG. 16, in response to detecting a touch interaction which includes touching two points 1610, 1620 of the bezel unit 235, via the second touch detector 282, for a predetermined time while a display screen is turned off, the controller 290 may control the display 230 to turn on the display screen as illustrated in the bottom of FIG. 16. That is, a power control of the display may be performed through a multi touch of the bezel unit 235.

Figure 17:
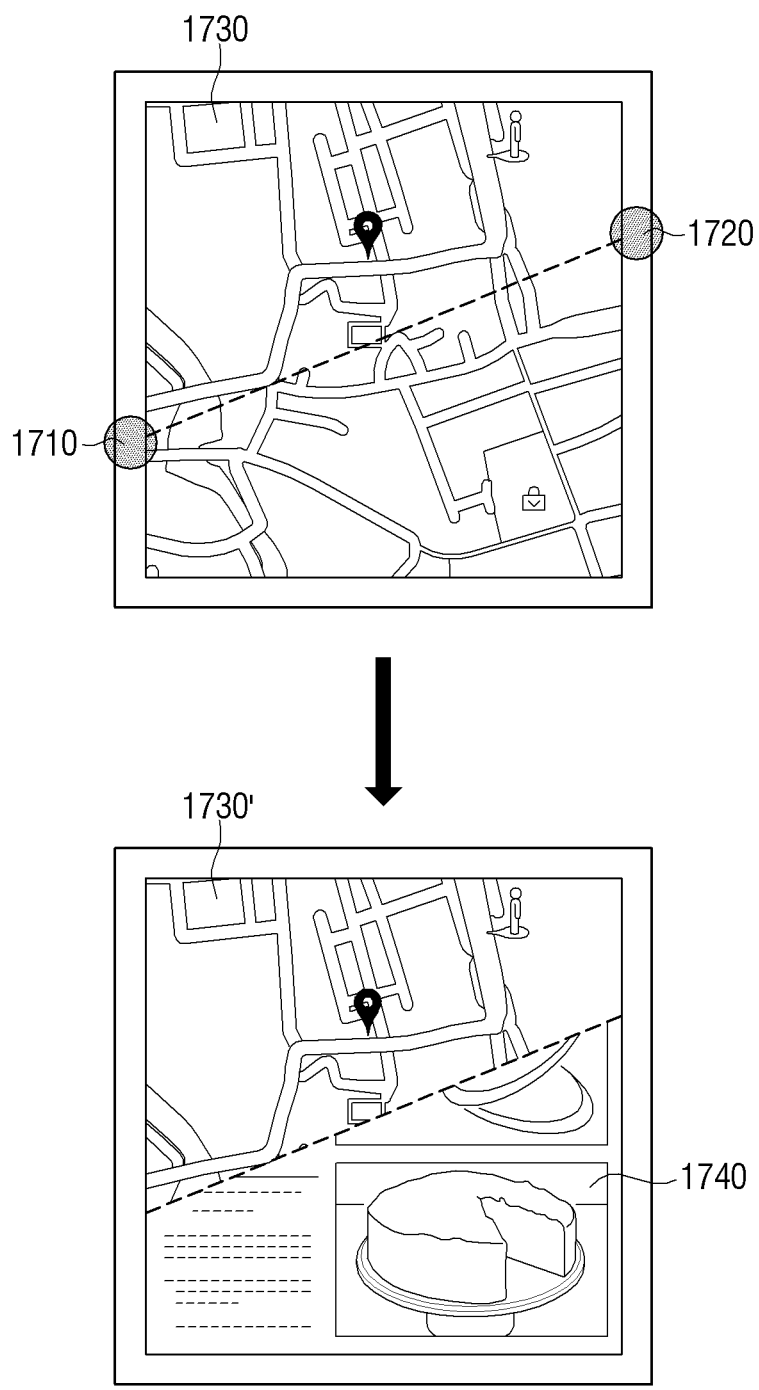

As illustrated at the top of FIG. 17, in response to detecting a touch interaction which includes touching the first point 1710 of a left side of the bezel unit 235 and the second point 1720 of a right side of the bezel unit 235 while a map application 1730 is displayed, the controller 290 may control the display 230 to divide a display screen into two screens based on the locations of the first point 1710 and the second point 1720, and to display a part 1730' of the map application on the first area, and to display a web page 1740 on the second area. That is, the map application can be split along a line between the first point 1710 and the second point 1720. Herein, a web page 1740 may be an application which is executed before the map application 1730 is executed. That is, the controller 290 may divide a screen based on a touch interaction which includes touching a plurality of points of the bezel unit 235.

Also, the controller 290 may enlarge or reduce a screen displayed currently through a drag interaction which includes dragging a plurality of sides of the bezel unit 235.

Figure 18:
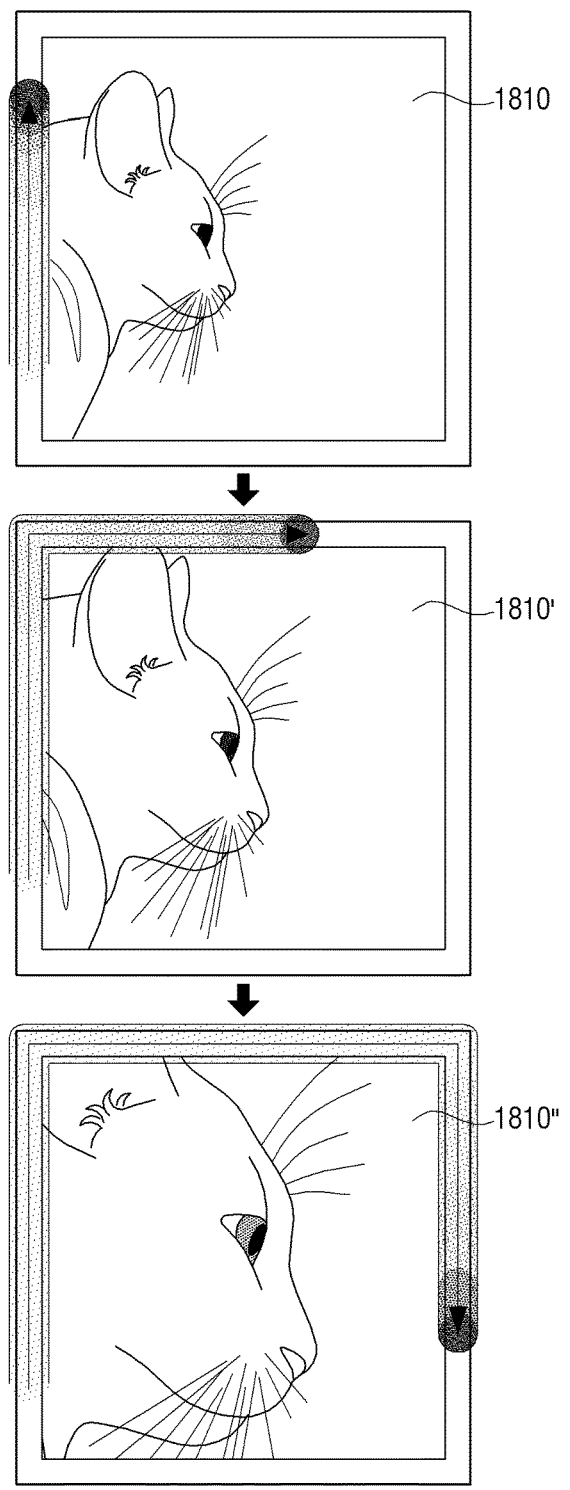

To be specific, in response to detecting a drag interaction which includes touching a point of a left side of the bezel unit 235 and dragging the touched point in the clockwise direction while a picture content 1810 is displayed as illustrated in FIG. 18, the controller 290 may control the display 230 to expand and display picture content 1810', 1810" as illustrated in the center and bottom of FIG. 18.

In response to detecting a drag interaction which includes touching a point of the bezel unit 235, and then dragging the touched point in the counterclockwise direction while the picture content 1810 is displayed, the controller 290 may control the display 230 to minimize and display the picture content according to the drag interaction.

Also, the controller 290 may control the number of images displayed on the display 230 through a drag interaction which includes dragging a plurality of sides of the bezel unit 235.

Figure 19:
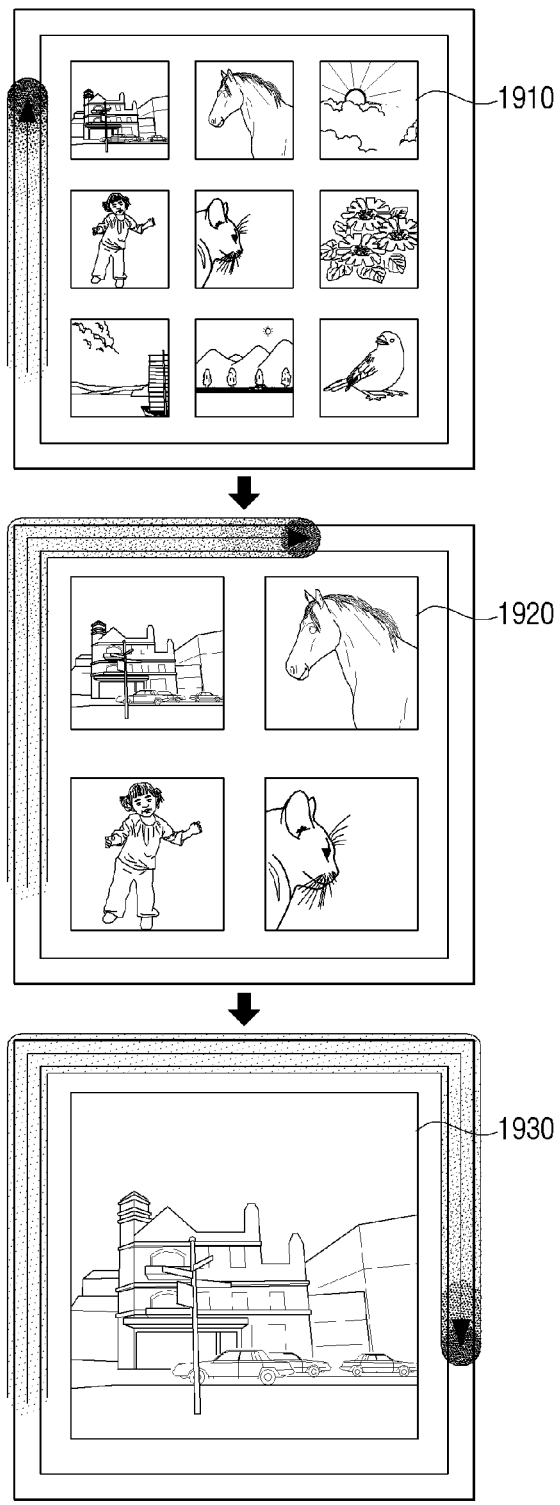

To be specific, as illustrated in the top of FIG. 19, in response to detecting a drag interaction which includes touching a point of a left side of the bezel unit 235, and then dragging the touched point to the upper side of the bezel unit 235 in the clockwise direction while a screen 1910 including 9 images are included, as illustrated in FIG. 19, the controller 290 may control the display 230 to display a screen 1920 including 4 images among the 9 images as illustrated in the center of FIG. 19. When a drag interaction is continued to a right side of the bezel unit 235, the controller 290 may control the display 230 to display a screen 1930 including an image among 4 images as illustrated in the bottom of FIG. 19. On the contrary, the controller 290 may increase the number of images displayed on the display 230 according to a drag interaction in the counterclockwise direction along the bezel unit 235.

Also, the controller 290 may turn on the display 230 according to a drag interaction which is inputted on not less than two sides of the bezel unit 235.

Figure 20:
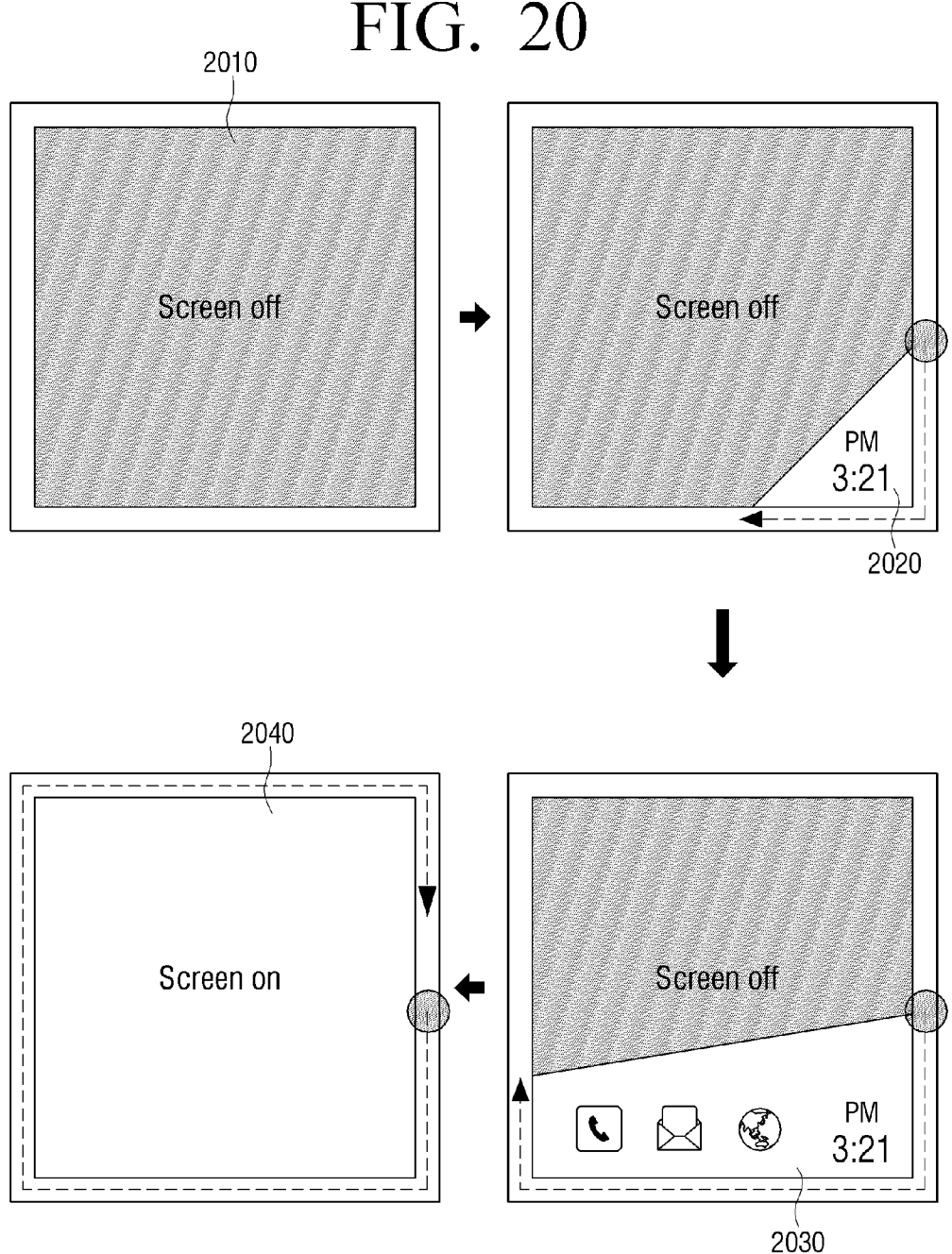

To be specific, as illustrated in the upper-left side of FIG. 20, in response to detecting a drag interaction which includes touching a point on a right side of the bezel unit 235, and then dragging the touched point to the bottom area of the bezel unit 235 in the clockwise direction while the display 230 is turned off 2010, the controller 290 may control the display 230 to display time information on the first area 2020 of a display screen according to the drag interaction as illustrated in the right-upper side of FIG. 20. When a drag interaction is continued to a left side of the bezel unit 235 continually, the controller 290 may control the display 230 to display time information and shortcut icons of applications which are frequently used, on the second area 2030 of the display screen. When the drag interaction is continued to a right side of the bezel unit 235, the controller 290 may control the display 230 to turn on an entire screen as illustrated in the left-bottom side of FIG. 20. That is, the controller 290 may continually turn on the display 230 through the drag interaction which is inputted on not less than two sides of the bezel unit 235.

The controller 290 may search a plurality of images through a drag interaction which includes simultaneously touching a point on each of two sides of the bezel unit 235.

Figure 21:
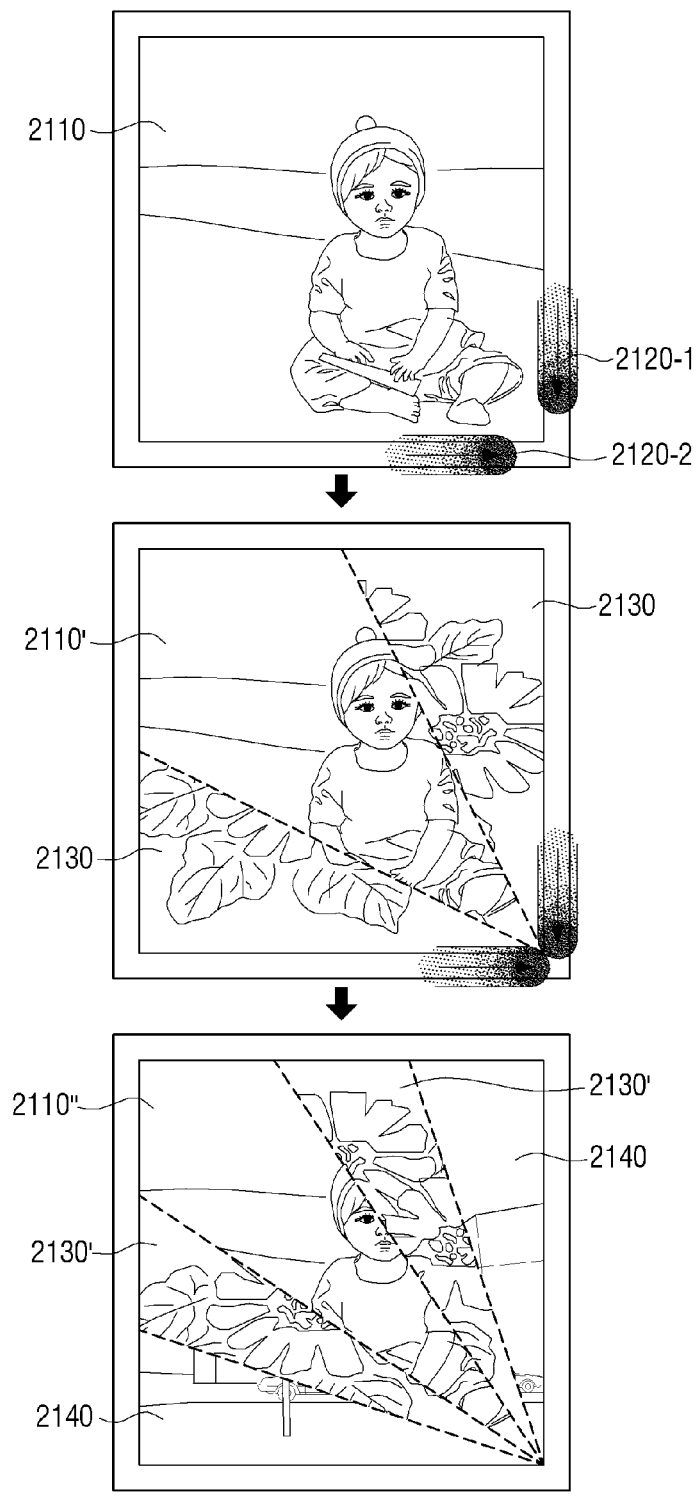

To be specific, as illustrated at the top of FIG. 21, in response to detecting a drag interaction 2120-1, 2120-2 which includes touching a point on a right side and a point on a bottom side of the bezel unit 235, via the second touch detector 282, and then dragging the two touched points so that the two touched points become closer, the controller 290 may control the display 230 to display the second image 2130 in addition to the first image 2110' as illustrated in the center of FIG. 21. In response to detecting a drag interaction which includes dragging two touched points so that two touched points become closer continually, the controller 290 may control the display 230 to simultaneously display the first image 2110", the second image 2130' and the third image 2140 as illustrated at the bottom of FIG. 21. Herein, the first image 2110, the second image 2130 and the third image 2140 may be pictures with a similar color, or pictures taken on the same date.

The controller 290 may rotate a screen using a drag interaction which includes simultaneously touching a point of sides of the bezel unit 235 facing each other, and then dragging the touched points in the opposite direction.

Figure 22:
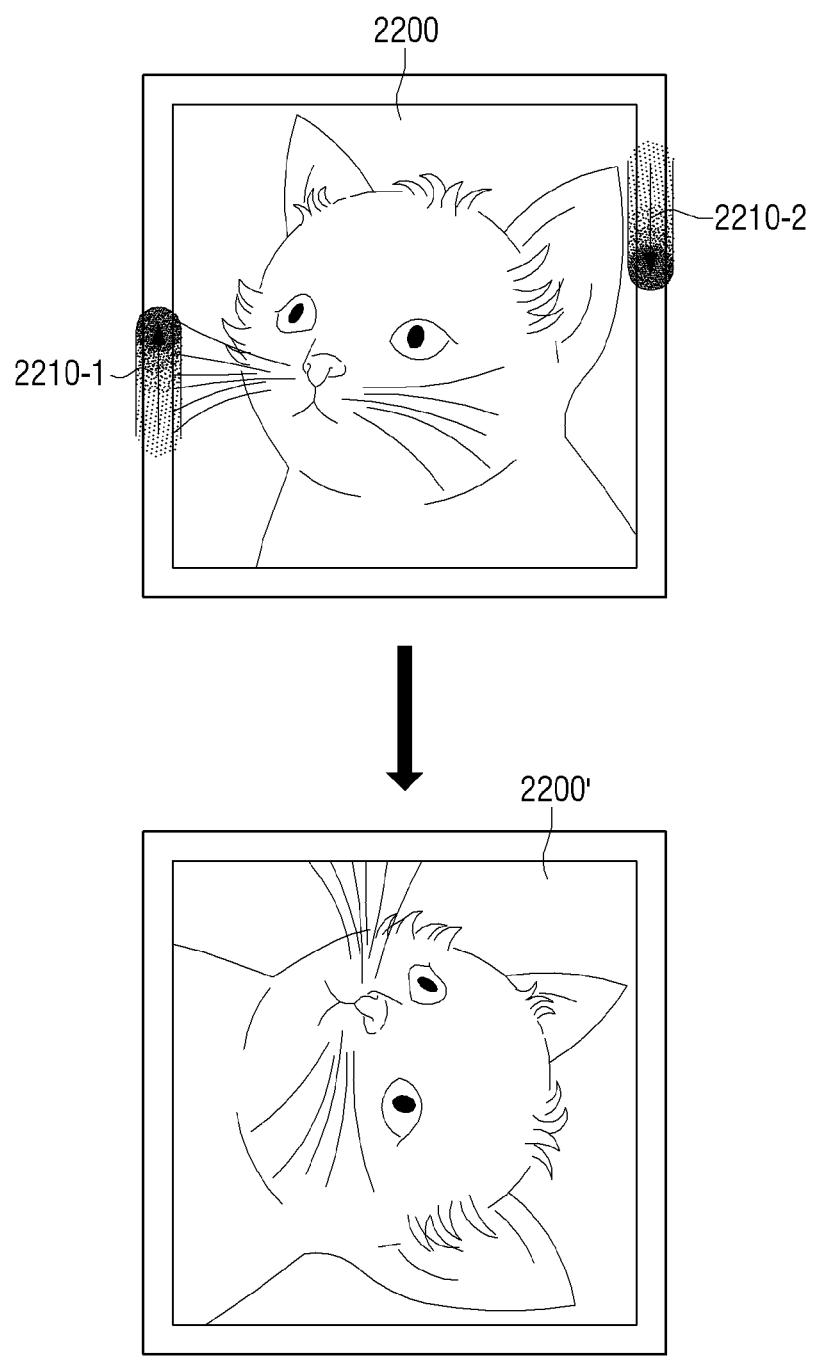

To be specific, as illustrated in the top of FIG. 22, in response to simultaneously detecting the first drag interaction 2210-1 which includes touching a point on a left side of the bezel unit 235, via the second touch detector 282, and then dragging the touched point to the upper direction, and the second drag interaction 2210-2 which includes touching a point on a right side of the bezel unit 235, and then dragging the touched point in the bottom direction, the controller 290 may control the display 230 to display a picture content 2200' which is rotated 90 degrees in the clockwise direction according to the first drag interaction 2210-1 and the second drag interaction 2210-2.

The controller 290 may perform various functions of the user terminal device through a swipe interaction which includes simultaneously swiping the first side of the bezel unit 235 and the second side of the bezel unit 235 which adjoins the first side.

Figure 23:
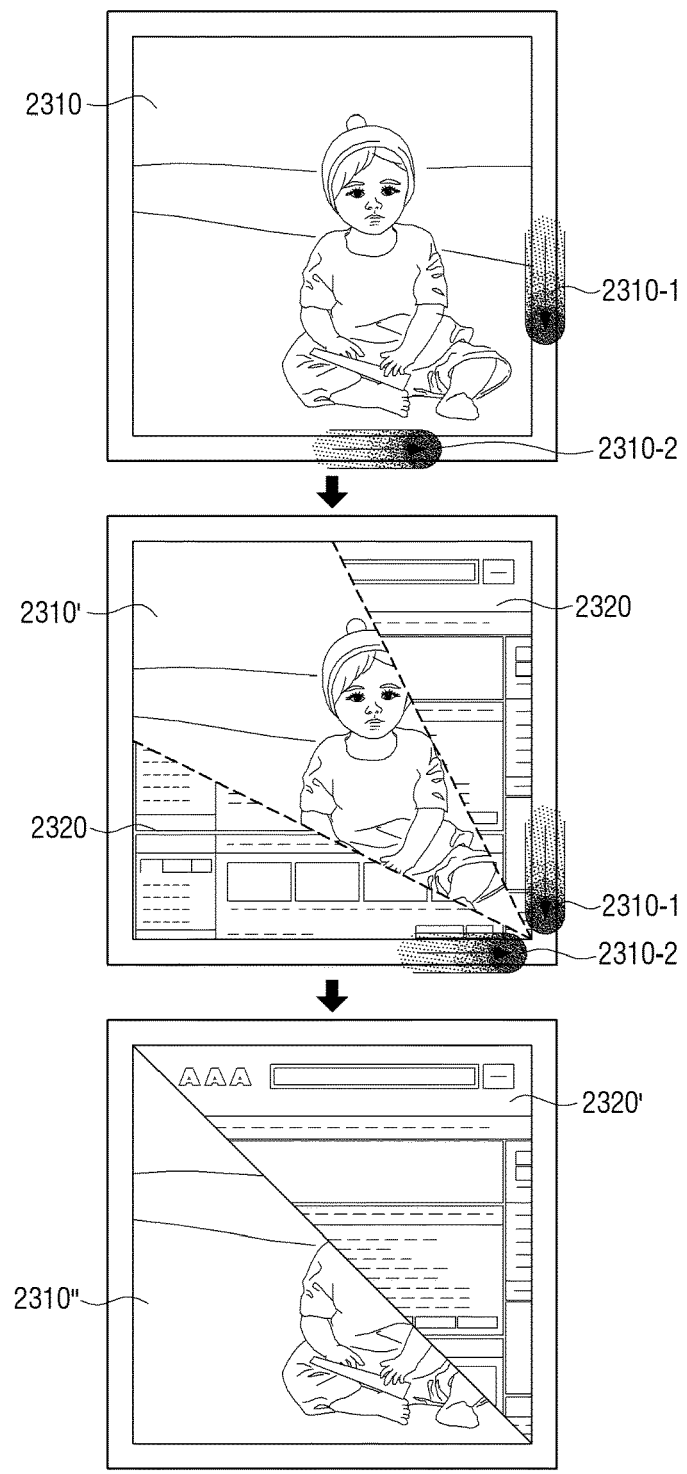

To be specific, as illustrated in the top of FIG. 23, in response to detecting a swipe interaction 2310-1, 2310-2 which includes touching a point on a right side and a point on a bottom side of the bezel unit 235, and then swiping the two touched points so that the two touched points become closer while a gallery application 2310 is displayed, the controller 290 may control the display 230 to display an internet application 2320 in addition to a gallery application 2310' as illustrated in the center of FIG. 21. In response to detecting the swipe interaction so that the two touched points become closer continually, the controller 290 may control the display 230 to divide a display screen and to simultaneously display a gallery application 2310" and an internet application 2320' as illustrated at the bottom of FIG. 21. Accordingly, the controller 290 may enter into a multi-tasking mode where a plurality of applications are simultaneously used.

Figure 24A:
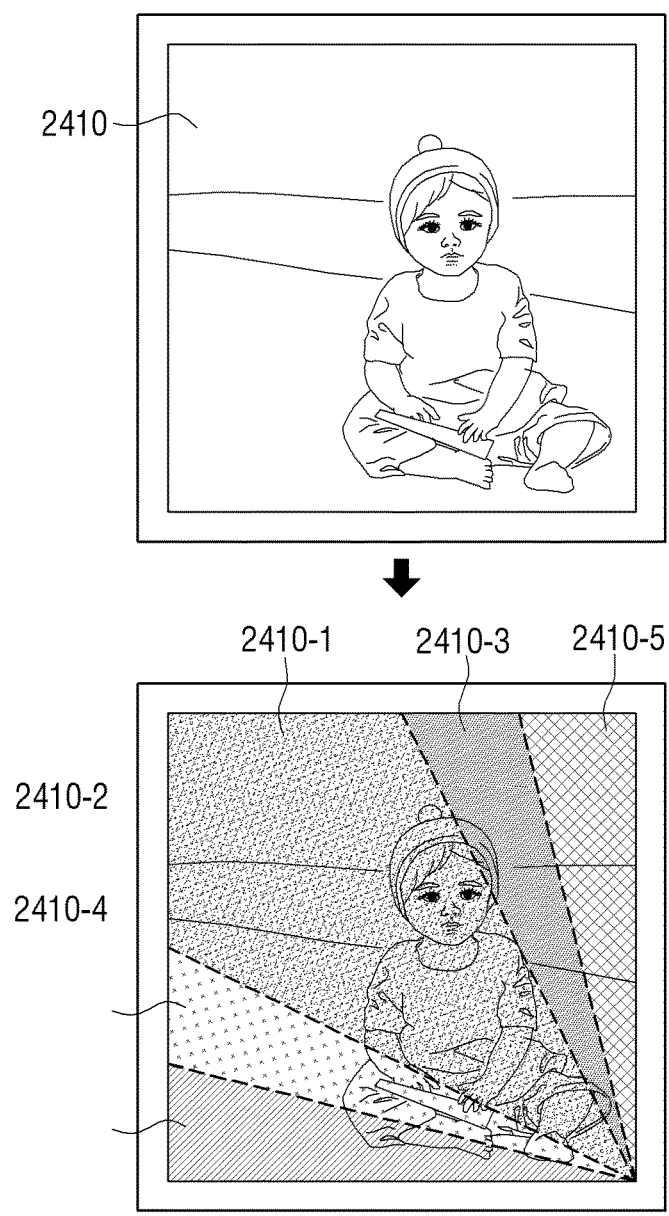

As illustrated at the top of FIG. 24A, in response to detecting a swipe interaction which includes touching a point on a right side and a point on a bottom side of the bezel unit 235, via the second touch detector 282, and then swiping the two touched points so that the two touched points become closer while a picture content 2410 is displayed, the controller 290 may control the display 230 to divide the picture content 2410 into a plurality of areas 2410-1 to 2410-5, in order to apply a different image predetermined value to a plurality of areas 2410-1 to 2410-5, respectively, and to display a plurality of areas 2410-1 to 2410-5 as illustrated at the bottom of FIG. 24A.

Figure 24B:
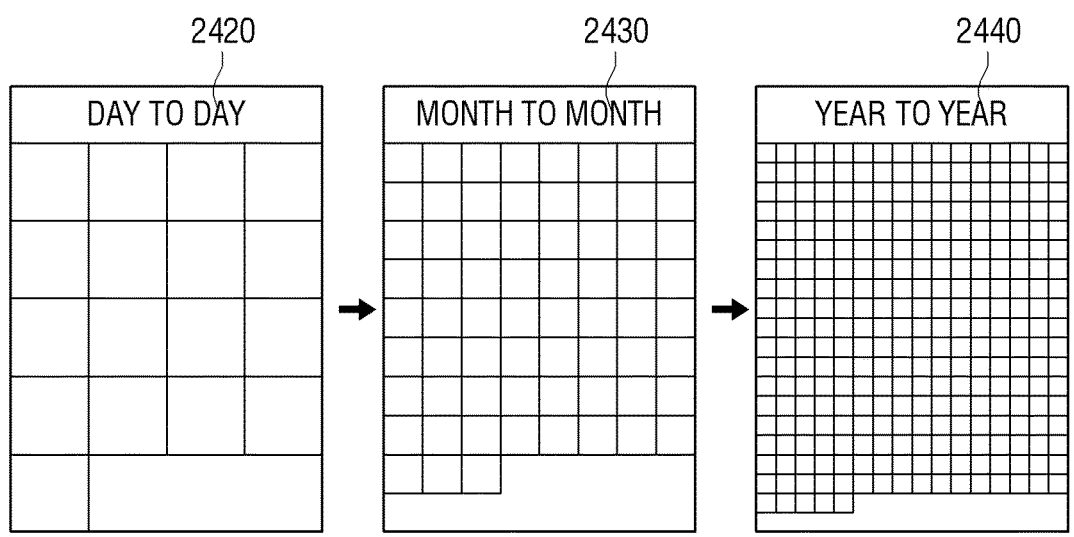

As illustrated at the left side of FIG. 24B, in response to detecting a swipe interaction which includes touching a point on a right side and a point on a bottom side of the bezel unit 235, via the second touch detector 282, and then swiping the two touched points so that the two touched points become closer while a UI 2420 where a calendar-related picture content is arranged based on a day to day view, the controller 290 may control the display 230 to display a UI 2430 where a picture content is arranged based on a month to month view. In response to detecting a swipe interaction which includes touching a point on the right side and a point on the bottom side of the bezel unit, via the second touch detector 282, and then swiping the touched two points so that the touched two points become closer while the UI 2430 where a picture content is arranged based on a month to month view is displayed, the controller 290 may control the display 230 to display a UI 2440 where a picture content is arranged based on a year to year view as illustrated at the right side of FIG. 24B.

Figure 24C:
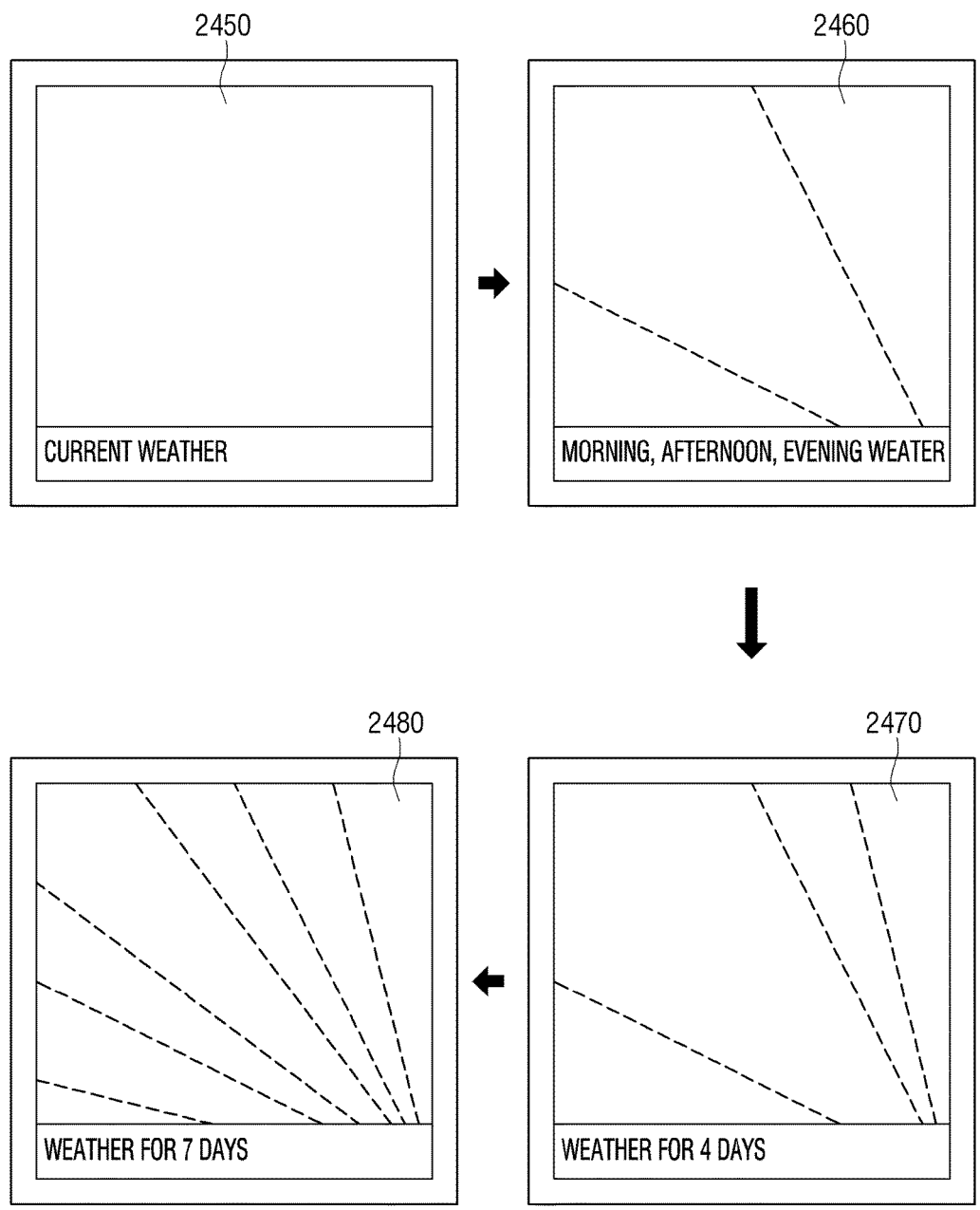

As illustrated at the left-upper side of FIG. 24C, in response to detecting a swipe interaction which includes touching a point on a right side and a point on a bottom side of the bezel unit 235, via the second touch detector 282, and then swiping the two touched points so that the two touched points become closer when a screen 2450 which introduces a current weather is displayed while a weather application is executed, the controller 290 may control the display 230 to divide a display screen into three areas and to display a screen 2460 which introduces the weather in the morning, afternoon and evening, respectively, as illustrated in the right-upper side of FIG. 24C. As illustrated in the right-upper side of FIG. 24C, in response to detecting a swipe interaction which includes touching a point on a right side and a point on a bottom side of the bezel unit 235, via the second touch detector 282, and then swiping the two touched points so that the two touched points become closer while a screen 2460 which introduces the weather of morning, afternoon and evening is displayed, the controller 290 may control the display 230 to divide a display screen into 4 areas, and to display a screen 2470 which introduces the weather of 4 days from now as illustrated at the right-bottom side of FIG. 24C. In response to detecting a swipe interaction which includes touching a point on a right side and a point on a bottom side of the bezel unit 235, via the second touch detector 282, and then swiping the two touched points so that the two touched points become closer while the screen 2470 which introduces the weather of 4 days from now, is displayed as illustrated at the right-bottom side of FIG. 24C, the controller 290 may control the display 230 to divide a display screen into seven areas and to display the screen 2470 which introduces the weather of a week from now as illustrated at the left-bottom side of FIG. 24C.

A function which is performed in response to detecting a swipe interaction which includes touching a point on a right side and a point on the bottom side of the bezel unit 235, and then swiping the two touched points so that the two touched points become closer is explained above, but this is only one example, and in response to detecting a swipe interaction which includes touching a point on the right side and a point on the bottom side of the bezel unit 235, and swiping the two touched points so that the two touched points are farther apart, the technical spirit of the present invention may be applied. Herein, in response to detecting a swipe interaction which includes touching a point on the right side and a point on the bottom side of the bezel unit 235, and then swiping the two touched points so that the two touched points are moved farther apart, an opposite function to that which is performed in response to detecting a swipe interaction which includes touching a point on a right side and a point on a bottom side of the bezel unit 235, and then swiping the two touched points so that the two touched points become closer, may be performed.

In response to detecting a swipe interaction which includes touching a point on the right side and a point on the bottom side of the bezel unit 235, and then swiping the two points so that the two points are farther apart, the controller 290 may control the display 230 to display notification information (for example, received message information, missed call information, update information and the like) on a corner area of the right bottom side.

Figure 25:
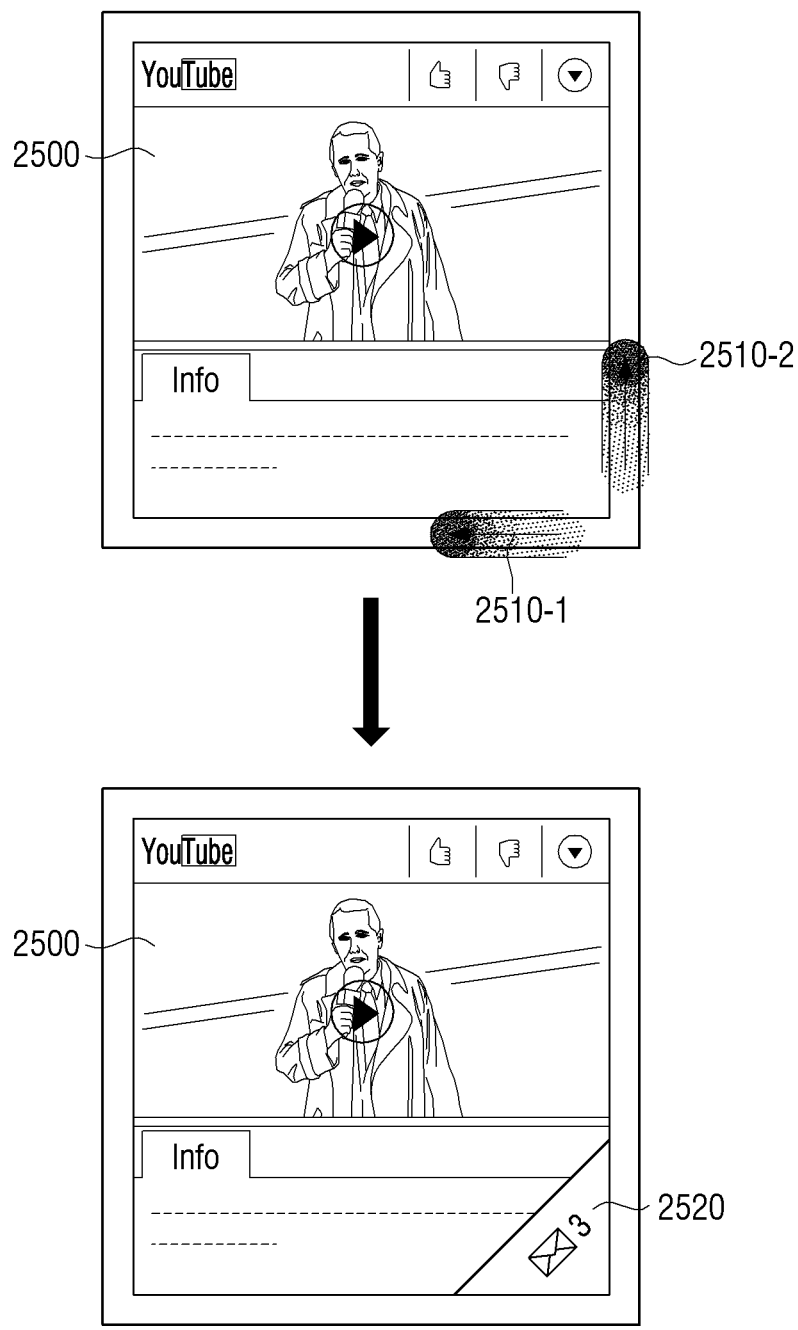

To be specific, as illustrated in FIG. 25, in response to detecting a swipe interaction 2510-1, 2510-2 which includes touching a point on a right side and a point on a bottom side of the bezel unit 235, and then swiping the two touched points so that the two touched points move farther away from each other while an image application 2500 is displayed, the controller 290 may control the display 230 to display text message notification information on a corner area 2520 of the right-bottom side where the swipe interaction 2510-1, 2510-2 is detected. A size of the corner area 2520 of a right-bottom side where the text message notification information is displayed may change according to an amount of swiping.

The controller 290 may perform a function of scrolling with a different speed using various drag interactions inputted to the bezel unit 235.

Figure 26A:
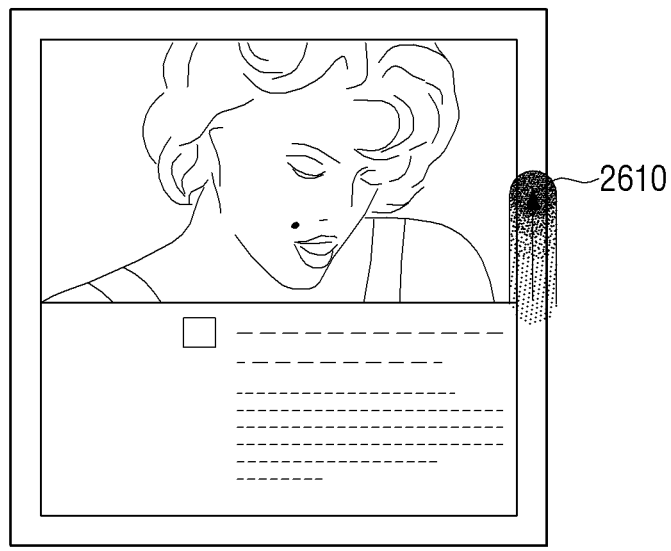

As illustrated in FIG. 26A, in response to detecting a drag interaction 2610 which includes touching a point on the right side of the bezel unit 235, via the second touch detector 282, and then dragging the touched point to the upper direction while a web page is displayed, the controller 290 may control a display 230 to scroll the web page at the first speed.

Figure 26B:
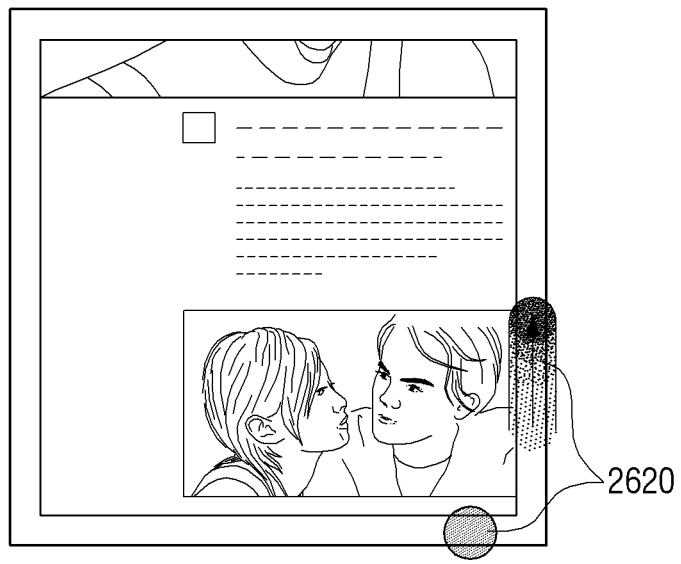

As illustrated in FIG. 26B, in response to detecting a drag interaction 2620 which includes touching a point at a bottom side of the bezel unit 235, via the second touch detector, and then dragging the touched point in the upper direction while a web page is displayed, the controller 290 may control the display 230 to scroll the web page at the second speed which is two times faster than the first speed.

Figure 26C:
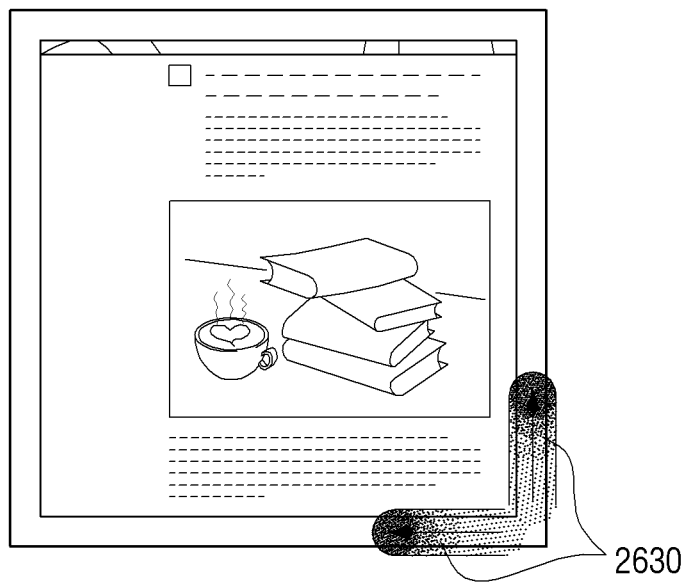

As illustrated in FIG. 26C, in response to detecting a drag interaction 2630 which includes touching a point on a right side and a point on a bottom side of the bezel unit 235, via the second touch detector 282, while a web page is displayed, and then dragging the two touched points so that the two touched points are moved farther away, the controller 290 may control the display 230 to scroll the web page at the third speed which is four times faster than the first speed.

The controller 290 may provide a multitasking function through a swipe interaction which includes simultaneously touching and swiping two sides which are connected each other.

To be specific, as illustrated at the top of FIG. 27A, in response to detecting a swipe interaction 2720-1, 2720-2 which includes touching a point on a bottom side and a point on a right side of the bezel unit 235, respectively, via the second touch detector 282, while the first application 2710 is displayed, the controller may reduce the size of the first application 2710' and display the second application 2730 as illustrated in the bottom of FIG. 27A. The size of the reduced first application 2710' may change based on the swipe interaction.

As illustrated at the top of FIG. 27B, in response to detecting a swipe interaction 2750-1, 2750-2 which includes touching a point on a bottom side and a point on a right side of the bezel unit, respectively, via the second touch detector 282, while the third application 2740 is displayed, the controller 290 may control the display 230 to enlarge and display the fourth application 2760 over the third application 2740' according to the swipe interaction 2720-1, 2720-2 as illustrated at the bottom of FIG. 27B.

The controller 290 may provide a multitasking function through a drag interaction which includes simultaneously touching sides facing each other and then dragging the touched sides in the same direction.

Figure 28A:
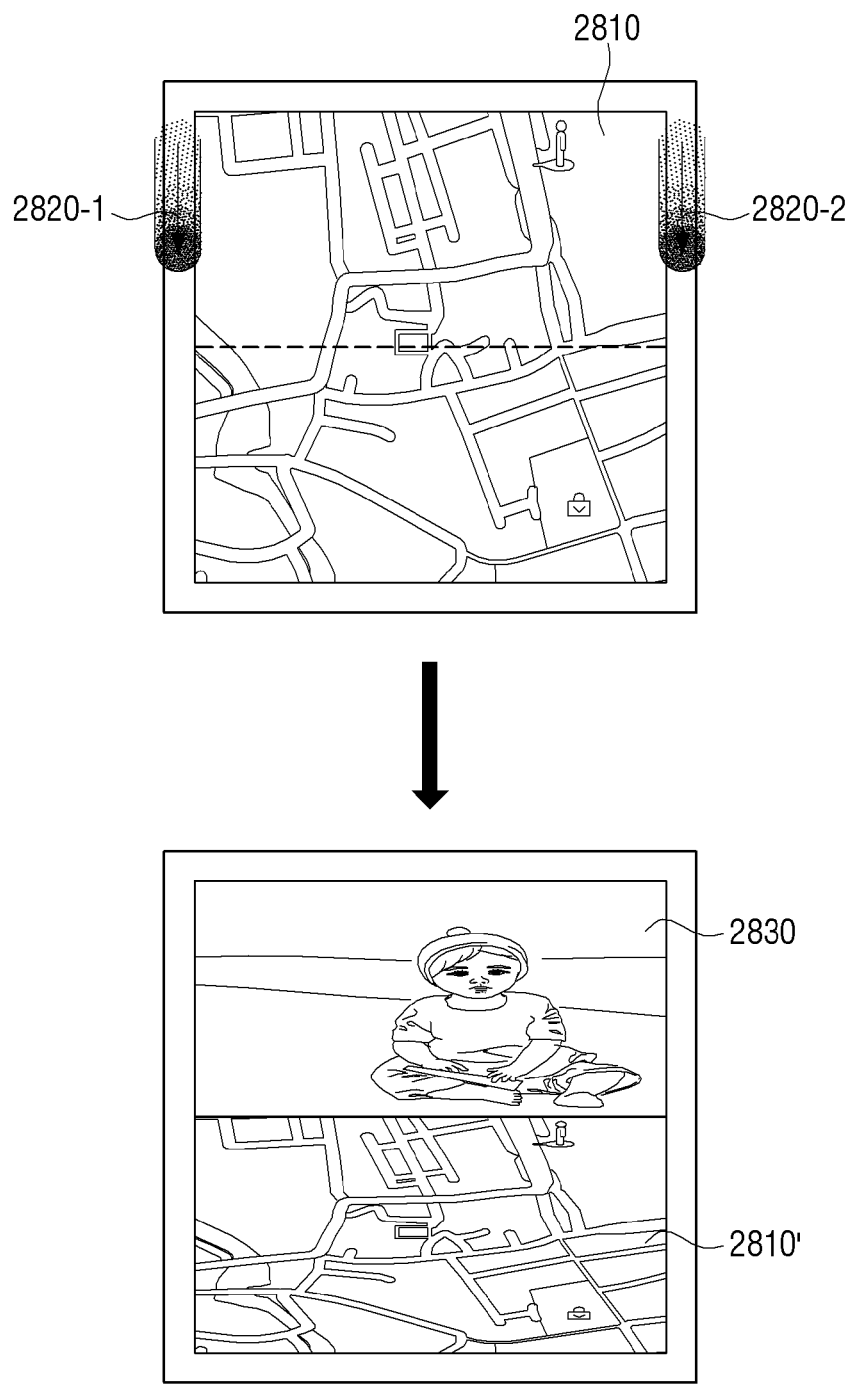

To be specific, as illustrated in the top of FIG. 28A, in response to detecting a drag interaction 2820-1, 2820-2 which includes touching a left side and a right side of the bezel unit 235, respectively, via the second touch detector 282, while a map application 2810 is displayed, and then dragging the touched side in the downward direction, the controller 290 may control the display 230 so that a gallery application 2830 is moved down from the top of a display screen according to the drag interaction 2820-1, 2820-2, and the map application 2810' and the gallery application 2830 are displayed simultaneously.

Figure 28B:
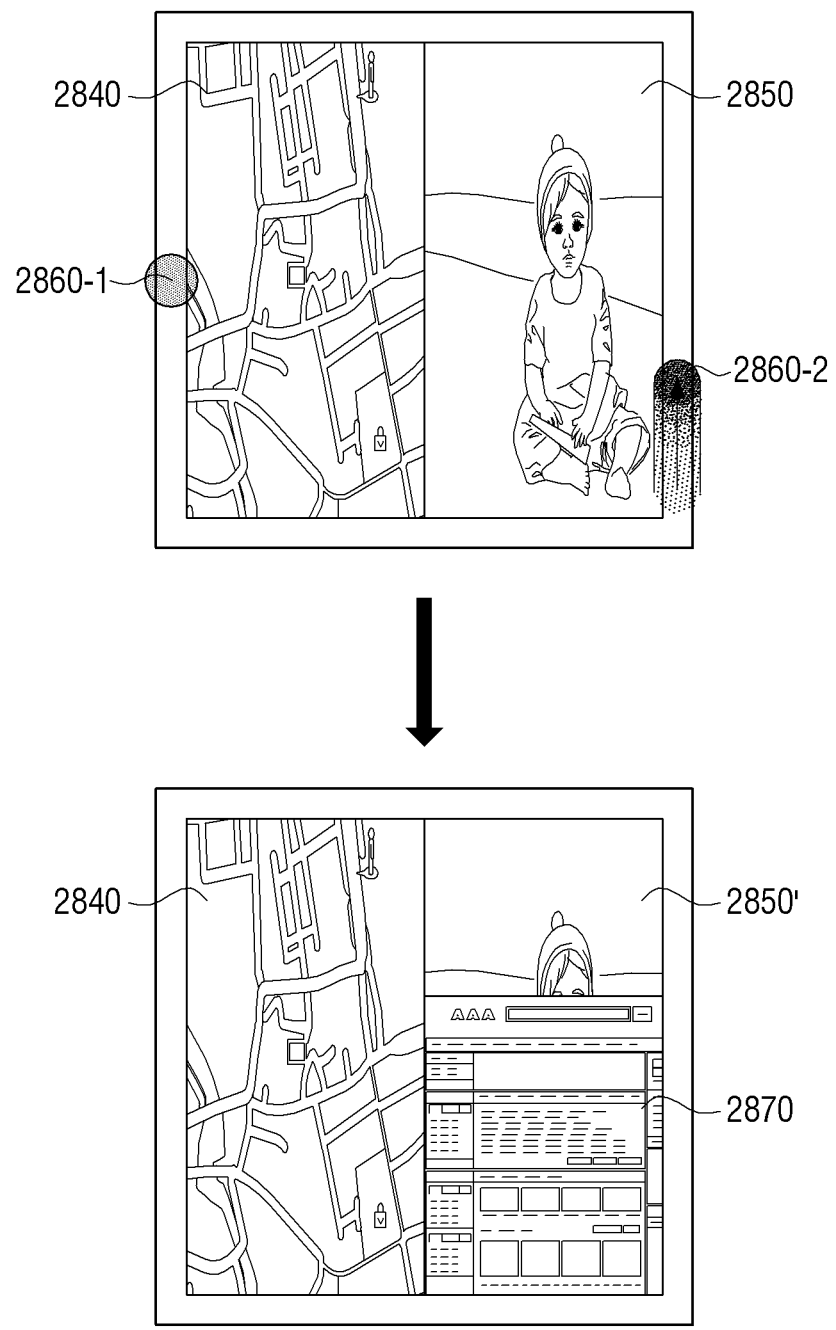

As illustrated at the top of FIG. 28B, while a display screen is divided into two areas so that a map application 2840 is displayed on the left area and a gallery application 2850 is displayed on the right area, in response to detecting a drag interaction 2860-2 which includes touching a point on a left side 2860-1 of the bezel unit 235, and touching a point on the right side of the bezel unit 235 and then dragging the touched point in the upper direction is detected, the controller 290 may control the display 230 so that an internet application 2870 comes up from the bottom of the display screen according to the drag interaction 2860-2, and may control the display 230 to simultaneously display a gallery application 2850' and an internet application 2870 on the right area as illustrated at the bottom of FIG. 28B.

Figure 29:
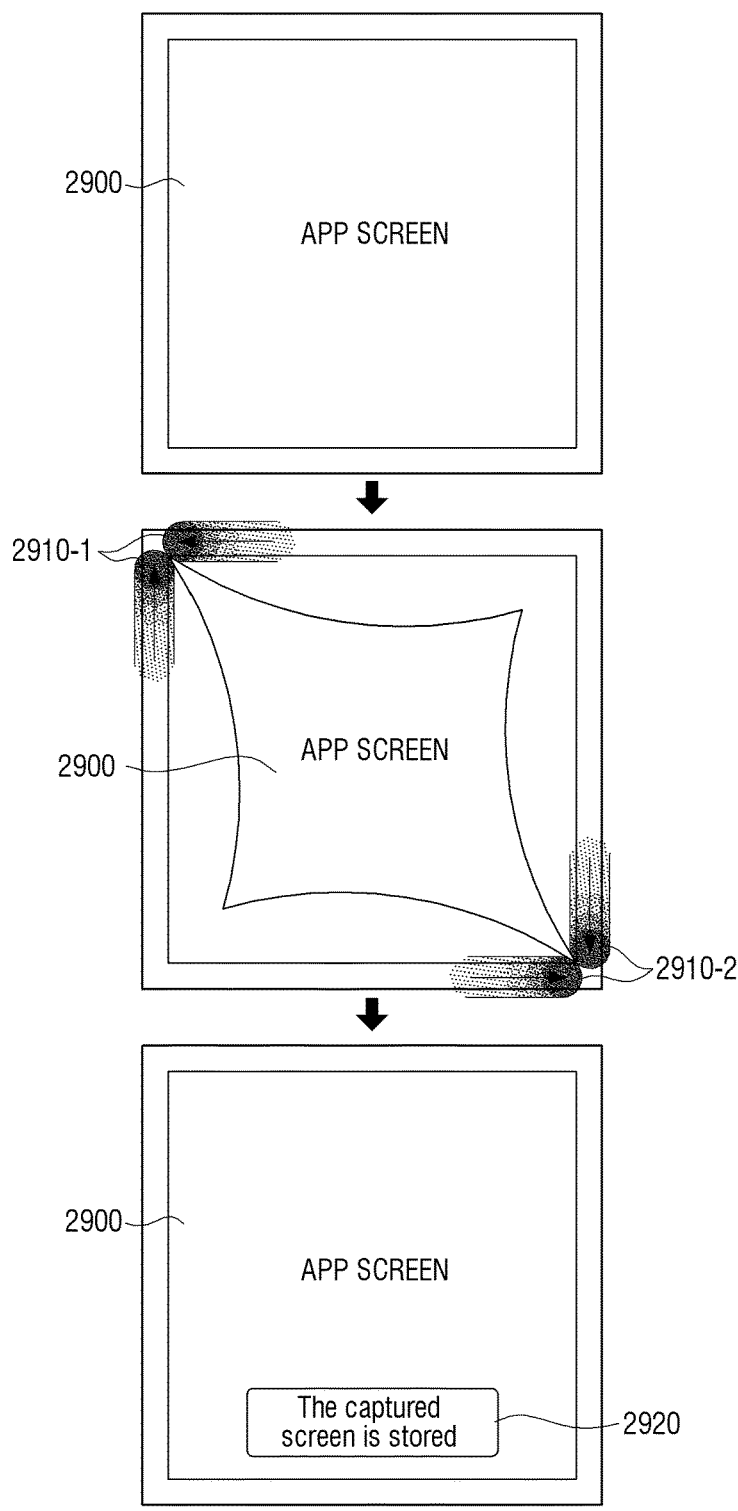

As illustrated at the top of FIG. 29, in response to simultaneously detecting the first drag interaction 2910-1 which includes touching a point on an upper side and a left side of the bezel unit 235, respectively, and then dragging the touched two points so that the touched two points become closer while an application screen 2900 is displayed, and the second drag interaction which includes touching a point on a bottom side and a point on a right side of the bezel unit 235, respectively, and then dragging the two touched points so that the two touched points become closer, the controller 290 may provide an image effect where the application screen 2900 is pinched according to the first drag interaction 2910-1 and the second drag interaction 2910-2 as illustrated in the center of FIG. 29, and may capture the application 2900 which is returned as illustrated in the bottom of FIG. 29. Herein, the controller 290 may control the display 230 to display a UI 2920 which introduces that an application screen 2900 is stored in the returned application screen 2900.

As illustrated at the left side of FIG. 30, while a display screen is divided into two areas so that a gallery application 3010 is displayed on the left area of the display screen and a memo application 3020 is displayed on the right area of the display screen, in response to detecting a drag interaction 3030-2 which includes touching 3030-1 at a point on a left side of the bezel unit 235, via the second touch detector 282, and touching a point on a right side of the bezel unit 235, and then dragging the touched point in the upper direction 3030-2, the controller 290 may control the display 230 to fix the gallery application displayed on the left area and to display the map application 3040 on the right area. Herein, the map application 3040 may be an application which was executed most recently before the gallery application 3010 and the memo application 3020 are executed. Accordingly, the controller 290 may convert an application displayed on a part of the display 230 to another application through a touch interaction 3030-1 and a drag interaction 3030-2.

<Other Bezel Interactions>

Figure 31A:
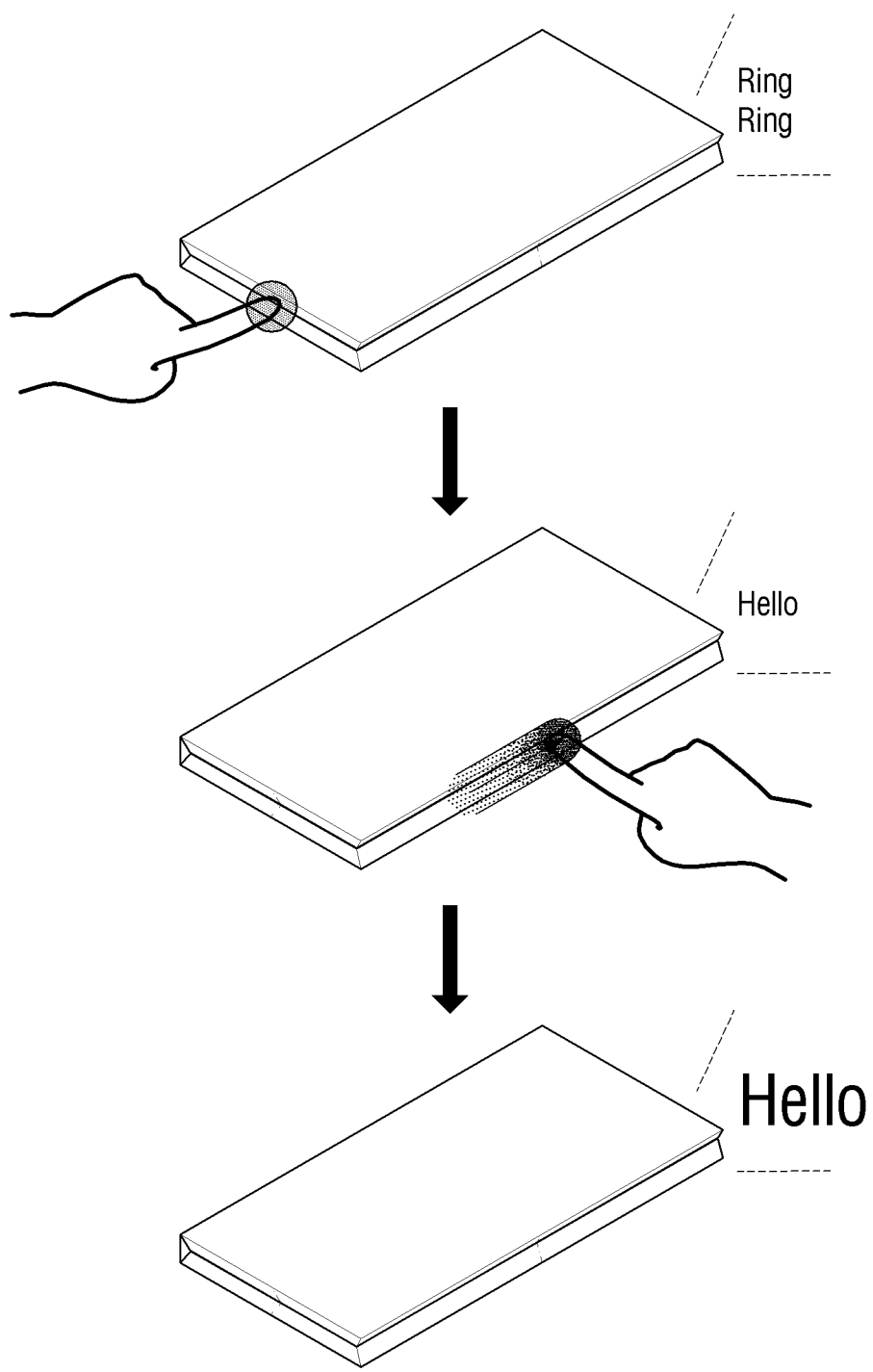
FIGS. 31A and 31B are views illustrating the performing of a function of a user terminal according to a touch interaction which includes touching a bezel when a user terminal device is completely folded according to an exemplary embodiment.

In response to receiving a telephone request from an external source while the square-shaped user terminal device 200 is folded, the controller 290 may control an audio outputter 270 to output a call reception sound. Herein, as illustrated at the top of FIG. 31A, in response to detecting a tap interaction which taps the bezel unit 235, the controller 290 may control the audio outputter 270 to receive a telephone communication, and to output a telephone communication sound. While a telephone communication is performed, as illustrated in the center of FIG. 31A, in response to detecting a drag interaction which includes touching a point on a long side, and then dragging the touched point in the upper direction, the controller 290 may control the audio outputter 270 to increase a volume of a telephone communication sound.

Figure 31B:
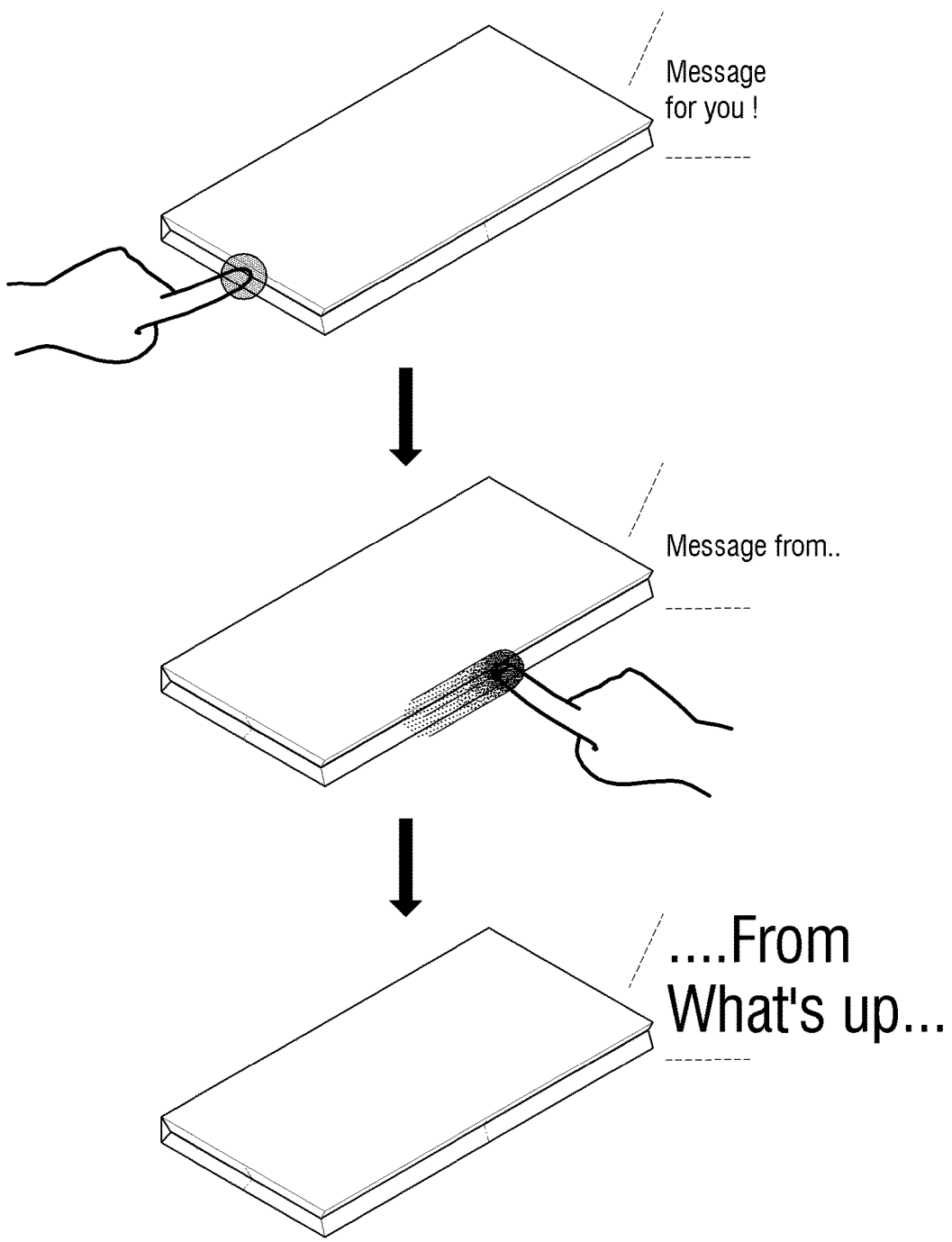

As another example, in response to receiving a text message from the external source while the square-shaped user terminal device 200 is folded, the controller 290 may control the audio outputter 270 to output a notification sound which introduces that a message is received. Herein, as illustrated at the top of FIG. 31B, in response to detecting a tap interaction which includes tapping a part of the bezel unit 235, the controller 290 may control the audio outputter 270 to output the received text message into an audio through a text-to-speech (TTS) conversion. Also, in response to detecting a drag interaction which includes touching a point on a long side and then dragging in the upper direction while an audio corresponding to the text message is outputted as illustrated in the center of FIG. 31B, the controller 290 may control the audio outputter 270 to increase a volume corresponding to the text message.

When the user terminal device 200 is in a square shape, the controller 290 may maintain a main control area on a bottom side where a user is able to access easily even if the user terminal device 200 is rotated. This embodiment refers to the user terminal device 200 as being in a square shape, however this embodiment may also apply to a user terminal device with a rectangular shape.

Figure 32A:
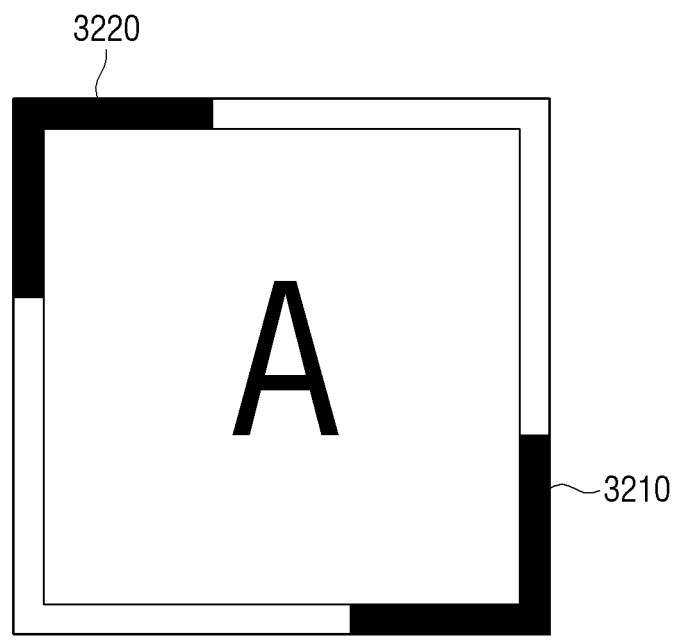
FIGS. 32A to 35 are views illustrating an exemplary embodiment which includes controlling a function mapped onto a bezel when a user terminal device is rotated according to an exemplary embodiment.

As an exemplary embodiment, as illustrated in FIG. 32A, the second touch detector 282 of the user terminal device 200 may be located on the right-bottom area 3210 and the left-upper area 3220 of the bezel unit 235. Herein, in response to detecting a touch interaction on the right-bottom area 3210, the controller 290 may perform a main control function (for example, a home menu call, an application control menu call, and the like). In response to detecting a touch interaction on the left-upper area 3220, the controller 290 may perform a serve control function (for example, an additional function of an application which is executed currently, and the like).

Figure 32B:
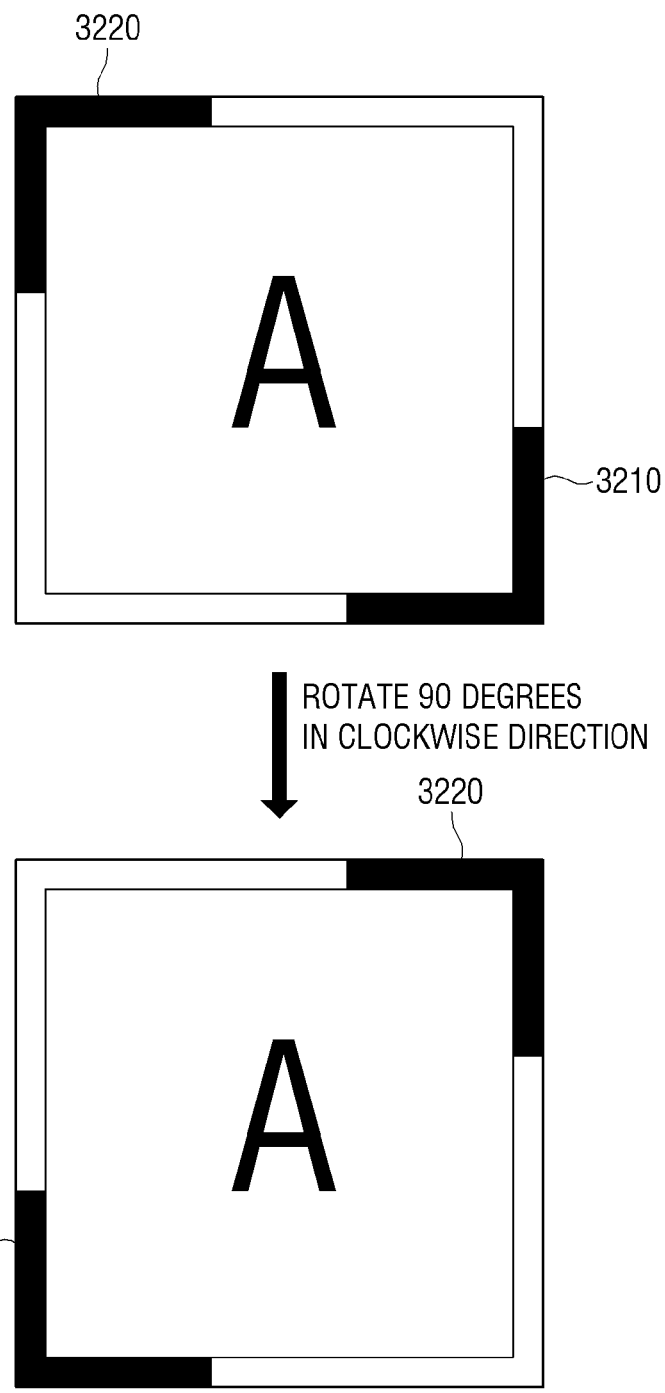

As illustrated at the top of FIG. 32B, when the second touch detector 282 is located on the right-bottom area 3210 and the left upper area 3220, in response to detecting a touch interaction after rotating the user terminal device 200 90 degrees in the clockwise direction, the controller 290 may perform a main control function, and in response to detecting a touch interaction on the right-upper area 3220, the controller 290 may perform a sub control function.

As another example, the second touch detector 282 of the user terminal device 200 may be located on the entire area of the bezel unit 235. Herein, in response to detecting a touch interaction on the right-bottom area 3230, the controller 290 may perform a main control function (for example, a home menu call, an application control menu and the like). Also, in response to detecting a touch interaction on the left-upper area 3240, the controller 290 may perform a sub control function (for example, an additional function of an application which is executed currently).

Figure 32C:
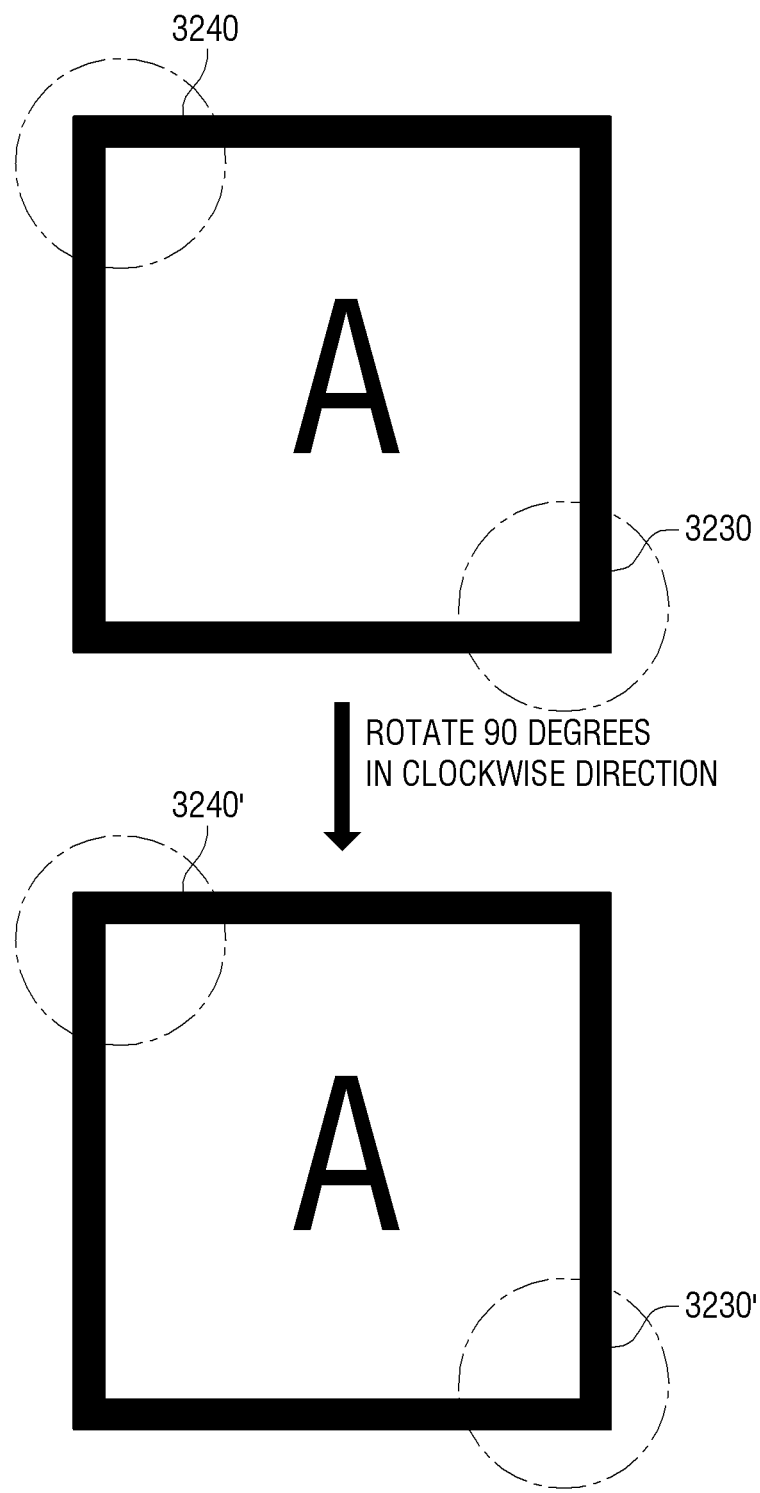

As illustrated in FIG. 32C, when the user terminal device 200 rotates 90 degrees in the clockwise direction, in response to detecting a touch interaction in the right-bottom area 3230', the controller 290 may perform a main control function, and in response to detecting a touch interaction on the left-upper area 3240', the controller 290 may perform a sub control function.

As shown in the above exemplary embodiment, even if the user terminal device 200 rotates, a touch area for controlling the main control function may be located on a bottom side continually.

In response to simultaneously detecting a touch interaction which includes touching the bezel unit 235 via the second touch detector 282 and a shake interaction which includes shaking the user terminal interaction 200, via a movement detector 283, the controller 290 may perform a function different from a function that is performed in response to only detecting a touch interaction which includes touching the bezel unit 235, via the touch detector 282.

Figure 33A:
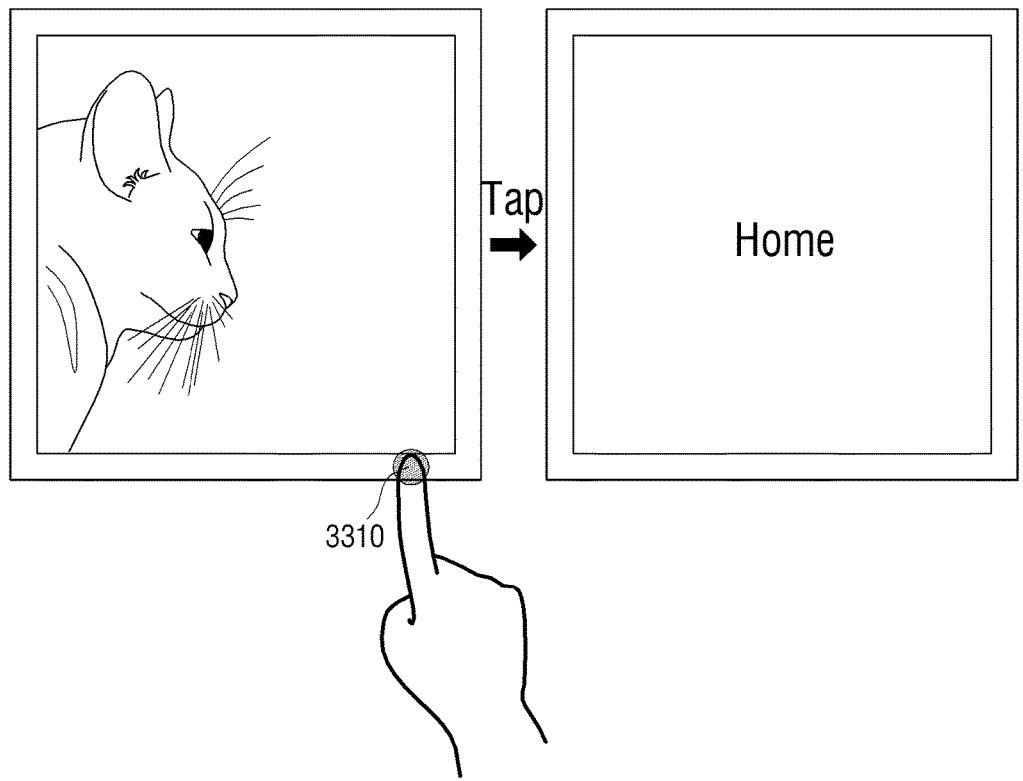

To be specific, as illustrated at the left side of FIG. 33A, in response to detecting a tap interaction 3310 which includes tapping a bottom side of the bezel unit 235 while a gallery application is displayed, the controller 290 may control the display 230 to convert a current screen to a home screen as illustrated at the right side of FIG. 33A.

Figure 33B:
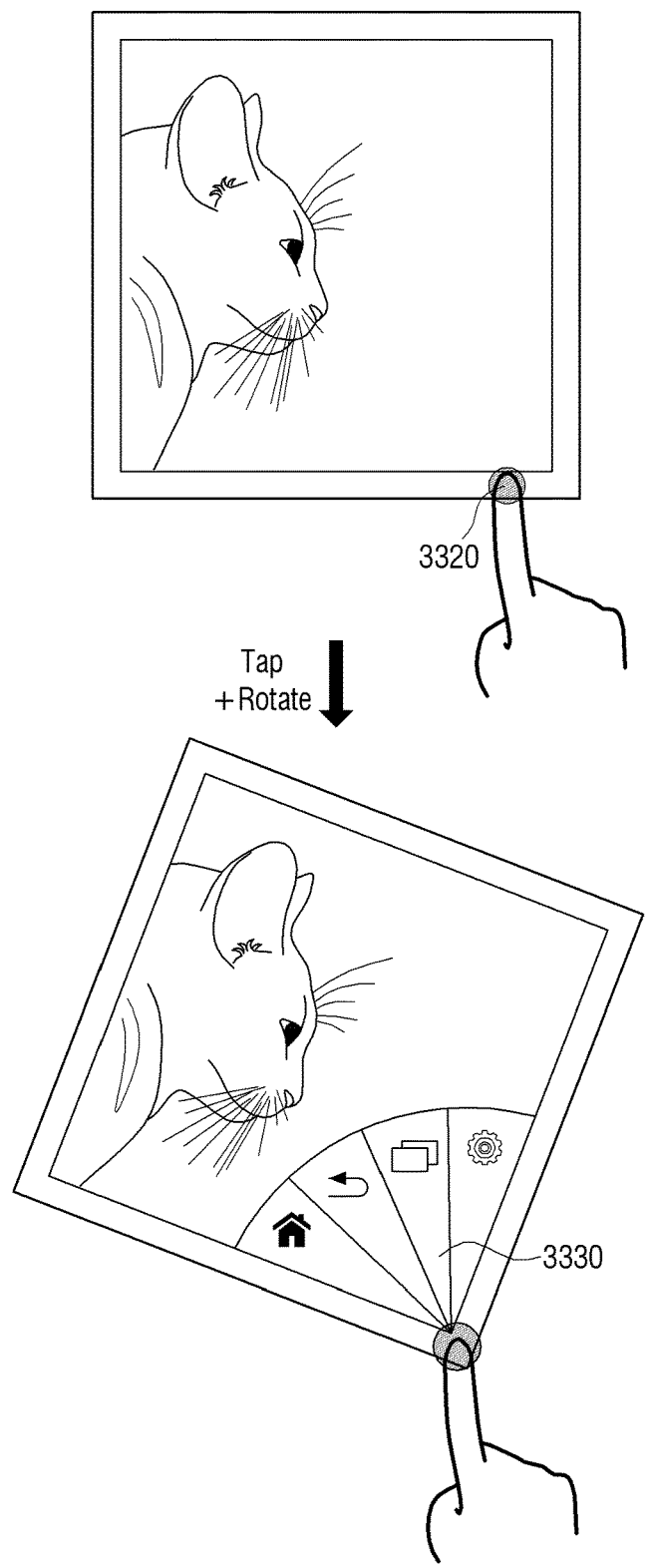

However, as illustrated at the top of FIG. 33B, in response to simultaneously detecting a tap interaction 3320 which includes tapping a bottom side of the bezel unit 235 and detecting a shake interaction which includes shaking the user terminal device 200, via the movement detector 283, while a gallery application is executed, the controller 290 may control the display 230 to display a home menu 3330 including at least one icon on a corner area where the tap interaction 3320 is detected as illustrated at the bottom of FIG. 33B. Herein, as illustrated at the bottom of FIG. 33B, the home menu 3330 may include a home screen movement icon, a back icon, an icon for seeing another window, a setting icon and the like.

Figure 34A:
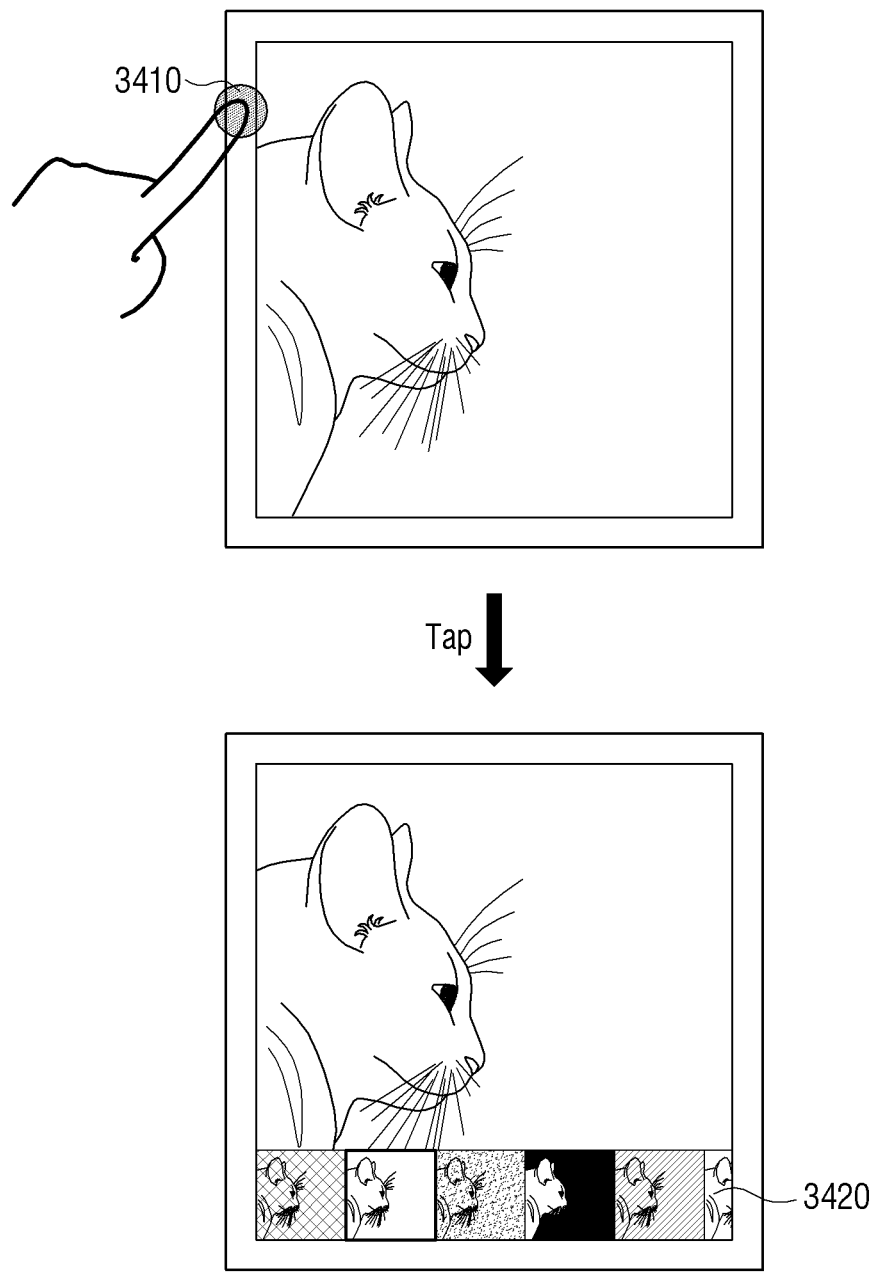

As another example, as illustrated in the upper side of FIG. 34A, in response to detecting a tap interaction 3410 which includes tapping the top of a left side of the bezel unit 235 while a gallery application is displayed, the controller 290 may control the display 230 to display a plurality of images 3420 where a different attribute value is applied to picture contents displayed in the bottom of the display 230 as illustrated at the bottom of FIG. 34A.

Figure 34B:
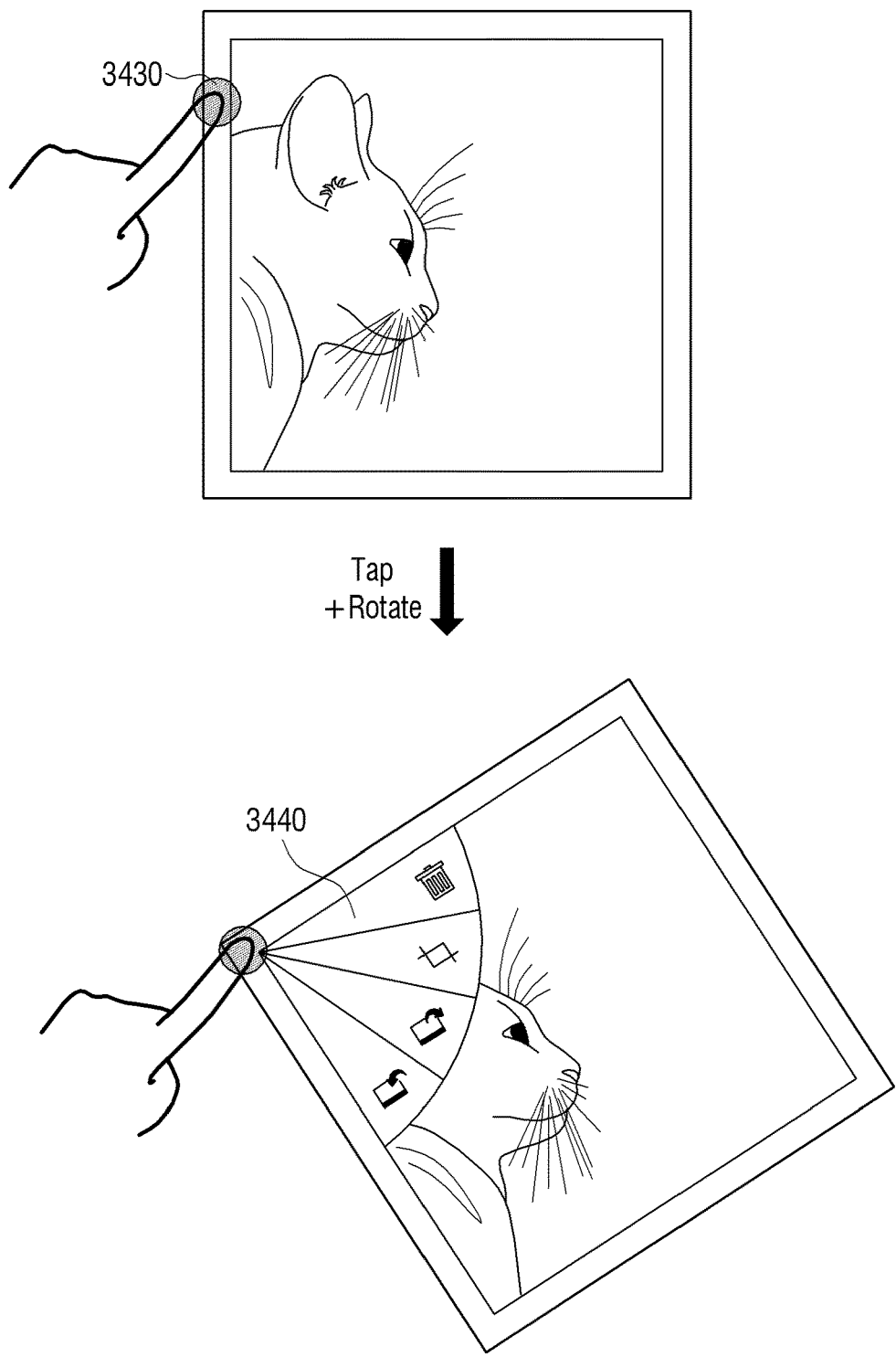

However, as illustrated at the top of FIG. 34B, in response to detecting a tap interaction 3430 which includes simultaneously tapping a bottom side of the bezel unit 235 and a shake interaction which includes shaking the user terminal device 200, via the movement detector 283, while a gallery application is executed, the controller 290 may control the display 230 to display a context menu 3440 including at least an icon to remove a gallery application on a corner area where the tap interaction 3430 is detected as illustrated at the bottom of FIG. 34B. Herein, as illustrated at the bottom of FIG. 34B, the home menu 3440 may include an icon for seeing previous picture contents, an icon for seeing next picture contents, an edit icon, a delete icon and the like.

Figure 35:
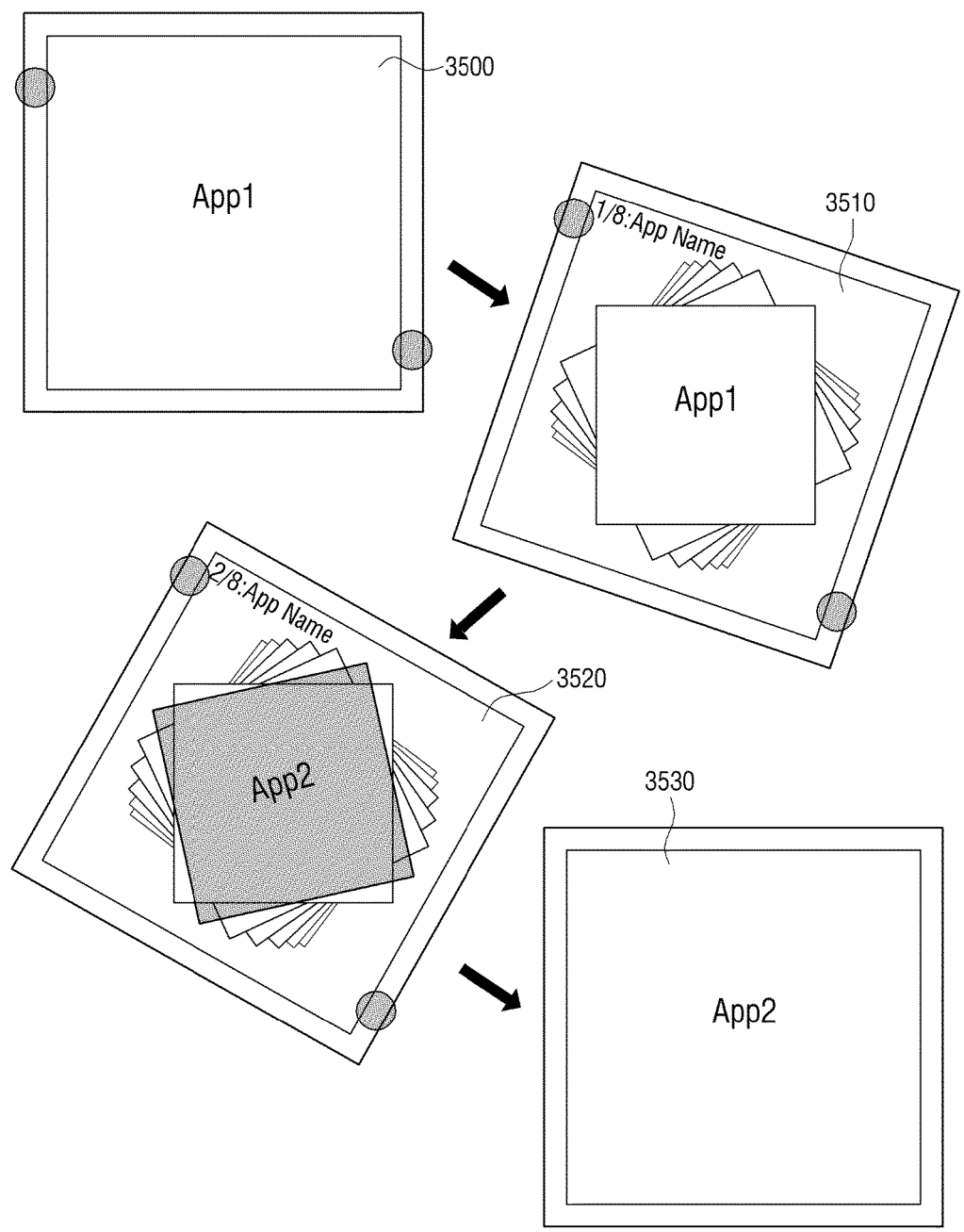

As illustrated in the first view of FIG. 35, in response to detecting a shake interaction which includes simultaneously touching a left side and a right side of the bezel unit 235 and shaking the user terminal device 200, via the movement detector 283, while the first application 3500 is displayed, the controller 290 may control the display to reduce the first application 3500, and to display a screen 3510 in which other applications are piled up like a stack of cards, as illustrated in the second view of FIG. 35. As illustrated in the second view of FIG. 35, in response to detecting a shake interaction which includes simultaneously touching a left side and a right side of the bezel unit 235 and shaking the user terminal device 200, via the movement detector 283, while the screen 3510 where the reduced first application and other applications are piled up like a stack of cards, the controller 290 may control the display 230 to display a screen 3520 where the second application is located on the top as illustrated in the third view of FIG. 35. As illustrated in the third view of FIG. 35, while the screen 3520 where the second application is located on the top is displayed, if a touch on a left side and a right side of the bezel unit 235 is released, the controller 290 may control the display 230 to display a screen 3530 where the second application is enlarged as an entire screen.

Figure 36:
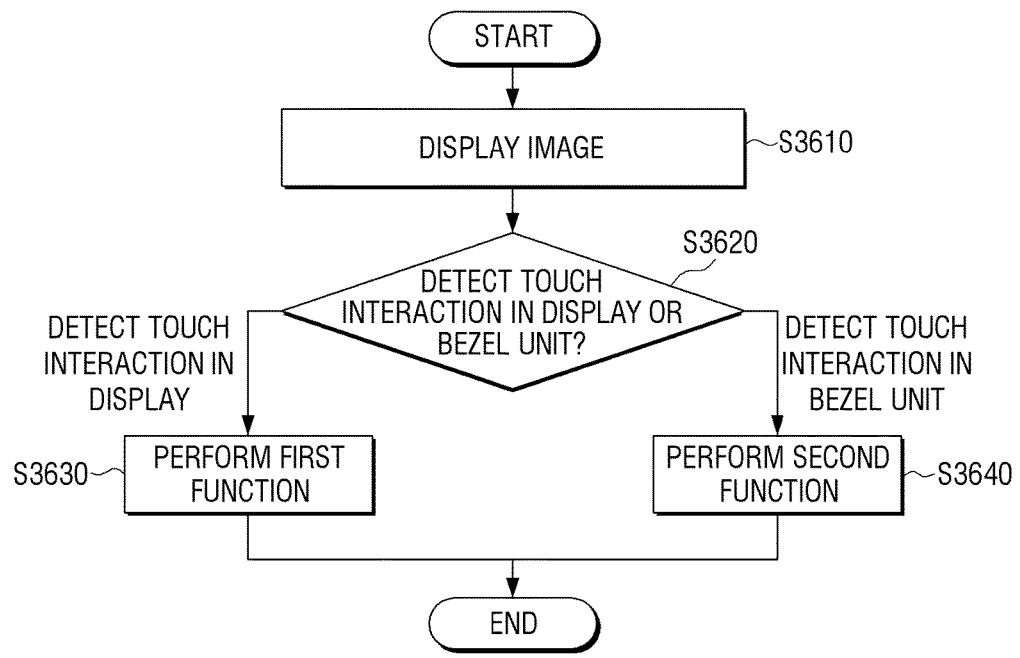
FIGS. 36 to 37 are flowcharts illustrating a method for displaying on a user terminal device according to various exemplary embodiments.
Figure 37:
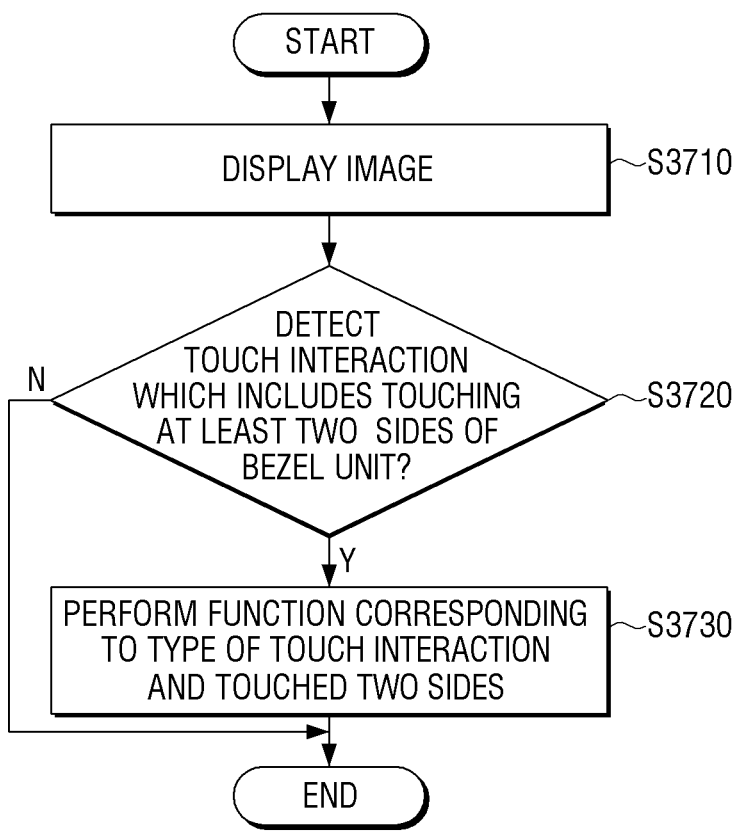

Referring to FIGS. 36 and 37, a method for displaying the user terminal device 200 may be explained according to an exemplary embodiment. FIG. 36 is a flowchart explaining an exemplary embodiment which performs different functions in response to detecting a touch interaction in the display 230 and the bezel unit 235, respectively.

The user terminal device 200 displays an image (S3610).

The user terminal device 200 detects a touch interaction in the display 230 or the bezel unit 235 (S3620). Herein, a touch interaction includes at least one of a tap interaction, a drag interaction, a swipe interaction and a pinch interaction.

In response to detecting a touch interaction on the display 230, the user terminal device 200 performs the first function (S3630), and in response to detecting a touch interaction in the bezel unit 235, the user terminal device 200 performs the second function (S3640). That is, even if an identical type of touch interaction is inputted to the user terminal device 200, a different function may be performed according to whether a touch interaction is inputted into the display 230 or the bezel unit 235.

FIG. 37 is a flowchart illustrating an exemplary embodiment which performs a function of a user terminal device in response to detecting a touch interaction on a plurality of sides of the bezel unit 235.

The user terminal displays an image (S3710).

The user terminal device 200 determines whether a touch interaction includes touching at least two sides of the bezel unit 235 is detected (S3720).

In response to detecting a touch interaction which includes touching at least two sides of the bezel unit 235 (S3720-Y), the user terminal device 200 performs a function corresponding to a type of the touch interaction and the touched two sides (S3730).

According to various exemplary embodiments described above, a user may perform various functions of the user terminal device 200 by touching at least one of the display 230 and the bezel unit 235.

<User Interaction which is Specialized for e-Book>

Figure 38:
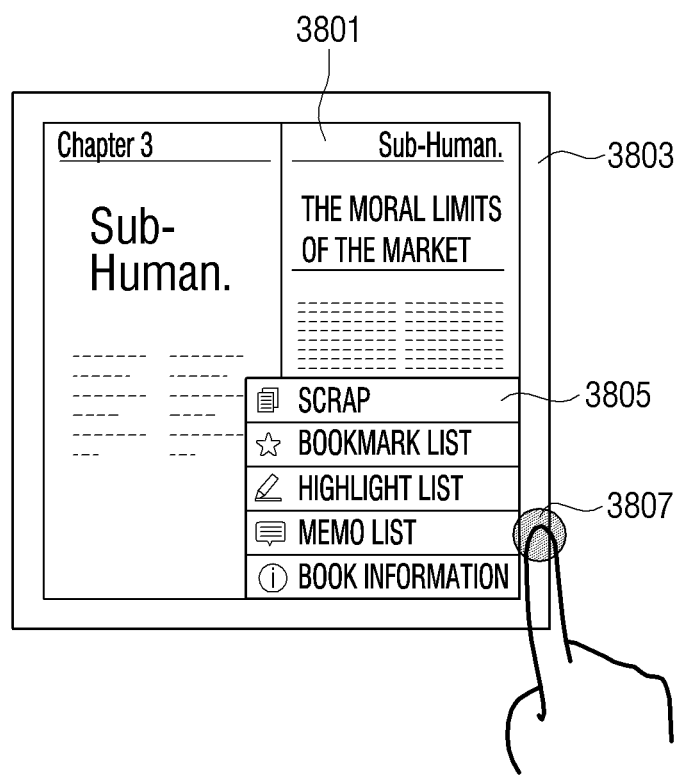
FIG. 38 is a view illustrating, in response to detecting a user interaction on at least one side of a display while an e-book content is displayed according to an exemplary embodiment, controlling a display of the e-book content according to a type of user interaction and the number of sides of a bezel unit where the user interaction is detected.

FIG. 38 is a view illustrating in response to detecting a user interaction on at least one side of the bezel unit 235 while an e-book content is displayed, controlling a display of an e-book content according to a type of the user interaction and the number of sides of a bezel unit where the user interaction is detected in the user terminal device 200 according to an exemplary embodiment.

Figure 47:
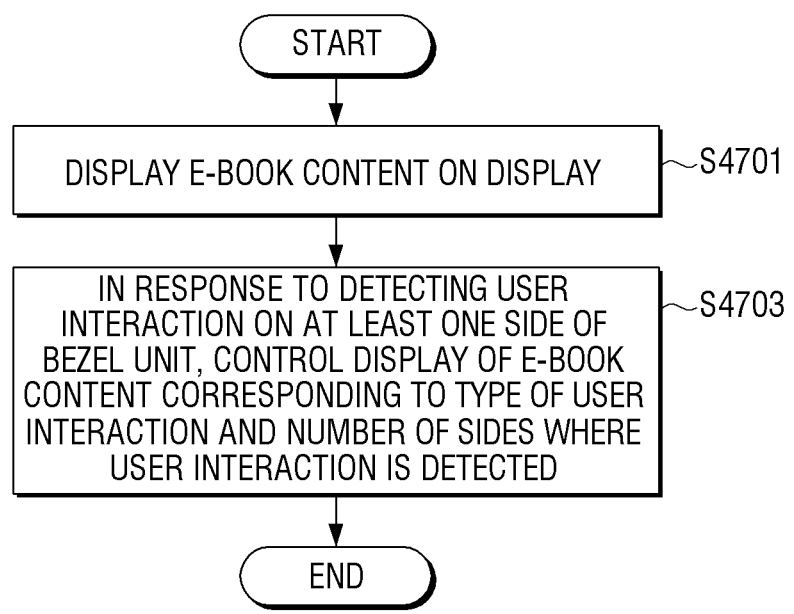
FIG. 47 is a flowchart illustrating, in response to detecting a user interaction on at least one side of a bezel unit while an e-book content is displayed, a method for displaying the e-book content according to an exemplary embodiment.

FIG. 47 is a flowchart illustrating a method for displaying an e-book content in response to detecting a user interaction on at least a side of the bezel unit 235 while an e-book content is displayed in the user terminal device 200 according to an exemplary embodiment.

Referring to FIG. 38, an e-book content 3801, a menu 3805, and a bezel unit 3803 are illustrated on the display 230. An e-book content 3801 may have a hierarchy structure. The menu 3805 may include a plurality of menu items which is cable of performing a function related to the e-book content 3801. The bezel unit 3803 may house the display 230.

In response to detecting a user interaction on at least a side of the bezel unit 235, via the first touch detector 281 which detects a user interaction inputted to the display 230 and the second touch detector 282 which detects a user interaction inputted to the bezel unit 235, the user terminal device 200 may include a controller 290 which controls a display of an e-book content corresponding to a type of a user interaction and the number of sides where a user interaction is detected. That is, the controller 290 may control the display 230 to change an e-book content variously according to a user interaction inputted to the display 230 and the bezel unit 235, or to display information related to the e-book content.

A method for displaying the user terminal device 200 may include displaying an e-book content on the display 230 (S4701) and in response to detecting a user interaction on at least a side of the bezel unit 235, controlling a display of an e-book content corresponding to a type of the user interaction and the number of sides where the user interaction is detected (S4703).

The bezel unit 235 may house the display 230, and include 4 sides. However, this is only one example, and may include three sides, four sides or not less than 5 sides according to a shape of the display 230. Each side of the bezel unit 235 may detect a user interaction through the second touch detector 282. A type of user interaction may include a single touch interaction, a multi touch interaction, a drag interaction, a flip interaction and a combination of not less than two interactions listed above. For example, a touch and drag interaction may be a combination of not less than two user interactions.

Referring to FIG. 38, if a user touches the bezel unit 3803 through the second touch detector 282 while the e-book content 3801 is displayed on the display 230, the controller 290 may detect a user interaction 3807 inputted to the bezel unit 3803 through the second touch detector 282. The controller 290 may determine a type of user interaction. A user interaction may be a single touch interaction. Also, the controller 290 may determine the number of sides of the bezel unit 3803 where a user interaction is detected. The controller 290 may determine whether a user interaction is detected on a side of the bezel unit or a plurality of sides of the bezel unit, and then control a display of an e-book content accordingly. Controlling a display of an e-book content may include displaying various kinds of information related to the e-book content.

In response to detecting a single touch interaction 3807 on the first side of the bezel unit 3803 while an e-book content is displayed, the controller 290 may control the display 230 to display the menu screen 3805 related to an e-book content. A menu may include a plurality of items. For example, a menu may include a 'scrap', a 'bookmark', a 'highlight' and a 'memo' as an item. The controller may control the display 230 to display a menu that overlaps with the display e-book content 3801. That is, if a user touches point 3807 at a side of the bezel unit 3803 with a finger of the user while the e-book content 3801 is displayed on the display 230, the controller 290 may control the display 230 to display a menu 3805 related to the e-book content by overlapping the menu 3805 with the e-book content. If a single touch interaction is detected on any side of four sides of the bezel unit 3803 while the e-book content is displayed, the controller 290 may control the display 230 to display a menu related to the e-book content.

In response to detecting a multi interaction on the first side of the bezel unit 235, the controller 290 may control the display 230 to display bookmark information regarding an e-book content.

Figure 39:
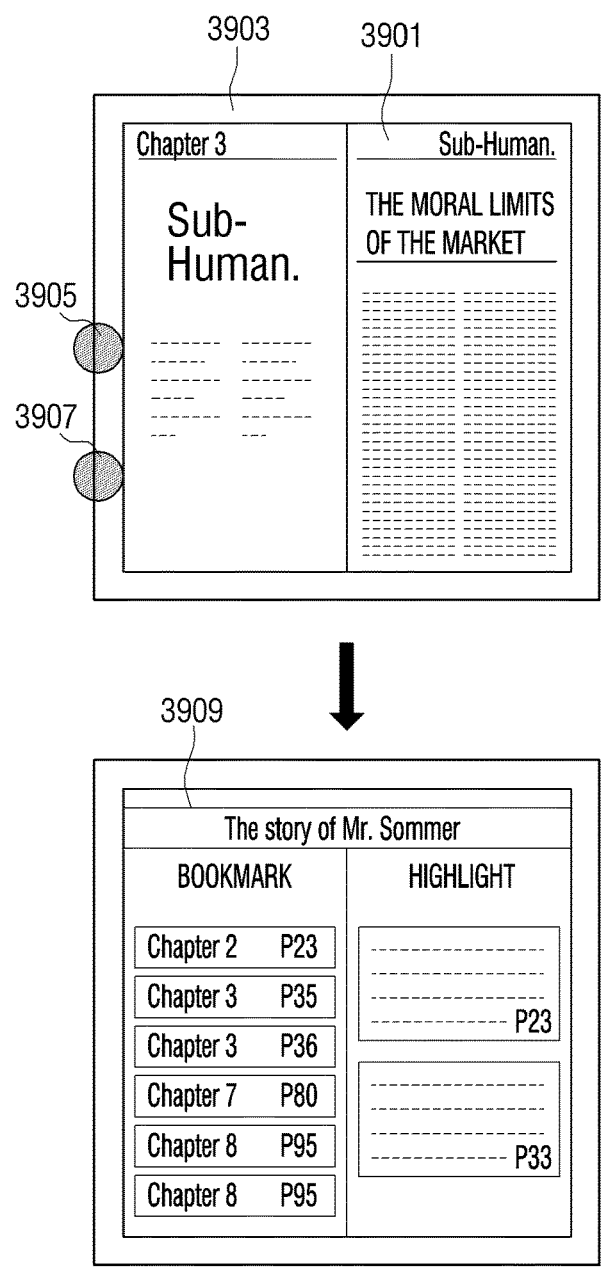
FIG. 39 is a view illustrating, in response to detecting a multi touch interaction on the first side of a bezel unit while an e-book content is displayed, displaying bookmark information related to the e-book content.

Referring to FIG. 39, an e-book content 3901, bookmark information and highlight information 3909 are illustrated. A bezel unit 3903 houses the display 230. In response to detecting a multi touch interaction 3905, 3907 on the first side of the bezel unit 3903 while the e-book content 3901 is displayed, the controller 290 may control the display 230 to display the bookmark information 3909 related to the e-book content 3901.

In response to detecting the multi touch interaction 3905, 3907 on the first side of the bezel unit 3903 while the e-book content 3901 is displayed, the controller 290 may control the display 230 to display highlight information regarding the e-book content.

The book mark information 3909 may be location information regarding a specific page of the e-book content 3901. Highlight information may be information displayed by visually dividing a specific area of the e-book content.

Figure 40A:
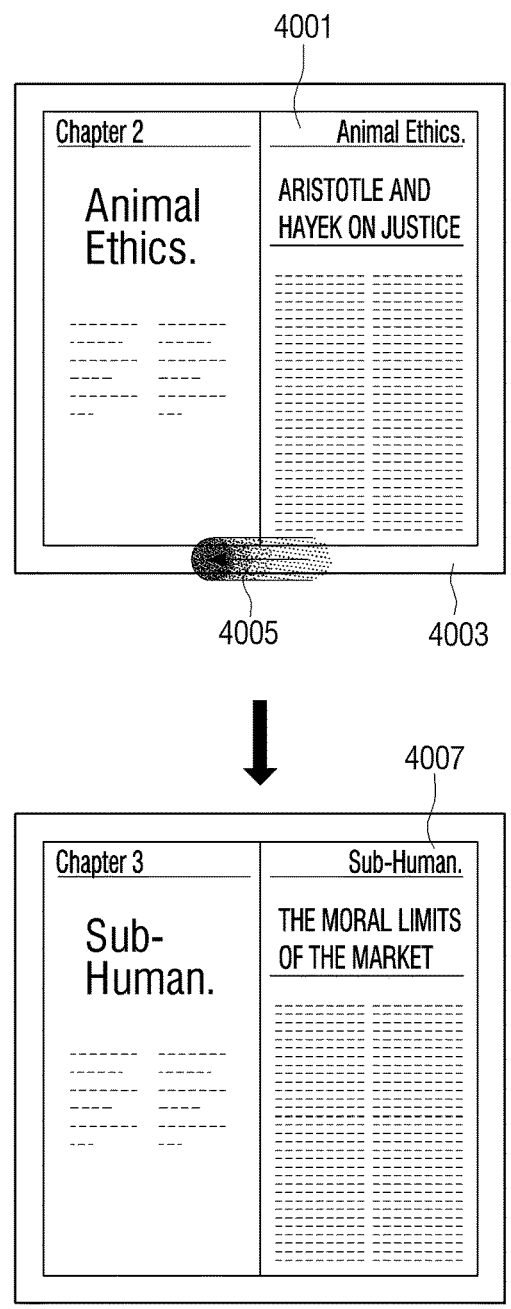
FIG. 40A is a view illustrating, in response to detecting a drag interaction through a horizontal side of a bezel unit while an e-book content is displayed on a display of a user terminal device, converting the e-book content to a screen in a chapter unit.

Referring to FIG. 40A, in response to detecting a drag interaction through a horizontal side of a bezel unit 4003 while an e-book content 4001 is displayed on the display 230 of the user terminal device, the e-book content is converted to a chapter unit.

In response to detecting a drag interaction via the first touch detector 281 while an e-book content is displayed, the controller 290 may control the e-book content to be displayed in a page unit, and in response to detecting a drag interaction via the second touch detector 282, the controller 290 may control the display to convert the e-book content to a chapter unit or to another e-book content.

For example, if a user drags the display 230 while an e-book content is displayed on the display 230, a page which is currently displayed may convert to a next page or a previous page. The first touch detector 281 may be connected with the display 230 electrically. If a user drags the display 230, the first touch detector 281 may detect a user interaction.

In response to detecting a drag interaction through the second touch detector 282, the controller 290 may determine whether the drag interaction is detected on a horizontal side of the bezel unit 4003 or a vertical side of the bezel unit 4003, and then control a display of an e-book content based on a location of a side where the drag interaction is detected.

For example, if a user drags a horizontal side 4005 of the bezel unit 4003 while an e-book content is displayed, the controller 290 may control the display 230 to convert a chapter of the e-book content 4001 which is currently displayed on the display 230 to a next chapter of the e-book content 4001 and then display the next chapter of the e-book content 4001. Also, the controller 290 may control the display 230 to convert to a previous chapter or to a next chapter and display the previous chapter or the next chapter according to a drag direction to the left side and the right side.

If a user drags a vertical side 4015 of the bezel unit 4013 while the e-book content 4001 is displayed on the display 230, the controller 290 may control the display 230 to convert the e-book content which is currently displayed on the display 230 to another e-book content and then display another e-book content.

Figure 40B:
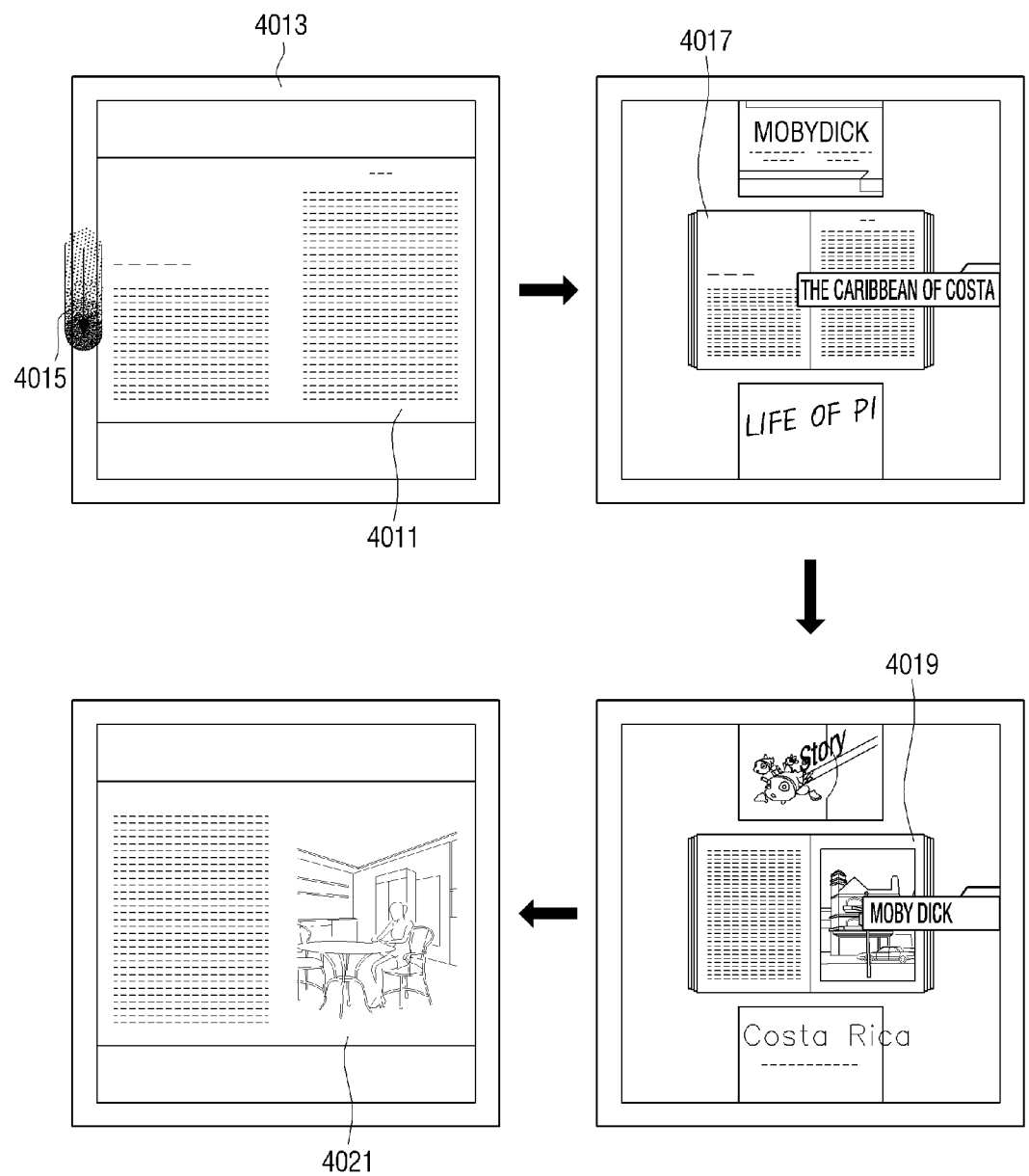
FIG. 40B is a view illustrating, in response to detecting a drag interaction through a vertical side of a bezel unit while an e-book content is displayed on a display, converting an e-book content to another e-book content.

Referring to FIG. 40B, an e-book content 4011, a reduced image of the e-book content 4017, a reduced image of another e-book content 4019 and another e-book content 4021 are displayed on the display 230.

If a user drags a vertical side 4015 of the bezel unit 4013 while the e-book content 4011 is displayed, the controller may control the display 230 to display a reduced image 4017 of an e-book content and a reduced image 4019 of another e-book content.

A user may drag the vertical side 4015 of the bezel unit 4013 so that a reduced image of a plurality of e-book content may be scrolled and displayed on the display 230. A size of a reduced image of an e-book content which is located in the middle of reduced images of a plurality of e-book contents may be displayed relatively larger than other reduced images. If a user releases a drag operation, the reduced image 4019 of an e-book content located in the middle may be selected, and another e-book content located on the display 230 may be displayed.

In response to detecting a drag interaction on a horizontal side of the bezel unit 4013 while an e-book content is displayed on the display 230, the controller 290 may control the display 230 to convert the e-book content to a chapter unit, and in response to detecting a drag interaction on a vertical side of the bezel unit 4013, the controller 290 may control the display 230 to convert the e-book content to an e-book content unit.

In response to detecting a pinch-in interaction on the bezel unit 235 while an e-book content is displayed on the display 230 of the user terminal device 200, the controller 290 may control the display 230 to display a list of a plurality of e-book contents.

Figure 41:
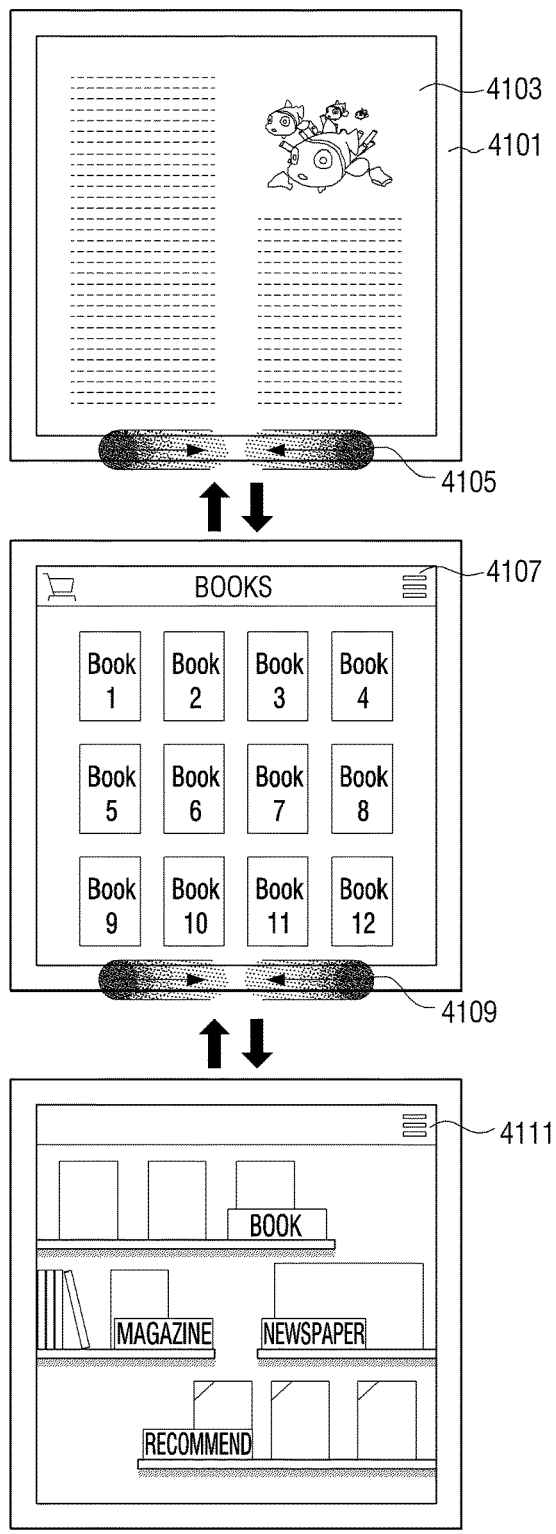
FIG. 41 is a view illustrating the displaying of a list of a plurality of e-book contents by a pinch interaction on a bezel unit while an e-book content is displayed on a display.

Referring to FIG. 41, an e-book content 4101, a plurality of e-book content lists 4107 and a category list of e-book content 4111 are illustrated on the display 230 of the user terminal device 200. A plurality of e-book content lists 4107 may be an arrangement of a reduced image of a plurality of e-book contents. The category list of e-book content 4111 may be an image of a bookshelf shape, and a plurality of e-book content may be divided and displayed according to a category.

While an e-book content is displayed on the display 230, if a user pinches in the bezel unit 4101, the display 230 may display a plurality of e-book content lists 4107. The pinch-in operation is an operation of contacting the bezel unit with two fingers and then moving two fingers so that a distance between two fingers becomes closer while two fingers are still contacted with the bezel unit.

If a user pinches in at the bezel unit while a plurality of e-book content lists 4107 are displayed, the controller 290 may control the display 230 to display a plurality of e-book contents 4111 which are divided according to a category on the display 230.

If a user pinches out at the bezel unit while a plurality of e-book contents 4111 divided according to a category are displayed on the display 230, the controller 290 may control the display 230 to display a plurality of e-book content lists 4107. The pinch-out operation is an operation of contacting the bezel unit with two fingers and then moving two fingers so that a distance between two fingers becomes farther while two fingers are still contacted to the bezel unit.

If a user pinches out at the bezel unit while a plurality of e-book content lists 4107 are displayed on the display 230, the controller 290 may control the display 230 to display an e-book content 4101.

In response to detecting a touch interaction on the first vertical side of the bezel unit 235, and to detecting a drag interaction on the second vertical side of the bezel unit 235 while an e-book content is displayed, the controller 290 may control the display 230 to highlight and display highlighting from a row corresponding to a point where a touch is detected to a row corresponding to a point where a drag ends. Highlighting may be used in order to visually display content in a distinctive way.

Figure 42:
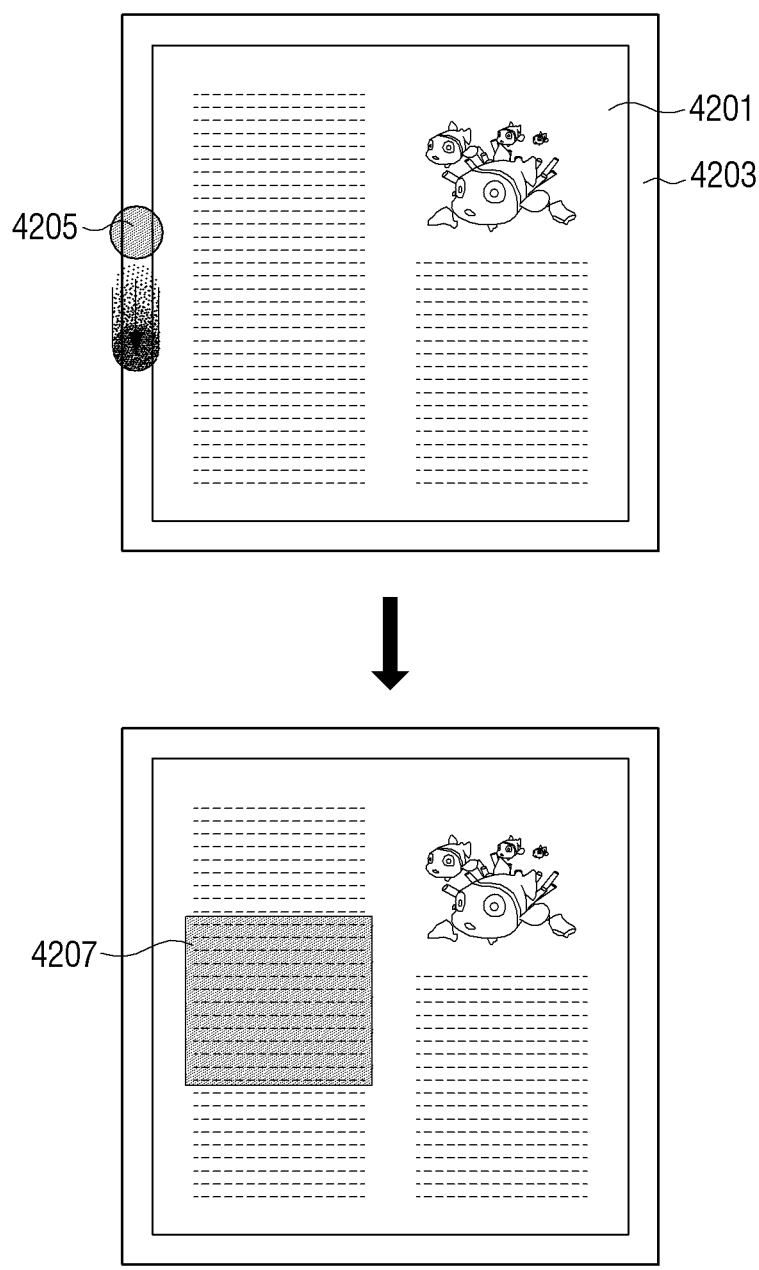
FIG. 42 is a view illustrating, in response to detecting a touch interaction on the first vertical line of a bezel unit while an e-book content is displayed, highlighting from a line corresponding to a point where the touch is detected to a line corresponding to a point where a drag ends.

Referring to FIG. 42, an e-book content 4201 and a highlighted area 4207 on the display 230 are illustrated. If a user touches and drags a vertical side 4205 of the bezel unit 4203 while an e-book content 4201 is displayed on the display 230, a row of the e-book content corresponding to the touched point may be highlighted. A highlighted area may be expanded according to a drag distance while a user drags the vertical side 4205. That is, the highlighted area may be determined according to the drag distance.

In response to detecting a user interaction which includes simultaneously touching the first side of the bezel unit 235 and the second side of the bezel unit 235 which adjoins the first side while an e-book content is displayed on the display 230, the controller 290 may control the display 230 to display information related to the e-book content on a corner area between the touched points on the first side and the second side of the bezel unit 235.

Figure 43:
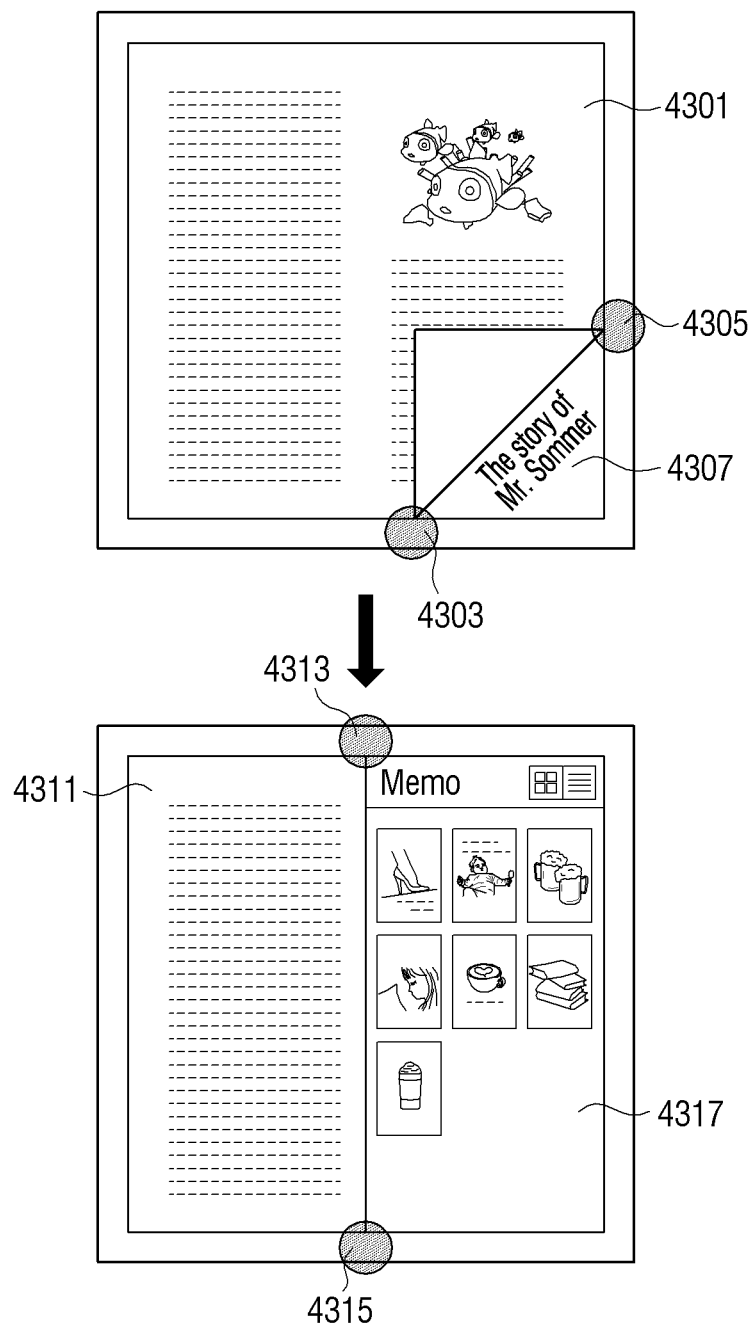
FIG. 43 is a view illustrating the controlling of a display of an e-book content according to an interaction which includes touching two points of a bezel unit.

Referring to the upper side of FIG. 43, an e-book content 4301, two points touched by a user 4303, 4305 and information 4307 related to the e-book content are illustrated.

In response to detecting a touch interaction which includes touching the first point 4303 of the first side of the bezel unit 235 and the second point 4305 of the second side of the bezel unit 235 for a predetermined time while the e-book content 4301 is displayed on the display 230, the controller 290 may control the display 230 to display information related to the e-book content 4301 on a corner area defined by the first point 4303 and the second point 4305. Herein, as illustrated at the upper side of FIG. 43, the controller 290 may control the display 230 so that a corner area of the e-book content 4301 is folded by a touch interaction which includes touching the first point 4303 and the second point, and then a UI which introduces information related to the e-book content 4301, such as detailed information regarding the e-book content 4301 is displayed.

Referring to the bottom side of FIG. 43, an e-book content 4311, the second application execution screen 4317, and two points 4313, 4315 touched by a user are illustrated.

In response to detecting a touch interaction which includes touching the first side of the bezel unit and the third side of the bezel unit which is located at the side opposite to the first side while the e-book content 4311 is displayed, the controller 290 may control the display 230 to divide a display screen into two areas according to an imaginary line which simultaneously connects touched points 4313, 4315, to display an e-book content 4311 on the first area, and to display an execution screen 4317 of the second application on the second area.

The size of the first area and the size of the second area may be identical, but this is only one example, and the size of the first area may be different from the size of the second area. A part 4311 of entire pages of an e-book content may be displayed on the first area. Also, the e-book content may be reduced 4311 and displayed on the first area. The second application 4317 which is executed most recently among a plurality of applications which are multi-tasked currently may be displayed on the second area.

In response to detecting a drag interaction which includes continually dragging the first side of the bezel unit 235 to the second side of the bezel unit 235 which adjoins the first side while an e-book content is displayed on the display 230, the controller 290 may enlarge or reduce a letter size of the e-book content. That is, a letter side of the e-book content may be changed.

Figure 44:
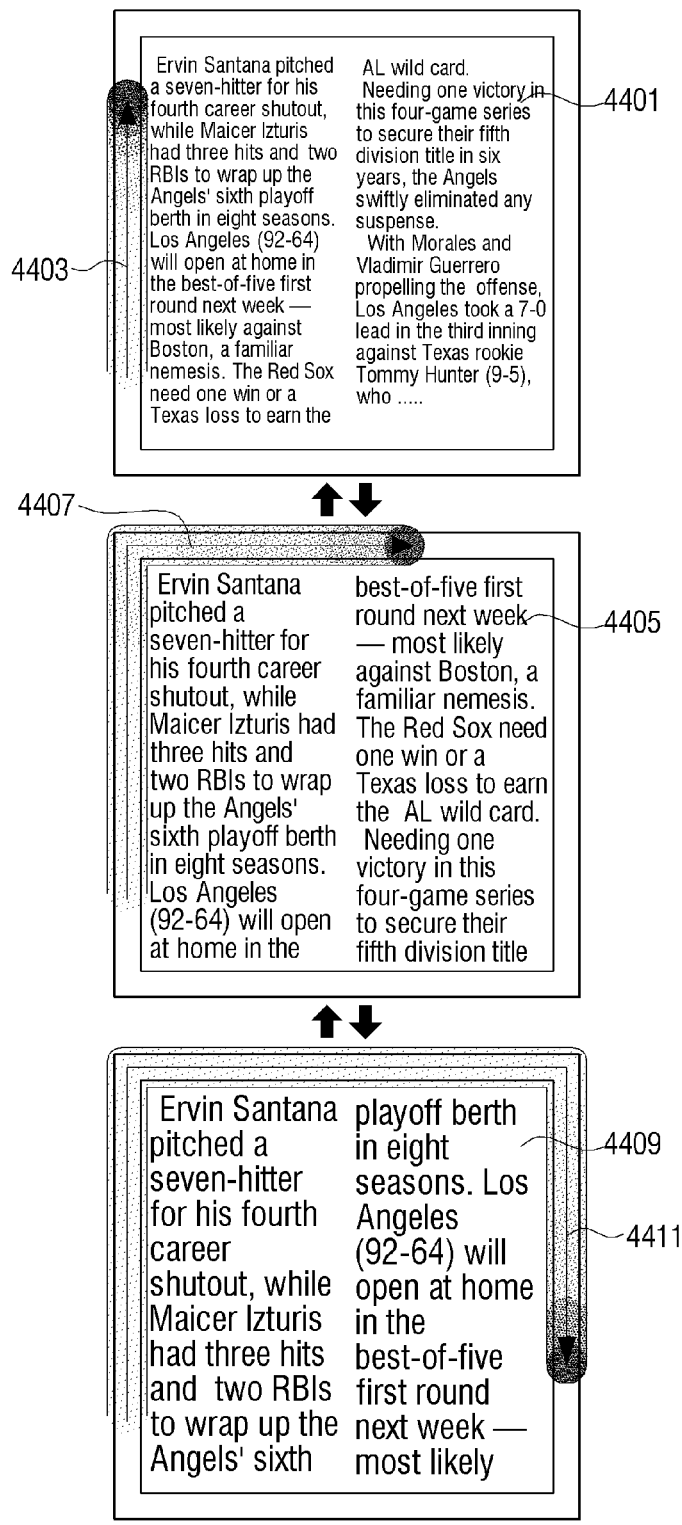
FIG. 44 is a view illustrating the changing and displaying of a letter size according to an interaction which includes continually dragging at least two sides of a bezel unit while an e-book content is displayed.

Referring to FIG. 44, e-book contents 4401, 4405, 4409 with different letter sizes and different drag interaction directions are illustrated.

If a user continually drags from the first side 4403 of the bezel unit to the second side 4407 of the bezel unit which adjoins the first side 4403 while the display 230 displays an e-book content, the controller 290 may control the display 230 to sequentially enlarge and display a letter size whenever a drag direction is changed.

For example, if a user drags from the first side 4403 of the bezel unit 235 to the second side 4407 of the bezel unit 235 while the e-book content 4401 with the first letter size is displayed on the display 230, the e-book content 4405 with the second letter size may be displayed, and if the user drags to the third side 4411 of the bezel unit 235, the e-book content 4409 with the third letter size may displayed.

If a user continually drags from the third side 4403 of the bezel unit 235 to the second side 4407 of the bezel unit 235 while the e-book content 4409 with the third letter size is displayed, the e-book content 4405 with the second size may be displayed, and if the user drags to the first side 4403 of the bezel unit 235, the e-book content with the first size may be displayed.

That is, if a drag interaction proceeds in the clockwise direction, the controller may sequentially enlarge a letter size of an e-book content according to a drag direction, and if a drag interaction proceeds in the counterclockwise direction, the controller 290 may sequentially reduce a letter size of an e-book content according to a drag direction.

Also, if a drag interaction proceeds in the clockwise direction, the controller 290 may sequentially reduce a letter size of an e-book content according to a drag direction, and if a drag interaction proceeds in the counterclockwise direction, the controller 290 may sequentially enlarge a letter size of an e-book content.

If a drag interaction proceeds in the clockwise direction, the controller 290 may sequentially enlarge a letter size of an e-book content according to a drag distance, and if a drag interaction proceeds in the counterclockwise direction, the controller 290 may sequentially reduce a letter size of an e-book content according to the drag distance.

If a drag interaction proceeds in the clockwise direction, the controller 290 may sequentially reduce a letter size of an e-book content according to a drag distance, and if a drag interaction proceeds in the counterclockwise direction, the controller 290 may sequentially enlarge a letter size of an e-book content according to the drag distance.

Referring to FIG. 45, an e-book content 4501, a reduced image of the e-book content 4507, and a delete icon 4509 are illustrated.

In response to detecting a swipe interaction which includes simultaneously swiping the first side of the bezel unit and the second side of the bezel unit which adjoins the first side while a page of an e-book content is displayed on the display, the controller 290 may delete a page according to a swipe interaction.

When a page is deleted, the controller 290 may control the display 230 so that an animation where a page is gradually reduced is displayed and a reduced image of the page is generated. Also, the controller 290 may control the display 230 to display the reduced image of the page which is sucked into a delete icon. If a user touches the delete icon, the controller 290 may control the display 230 to display a reduced image corresponding to a plurality of deleted pages. The reduced image may include address information which provides a corresponding page.

For example, if a user simultaneously swipes the first side 4503 and the second side which adjoins the first side while the e-book content 4501 is displayed on the display 230, the controller 290 may control the display 230 to simultaneously detect the swipe interaction on the two sides via the second touch detector 282, and generate a reduced image of a displayed page according to the swipe interaction. The controller 290 may control the display 230 to display an animation which shows a process of reducing the page. A page may be sequentially reduced and a reduced image 4507 of a page may be generated, and the reduced image may be moved to the delete icon 4509 and the reduced image 4507 may disappear from the screen.

In response to detecting a user interaction which drags the first side of the bezel unit 235 and the second side of the bezel unit 235 which adjoins the first side while a page of an e-book content is displayed on the display 230, the controller 290 may delete a page according to a drag interaction.

Figure 46:
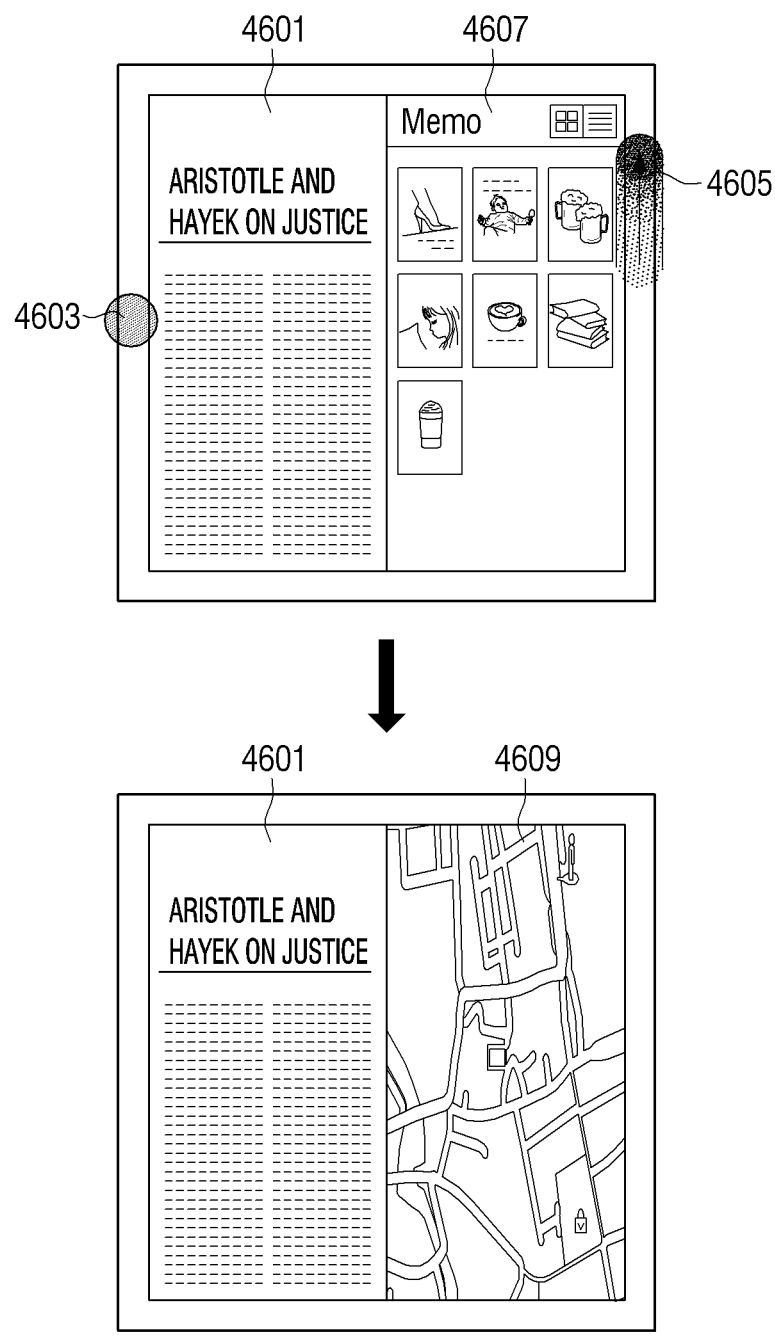
FIG. 46 is a view illustrating, in response to detecting a touch interaction which includes touching the first side contacted to the first area and dragging the second side contacted to the second area while an e-book content is displayed in the first area of the display and the second application is displayed on the second area, converting an execution screen of the second application displayed on the second area to an execution screen of the third application and displaying the execution screen of the third application.

Referring to FIG. 46, an e-book content, the second application 4607, and the third application 4609 are illustrated on divided areas of the display 230.

In response to detecting a touch interaction which includes touching the first side which is contacted with the first area of the bezel unit 235 and dragging the second side which is contacted with the second area while an e-book content 4601 is displayed on the first area of the display 230 and the second application 4605 is displayed on the second area of the display 230, the controller 290 may control the display 230 to convert an execution screen of the second application displayed on the second area to an execution screen of the third application and display the execution screen of the third application.

For example, if a user touches the first side 4603 which is contacted with the first area and drags the second side 4605 which is contacted with the second area while the display 230 is divided into two areas, the e-book content 4601 is displayed on the first area, and the second application is displayed on the second area, the controller 290 may control the display 230 to convert the second application 4607 to the third application 4609 and display the third application 4609 according to the drag operation.

To the contrary, if a user touches the second side which is contacted with the second area, and drags the first side which is contacted with the first area, an e-book content may be converted to another application and another application may be displayed according to the drag operation.

In other words, the controller 290 may control the display 230 to fix an application displayed around a touched point when a display screen is divided, and to convert an application displayed around a dragged point to another application, and display another application.

As described above, according to various exemplary embodiments, a user may perform various functions of an e-book content by touching at least one of the display 230 and the bezel unit 235.

A method for displaying a user terminal device according to various exemplary embodiments described above may be realized as a program and be provided to the user terminal device. To be specific, a non-transitory computer readable medium where a program including a method for controlling a user terminal device may be provided.

The non-transitory readable medium means a medium which stores a data semi-permanently and is readable by an apparatus, not a media which stores a data for a short period such as a register, a cache, a memory and so on. Specifically, a compact disk (CD), a digital versatile disk (DVD), a hard disk, a blu-ray disk, a universal serial bus (USB), a memory card and ROM may be the non-transitory readable medium.

Desirable exemplary embodiments of the present invention were illustrated and explained above, but the present invention is not limited to the described exemplary embodiments. Also, the description of the exemplary embodiments is intended to be illustrative, and not to limit the scope of the claims, and it would be appreciated by those skilled in the art that changes may be made to the exemplary embodiments without departing from the principles and spirit of the invention, the scope of which is defined in the appended claims.

What is claimed is:

1. A user terminal device, comprising:
  a display configured to display content;
  a bezel configured to house the display;
  a first touch detector configured to detect a first user interaction inputted to the display;
  a second touch detector configured to detect a second user interaction inputted to the bezel; and
  a controller configured to, in response to detecting, via the second touch detector, the second user interaction on at least one side of the bezel, control a display of the content corresponding to a type of the second user interaction and a number of sides of the bezel where the second user interaction is detected,
  wherein, in response to detecting a touch interaction which comprises touching a first side of the bezel and a second side of the bezel which is located on a side opposite to the first side while the content is displayed, the controller controls the display to divide a display screen into two areas according to an imaginary line which connects points touched simultaneously, to display the content on a first area, and to display an execution screen of an application on a second area, and
  wherein, in response to detecting the touch interaction which comprises touching the first side which is contacted with the first area of the bezel, and dragging the second side which is connected with the second area while the display screen is divided so that the content is displayed on the first area, the application being displayed on the second area, the controller controls the display to remove an execution screen of the application from the second area, and to display an execution screen of another application.

2. The user terminal device as claimed in claim 1, wherein the content is e-book content, and
  wherein, in response to detecting a single touch interaction on a first side of the bezel while the e-book content is displayed, the controller controls the display to display a menu related to the e-book content, and in response to detecting a multi touch interaction on the first side of the bezel, the controller controls the display to display bookmark information regarding the e-book content.

3. The user terminal device as claimed in claim 1, wherein the content is e-book content, and
wherein, in response to detecting a drag interaction via the first touch detector while the e-book content is displayed, the controller controls the display to convert the e-book content to being displayed in a page unit, and in response to detecting a drag interaction via the second touch detector, the controller controls the display to convert the e-book content to one from among a screen in a chapter unit or another e-book.

4. The user terminal device as claimed in claim 1, wherein the content is e-book content, and
wherein, in response to detecting a drag interaction on a horizontal side of the bezel, controls the display to convert the e-book content to a screen in a chapter unit, and in response to detecting a drag interaction on a vertical side of the bezel, the controller controls the display to convert the e-book content to another e-book content.

5. The user terminal device as claimed in claim 1, wherein, in response to detecting a pinch-in interaction on the bezel while the content is displayed, the controller controls the display to display a list of a plurality of contents.

6. The user terminal device as claimed in claim 1, wherein, in response to detecting a drag interaction which includes touching a point on a vertical side of the bezel while the content is displayed, the controller controls the display to highlight a line corresponding to the point on the vertical side to a line corresponding to a point where a drag ends.

7. The user terminal device as claimed in claim 1, wherein, in response to detecting a user interaction which comprises simultaneously touching a first side of the bezel and a second side of the bezel which adjoins the first side, the controller controls the display to display information related to the e-book content on a corner area which is between points where the first side and the second side are touched.

8. The user terminal device as claimed in claim 1, wherein, in response to detecting a drag interaction which comprises dragging from a first side of the bezel to a second side which adjoins the first side while the content is displayed, the controller changes a letter size of the content.

9. The user terminal device as claimed in claim 8, wherein, in response to continuing the drag interaction in a clockwise direction, enlarges a letter size of the content, and in response to continuing the drag interaction in a counter-clockwise direction, the controller reduces a letter size of the content.

10. The user terminal device as claimed in claim 1, the controller in response to detecting a swipe interaction which comprises simultaneously swiping a first side of the bezel and a second side of the bezel which adjoins the first side while a page of the content is displayed, deletes the page according to the swipe interaction.

11. A method for displaying content on a user terminal device capable of receiving a touch input at a display and a bezel which houses the display, the method comprising:
displaying content on the display;
in response to detecting a user interaction on at least one side of the bezel, controlling a display of content corresponding to a type of the user interaction and a number of sides of the bezel where the user interaction is detected,
wherein the controlling comprises, in response to detecting a touch interaction which comprises simultaneously touching a first side of the bezel and a second side of the bezel which is located on a side of the bezel opposite to the first side while the content is displayed, dividing the display into two areas, displaying the content on one area of the two areas, and displaying an execution screen of an application on the other area of the two area, and
wherein the controlling comprises in response to detecting the touch interaction which comprises touching the first side which is contacted with the first area of the bezel, and dragging the second side which is connected with the second area while the display screen is divided so that the content is displayed on the first area, the application being displayed on the second area, removing an execution screen of the second application from the second area, and to display an execution screen of another application.

12. The method as claimed in claim 11, wherein the content is e-book content, and
wherein the controlling comprises, in response to detecting a single touch interaction on a first side of the bezel while the e-book content is displayed, displaying a menu related to the e-book content, and in response to detecting a multi touch interaction on the first side of the bezel, displaying bookmark information regarding the e-book content.

13. The method as claimed in claim 11, wherein the content is e-book content, and
wherein the method further comprises, in response to detecting a first drag interaction via a first touch detector while the e-book content is displayed, converting the e-book content to be displayed in a page unit, and in response to detecting a second drag interaction via a second touch detector, converting the e-book content to one from among a chapter unit and another e-book content.

14. The method as claimed in claim 13, wherein the controlling comprises, in response to detecting the second drag interaction on a horizontal side of the bezel, converting the e-book content to a screen in a chapter unit, and in response to detecting the second drag interaction on a vertical side of the bezel, converting the e-book content to another e-book content.

15. The method as claimed in claim 11, wherein the controlling comprises, in response to detecting a pinch-in interaction on the bezel while the content is displayed, displaying a list of a plurality of contents.

16. The method as claimed in claim 11, wherein the controlling comprises, in response to detecting a user interaction which comprises touching and dragging a first point on a vertical side of the bezel while the content is displayed, highlighting a line corresponding to the first point to a line corresponding to a second point where a drag ends.

17. The method as claimed in claim 11, wherein the controlling comprises, in response to detecting a user interaction which comprises simultaneously touching a first side of the bezel and a second side of the bezel which adjoins the first side, displaying notification information of the user terminal device on a corner area which is between points where the first side and the second side are touched.

* * * * *